United States Patent
Chen et al.

(10) Patent No.: US 9,948,915 B2
(45) Date of Patent: Apr. 17, 2018

(54) SUB-PU MOTION PREDICTION FOR TEXTURE AND DEPTH CODING

(71) Applicant: QUALCOMM Incorporated, San Diego, CA (US)

(72) Inventors: Ying Chen, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 671 days.

(21) Appl. No.: 14/339,256

(22) Filed: Jul. 23, 2014

(65) Prior Publication Data

US 2015/0030073 A1    Jan. 29, 2015

Related U.S. Application Data

(63) Continuation-in-part of application No. PCT/CN2013/001639, filed on Dec. 24, 2013.

(Continued)

(51) Int. Cl.
H04N 19/51      (2014.01)
H04N 13/00      (2018.01)
(Continued)

(52) U.S. Cl.
CPC ....... H04N 13/0048 (2013.01); H04N 19/176 (2014.11); H04N 19/51 (2014.11); H04N 19/513 (2014.11); H04N 19/597 (2014.11)

(58) Field of Classification Search
None
See application file for complete search history.

(56) References Cited

U.S. PATENT DOCUMENTS

2011/0013695 A1    1/2011  Endo
2012/0051430 A1    3/2012  Pateux et al.
(Continued)

FOREIGN PATENT DOCUMENTS

CN    102301714 A    12/2011
CN    103096060 A    5/2013
(Continued)

OTHER PUBLICATIONS

Gerhard Tech et al: "3D-HEVC Test Model 4", JCT3V-D1005 Spec VL, Joint Collaborative Team on 3D Video Coding Extension Development OFITU-T SG 16 WP 3 and ISO/IEC JTC 1/SC 29/WG 11, 4nd Meeting: Incheon, KR, Apr. 2013 (Apr. 2013).*

(Continued)

Primary Examiner — William C Vaughn, Jr.
Assistant Examiner — Stuart Bennett
(74) Attorney, Agent, or Firm — Shumaker & Sieffert, P.A.

(57) ABSTRACT

In accordance with one or more techniques of this disclosure, a video coder may divide a current prediction unit (PU) into a plurality of sub-PUs. Each of the sub-PUs may have a size smaller than a size of the PU. Furthermore, the current PU may be in a depth view of the multi-view video data. For each respective sub-PU from the plurality of sub-PUs, the video coder may identify a reference block for the respective sub-PU. The reference block may be co-located with the respective sub-PU in a texture view corresponding to the depth view. The video coder may use motion parameters of the identified reference block for the respective sub-PU to determine motion parameters for the respective sub-PU.

30 Claims, 25 Drawing Sheets

Related U.S. Application Data

(60) Provisional application No. 61/913,031, filed on Dec. 6, 2013, provisional application No. 61/872,540, filed on Aug. 30, 2013, provisional application No. 61/858,089, filed on Jul. 24, 2013.

(51) Int. Cl.
*H04N 19/176* (2014.01)
*H04N 19/597* (2014.01)
*H04N 19/583* (2014.01)
*H04N 19/513* (2014.01)

(56) References Cited

U.S. PATENT DOCUMENTS

| | | |
|---|---|---|
| 2012/0069905 A1 | 3/2012 | Kato et al. |
| 2012/0230411 A1 | 9/2012 | Liu et al. |
| 2012/0269269 A1 | 10/2012 | Choi et al. |
| 2013/0114717 A1 | 5/2013 | Zheng et al. |
| 2014/0098189 A1* | 4/2014 | Deng ............... H04N 13/0048 348/43 |
| 2014/0294087 A1 | 10/2014 | Oh et al. |
| 2015/0003521 A1 | 1/2015 | Thirumalai et al. |
| 2015/0003529 A1 | 1/2015 | Thirumalai et al. |
| 2016/0134857 A1* | 5/2016 | An ...................... H04N 19/597 348/43 |
| 2016/0165263 A1 | 6/2016 | Zhang et al. |
| 2016/0366442 A1 | 12/2016 | Liu et al. |

FOREIGN PATENT DOCUMENTS

| | | |
|---|---|---|
| CN | 103096073 A | 5/2013 |
| CN | 103348651 A | 10/2013 |
| CN | 103609125 A | 2/2014 |
| EP | 2164264 A1 | 3/2010 |
| WO | 2009123248 A1 | 10/2009 |
| WO | 2013016231 A1 | 1/2013 |

OTHER PUBLICATIONS

An J et al: "3D-CE3.h related: Sub-PU level inter-view motion prediction", 5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG.16); URL: http://phenix.int-evry.fr/jct2/, No. JCT3V-E0184, Jul. 19, 2013 (Jul. 19, 2013), XP030131217.*
Gerhard Tech et al ("3D-HEVC Test Model 4, JCT3V-D1005 Spec VL, Joint Collaborative Team on 3D Video Coding Extension Development OFITU-T SG 16 WP 3 and ISO/IEC JTC 1/SC 29/WG 11, 4nd Meeting: Incheon, KR, Apr. 2013 (Apr. 2013)").*
An J et al: "3D-CE3.h related: Sub-PU level inter-view motion prediction", 5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG.16); URL: http://phenix.int-evry.fr/jct2/, No. JCT3V-E0184, Jul. 19, 2013 (Jul. 19, 2013), XP030131217).*
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (for FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
An, et al., "3D-CE3.h related: Sub-PU level inter-view motion prediction", Vienna; (The Joint Collaborative Team on 3D Video Coding Extension Development of ISO/IEC JTC1/SC29/WG11 and ITU-T SG.16 ); URL: http://phenix.int-evry.fr/Jct2/ No. JCT3V-E0184, XP030131217, JCT-3V Meeting; Jul. 27-Aug. 2, 2013, 34 pp.
He, et al., "Enhanced motion parameter inheritance for depth coding in 3D-HEVC", (The Joint Collaborative Team on 3D Video Coding Extension Development of ISO/IEC JTC1/SC29/WG11 and ITU-T SG.16 ); URL: http://phenix.int-evry.fr/jct2/ No. JCT3V-E0229, XP030131282, JCT-3V Meeting; Jul. 27-Aug. 2, 2013, 4 pp.
International Search Report and Written Opinion, PCT/US2014/048013, dated Oct. 10, 2014, 11pp.
Oh et al., "H.264-Based Depth Map Sequence Coding Using Motion Information of Corresponding Texture Video", Gwangju Institute of Science and Texchnology (GIST), Korea, Dec. 2006, 10 pp.
Tech et al., "3D-HEVC Test Model 4", JCT-3V Meeting; Incheon; (The Joint Collaborative Team on 3D Video Coding Extension Development of ISO/IEC JTC1/SC29/WG11 and ITU-T SG.16), No. JCT3V-D1005, Apr. 20-26, 2013, XP030130998, 250 pp.
International Preliminary Report on Patentability, International Application No. PCT/US2014/048013, dated Nov. 4, 2015, 25 pp.
International Search Report and Written Opinion from International Application No. PCT/CN2013/001639, dated May 27, 2014, 15 pp.
Kang et al., "3d-CE5.h related: Improvements for disparity vector derivation," Joint Collaborative Team on 3D Video Coding Extension Development of ITU-T SG 16 WP 3 and ISO/IEC JTC 1/SC 29/WG 11, JCT3V-B0047, 2 Meeting, Shanghai CN, Oct. 13-19, 2012, 4 pp.
Sung et al., "3d-CE5.h: Simplification of disparity vector derivation for HEVC-based 3D video coding," Joint Collaborative Team on 3D Video Coding Extension Development of ITU_T SG 16 WP 3 and ISO/IEC JTC 1/SC 29/WG 11, 1 Meeting: Stockholm, Se, Jul. 16-20, 2012, JCT2-A0126, 4 pp.
Tian et al., "CE1.h: Backward View Synthesis Prediction using Neighbouring Blocks," Joint Collaborative Team on 3D Video Coding Extension Development of ITU-T SG 16 WP 3 and ISO/IEC JTC 1/SC 29/WG 11, JCT3V-C0152, 3 Meeting: Geneva CH, Jan. 16-23, 2013, 24 pp.
Zhang et al., "3D-CE4: Advanced residual prediction for multiview coding," Joint Collaborative Team on 3D Video Coding Extension

(56) References Cited

OTHER PUBLICATIONS

Development of ITU-T SG 16 WP 3 and ISO/IEC JTC 1/SC 29/WG 11, JCT3V-C0049, 3 Meeting, Geneva, CH, Jan. 17-23, 2013, 5 pp.
Zhang et al., "CE4: Advanced residual prediction for multiview coding," Joint Collaborative Team on 3D Video Coding Extension Development of ITU-T SG 16 WP 3 and ISO/IEC JTC 1/SC 29/WG 11, JCT3V-D0177, 4 Meeting: Incheon, KR, Apr. 20-26, 2013, 30 pp.
Second Written Opinion of International Application No. PCT/US2014/048013, dated Jul. 24, 2013, 9 pp.
ITU-T H.264, Series H: Audiovisual and Multimedia Systems, Infrastructure of audiovisual services—Coding of moving video, Advanced video coding for generic audiovisual services, The International Telecommunication Union, Mar. 2005, 343 pp.
ITU-T H.263, Series H: Audiovisual and Multimedia Systems, Infrastructure of audiovisual services—Coding of moving video, Video coding for low bit rate communication, The International Telecommunication Union, Jan. 2005, 226 pp.
ITU-T H.261, Line Transmission of Non-Telephone Signals, Video Codec for Audiovisual Services at px64 kbits, The International Telecommunication Union, Mar. 1993, 32 pp.
Tech et al., "3D-HEVC Draft Text 2," Joint Collaborative Team on 3D Video Coding Extension Development of ITU-T SG 16 WP 3 and ISO/IEC JTC 1/SC 29/WG 11, JCT3V-F1001-v2, 6th Meeting: Geneva CH, Oct. 25-Nov. 1, 2013, 93 pp.
Response to Written Opinion dated Oct. 10, 2014, from international application No. PCT/US2014/048013, dated May 22, 2015, 30 pp.
Tech et al., "3D-HEVC Test Model 2," Joint Collaborative Team on 3D Video Coding Extension Development of ITU-T SG 16 WP 3 and ISO/IEC JTC 1/SC 29/WG 11, Document: JCT3V-B1005_d0, 2nd Meeting: Shanghai, CN, XP030130414, Oct. 13-19, 2012, 118 pp.
Zhang et al., "Proposed text for JCT3V-C0049 based on 3D-HEVC Text Model 2," JCT-3V Meeting; MPEG Meeting; Jan. 17-23, 2013; Shanghai; Document: JCT3V-C0049_proposed text, The Joint Collaborative Team on 3D Video Coding Extension Development of ISO/IEC JTC1/SC29/WG11 and ITU-T SG.16, 6 pp.
Tech et al., "3D-HEVC Draft Text 1," Joint Collaborative Team on 2D Video Coding Extension Development of ITU-T SG WO 3 and ISO/IEC JTC 1/SC 29/WG11, JCT3V-E1001-v3, 5 Meeting, Vienna, AT, Jul. 27-Aug. 2, 2013, 89 pp.
Tech et al., "MV-HEVC Draft Text 4," JCT-3V Meeting, Incheon, The Joint Collaborative Team on 3D Video Coding Extension Development of ISO/IEC JTC1/SC29/WG11 and ITU-T SG.16, No. JCT3V-D1004, May 13, 2013, XP030130982, 50 pp.
Tech et al., "3D-HEVC Test Model 3," JCT-3V Meeting MPEG Meeting, Geneva; The Joint Collaborative Team on 3D Video Coding Extension Development of ISO/IEC JTC1/SC29/WG11 and ITU-T SG.16, No. JCT3V-C1005, Mar. 15, 2013, XP030130664, 52 pp.
Tech et al., "3D-HEVC Test Model 2," JCT3V-C1052 Working Draft Text based on JCT3V-B1005_d0, Joint Dollaborative Team on 3D Video Coding Extension Development of ITU-T SG 16 WP 3 and ISO/IEC JTC 1/SC 29/WG 11, JCT3V-B1005_d0, 2 Meeting, Shanghai, CN, Oct. 13-19, 2012, 126 pp.
Second Written Opinion of International Application No. PCT/US2014/048013, dated Jul. 3, 2015, 6 pp.
Response to Written Opinion dated Oct. 10, 2014, from International Application No. PCT/US2014/048013, dated May 22, 2015, 24 pp.
Bross et al., "High Efficiency Video Coding (HEVC) text specification draft 10 (for FDIS & Consent)," 12th Meeting: Geneva, CH, Jan. 14-23, 2013, JCTVC-L1003_v1, Jan. 28, 2013; 332 pp.
Tech et al., "3D-HEVC Draft Text 2," Geneva, CH (The Joint Collaborative Team on 3D Video Coding Extension Development of ISO/IEC JTC1/SC29/WG11 and ITU-T SG.16), Oct. 25-Nov. 1, 2013, Document: JCT3V-F1001-v2, Dec. 5, 2013; 93 pp.
Tech et al., "3D-HEVC Test Model 4," JCT-3V Meeting; Incheon, KR (The Joint Collaborative Team on 3D Video Coding Extension Development of ISO/IEC JTC1/SC29/WG11 and ITU-T SG.16), Apr. 20-26, 2013; No. JCT3V-D1005_v1, XP030130998, Jun. 17, 2013; 56 pp.
Tech et al., "3D-HEVC Test Model 4", JCT-3V Meeting; Incheon, KR (The Joint Collaborative Team on 3D Video Coding Extension Development of ISO/IEC JTC1/SC29/WG11 and ITU-T SG.16), No. JCT3V-D1005-spec-v1, Jun. 17, 2013, XP030130998, 88 pp.
Zhang et al., "CE4: Advanced residual prediction for multiview coding," JCT-3V Meeting;Apr. 20-26, 2013; Incheon, KR (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-D0177, XP030130841, Apr. 13, 2013, 10 pp.
Zhang et al., "CE4: Advanced residual prediction for Multiview Coding," Joint Collaborative Team on 3D Video Coding Extension of ITU-T SG.16 WP 3 and ISO/IEC JTC1/SC29/WG11, Apr. 20-26, 2013, Document: JCT3V-D0177_proposed_text_r1, Apr. 20, 2013; 6 pp.
Chuang et al., "MVP and merge candidate initialization," MPEG Meeting; Apr. 27-May 7, 2012; Geneva, CH (Motion Picture Expert Group or ISO/IEC JTC1/SC29/WG11), No. m24420, JCTVC-I0181, Apr. 22, 2012, 2 pp.
"Simplification of Sub-PU based MPI," Joint Collaborative Team on 3D Video Coding Extensions of ITU-T SG 16 WP 3 and ISO/IEC JTC 1/SC 29/WG 11, JCT3V-H0133, 8th Meeting: Valencia, ES, Mar. 29-Apr. 14, 2014, 3 pp.
Tech et al., "3D-HEVC Draft Text 3," Jan. 9-17, 2014; San Jose, CA (Joint Collaborative Team on 3D Video Coding Extensions Development of ITU-T SG 16 WP3 and ISO/IEC JTC 1/SC 29/WG 11); No. JCT3V-G1001_v2, Mar. 10, 2014; 102 pp.
Tech et al., "3D-HEVC Test Model 4", JCT-3V Meeting; Apr. 20-26, 2013; Incheon, KR (The Joint Collaborative Team on 3D Video Coding Extension Development of ISO/IEC JTC1/SC29/WG11 and ITU-T SG.16); URL: http://phenix.int-evry.fr/jct2/, No. JCT3V-D1005-v1, Jun. 17, 2013, 52 pp.
Chen Y-W., et al., "3D-CE3.h related: Cross-Check of the results on the MPI Restriction proposed in JCT3V-D0120," 104. MPEG Meeting; Apr. 22, 2013-Apr. 26, 2013; Incheon, KR (Motion Picture Expert Group or ISO/IEC JTC1/SC29/WG11), No. m29127, JCT3V-D0267, Apr. 15, 2013 (Apr. 15, 2013). XP030057658, 2 pp.
Lee J.Y., et al., "3D-CE3.h related: MPI Restriction," 4. JCT-3V Meeting; Apr. 20, 2013-Apr. 26, 2013; Incheon, KR (The Joint Collaborative Team on 3d Video Coding Extension Development of ISO/IEC JTC1/SC29/WG11 and ITU-T SG.16 ); URL: http://phenix.int-evry.fr/jct2/,, No. JCT3V-D0120, Apr. 15, 2013 (Apr. 15, 2013), XP030130784, pp. 1-3.
Zhao X., et al., "CE3 related: Sub-PU based MPI," 6. JCT-3V Meeting; Oct. 25, 2013-Nov. 1, 2013; Geneva, CH (The Joint Collaborative Team on 3d Video Coding Extension Development of ISO/IEC JTC1/SC29/WG11 and ITU-T SG.16 ); URL: http://phenix.int-evry.fr/jct2/ No. JCT3V-F0128, Oct. 18, 2013 (Oct. 18, 2013), XP030131554, pp. 1-3.
Bross B., et al., "High Efficiency Video Coding (HEVC) text specification draft 10 (for FDIS & Last Call)," 12th Meeting: Geneva, CH, Jan. 14-23, 2013, Joint Collaborative Team on Video Coding (JCT-VC) of ITU-T SG 16 WP 3 and ISO/IEC JTC 1/SC 29/Wg 11, Document: JCTVC-L1003_v34, Mar. 19, 2013, 310 pages.
Supplementary European Search Report—EP14884610—Search Authority—Munich—dated Jan. 17, 2018, 12 pp.
Tech et al., "3D-HEVC Test Model 4," (Joint Collaborative Team on Video Coding of ISO/IEC JTC1/SC29/WG11 and ITU-T SG.16); Document: JCT3V-D1005_v2, Apr. 20-26, 2013, 56 pp.
Yamamoto Y., et al., "3D-CE5.h: Decoupling inter-view candidate for AMVP," Joint Collaborative Team on 3D Video Coding Extension Development of ITU-T SG 16 WP 3 and ISO/IEC JTC 1/SC 29/WG 11 2nd Meeting: Shanghai, CN, Oct. 13-19, 2012, SW, ITU-T, Oct. 11, 2012, JCT3V-B0111, 5 pp.

* cited by examiner

| combIdx | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| l0CandIdx | 0 | 1 | 0 | 2 | 1 | 2 | 0 | 3 | 1 | 3 | 2 | 3 | 0 | 4 | 1 | 4 | 2 | 4 | 3 | 4 |
| l1CandIdx | 1 | 0 | 2 | 0 | 2 | 1 | 3 | 0 | 3 | 1 | 3 | 2 | 4 | 0 | 4 | 1 | 4 | 2 | 4 | 3 |

FIG. 9

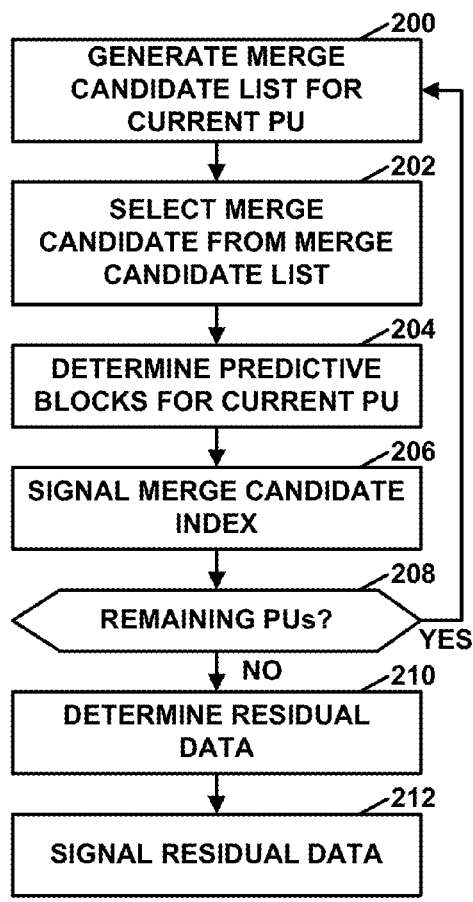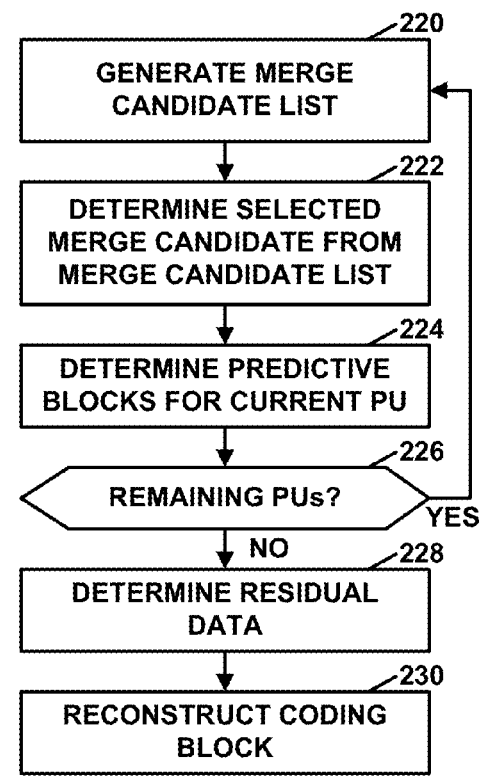
FIG. 19A
FIG. 19B

SUB-PU MOTION PREDICTION FOR TEXTURE AND DEPTH CODING

This application claims the benefit of U.S. Provisional Application No. 61/858,089, filed Jul. 24, 2013, U.S. provisional Application No. 61/872,540, filed Aug. 30, 2013, and U.S. Provisional Application No. 61/913,031, filed Dec. 6, 2013, in addition, this application is a continuation-in-part of International Application No. PCT/CN2013/001639, filed Dec. 24, 2013, which claims the benefit of U.S. Provisional Application No. 61/872,540, filed Aug. 30, 2013, and U.S. Provisional Application No. 61/913,031, filed Dec. 6, 2013, the entire content of each of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multi-view coding bitstream may be generated by encoding views, e.g., from multiple perspectives. Some three-dimensional (3D) video standards have been developed that make use of multi-view coding aspects. For example, different views may transmit left and right eye views to support 3D video. Alternatively, some 3D video coding processes may apply so-called multi-view plus depth coding. In multi-view plus depth coding, a 3D video bitstream may contain not only texture view components, but also depth view components. For example, each view may comprise one texture view component and one depth view component.

SUMMARY

In general, this disclosure relates to three-dimensional (3D) video coding based on advanced codecs, including depth coding techniques. For instance, some of the techniques of this disclosure relate to advanced motion prediction for 3-dimensional High Efficiency Video Coding (3D-HEVC). In some examples, a video coder determines a candidate for inclusion in a candidate list for a current prediction unit (PU) in a depth view. The candidate is based on motion parameters of a plurality of sub-PUs of a current PU of a depth view. When generating the candidate, the video coder may, for respective sub-PUs, identify a reference block in a texture view corresponding to the depth view. The identified reference block is co-located with the respective sub-PU. If the identified reference block is coded using temporal motion vectors, the video coder sets the motion parameters of the respective sub-PU to the motion parameters of the reference block.

In one example, the disclosure describes a method of decoding multi-view video data, the method comprising: dividing a current prediction unit (PU) into a plurality of sub-PUs, each of the sub-PUs having a size smaller than a size of the PU, the current PU being in a depth view of the multi-view video data; for each respective sub-PU of the plurality of sub-PUs: identifying a reference block for the respective sub-PU, wherein the identified reference block for the respective sub-PU is co-located with the respective sub-PU in a texture view corresponding to the depth view; and using motion parameters of the identified reference block for the respective sub-PU to determine motion parameters for the respective sub-PU.

In another example, the disclosure describes a device for coding video data, the device comprising: a memory configured to store the video data; and one or more processors configured to: divide a current prediction unit (PU) into a plurality of sub-PUs, each of the sub-PUs having a size smaller than a size of the PU, the current PU being in a depth view of the multi-view video data; and for each respective sub-PU of the plurality of sub-PUs: identify a reference block for the respective sub-PU, wherein the identified reference block for the respective sub-PU is co-located with the respective sub-PU in a texture view corresponding to the depth view; and use motion parameters of the identified reference block for the respective sub-PU to determine motion parameters for the respective sub-PU.

In another example, the disclosure describes a device for coding video data, the device comprising: means for dividing a current prediction unit (PU) into a plurality of sub-PUs, each of the sub-PUs having a size smaller than a size of the PU, the current PU being in a depth view of the multi-view video data; and for each respective sub-PU of the plurality of sub-PUs: means for identifying a reference block for the respective sub-PU, wherein the identified reference block for the respective sub-PU is co-located with the respective sub-PU in a texture view corresponding to the depth view; and means for using motion parameters of the identified reference block for the respective sub-PU to determine motion parameters for the respective sub-PU.

In another example, the disclosure describes a non-transitory computer-readable data storage medium having instructions stored thereon that when executed cause a device to: divide a current prediction unit (PU) into a plurality of sub-PUs, each of the sub-PUs having a size smaller than a size of the PU, the current PU being in a depth view of the multi-view video data; and for each respective sub-PU of the plurality of sub-PUs: identify a reference block for the respective sub-PU, wherein the identified reference block for the respective sub-PU is co-located with the respective sub-PU in a texture view corresponding to the depth view; and use motion parameters of the identified reference block for the respective sub-PU to determine motion parameters for the respective sub-PU.

In another example, the disclosure describes a method of encoding multi-view video data, the method comprising: dividing a current prediction unit (PU) into a plurality of sub-PUs, each of the sub-PUs having a size smaller than a size of the PU, the current PU being in a depth view of the multi-view video data; for each respective sub-PU of the plurality of sub-PUs: identifying a reference block for the respective sub-PU, wherein the identified reference block for the respective sub-PU is co-located with the respective sub-PU in a texture view corresponding to the depth view; and using motion parameters of the identified reference block for the respective sub-PU to determine motion parameters for the respective sub-PU.

In another example, the disclosure describes a device for coding video data, the device comprising: a memory for storing decoded pictures; and one or more processors configured to: divide a current prediction unit (PU) into a plurality of sub-PUs, each of the sub-PUs having a size smaller than a size of the PU, the current PU being in a depth view of the multi-view video data; and for each respective sub-PU of the plurality of sub-PUs: identify a reference block for the respective sub-PU, wherein the identified reference block for the respective sub-PU is co-located with the respective sub-PU in a texture view corresponding to the depth view; and use motion parameters of the identified reference block for the respective sub-PU to determine motion parameters for the respective sub-PU.

In another example, the disclosure describes a device for coding video data, the device comprising: means for dividing a current prediction unit (PU) into a plurality of sub-PUs, each of the sub-PUs having a size smaller than a size of the PU, the current PU being in a depth view of the multi-view video data; and for each respective sub-PU of the plurality of sub-PUs: means for identifying a reference block for the respective sub-PU, wherein the identified reference block for the respective sub-PU is co-located with the respective sub-PU in a texture view corresponding to the depth view; and means for using motion parameters of the identified reference block for the respective sub-PU to determine motion parameters for the respective sub-PU.

In another example, the disclosure describes a non-transitory computer-readable data storage medium having instructions stored thereon that when executed cause a device to: divide a current prediction unit (PU) into a plurality of sub-PUs, each of the sub-PUs having a size smaller than a size of the PU, the current PU being in a depth view of the multi-view video data; and for each respective sub-PU of the plurality of sub-PUs: identify a reference block for the respective sub-PU, wherein the identified reference block for the respective sub-PU is co-located with the respective sub-PU in a texture view corresponding to the depth view; and use motion parameters of the identified reference block for the respective sub-PU to determine motion parameters for the respective sub-PU.

In some examples, a video coder determines a candidate for inclusion in a candidate list for a current PU. The candidate is based on motion parameters of a plurality of sub-PUs of the current PU. When generating the candidate, the video coder may process the sub-PUs in a particular order, such as a raster scan order. If a reference block corresponding to a sub-PU is not coded using motion compensated prediction, the video coder sets the motion parameters of the sub-PU to default motion parameters. For each respective sub-PU from the plurality of sub-PUs, if a reference block for the respective sub-PU is not coded using motion compensated prediction, the motion parameters of the respective sub-PU are not set in response to a subsequent determination that a reference block for any later sub-PU in the order is coded using motion compensated prediction.

In one example, this disclosure describes a method for decoding multi-view video data, the method comprising: dividing a current PU into a plurality of sub-PUs, wherein the current PU is in a current picture; determining default motion parameters; processing sub-PUs from the plurality of sub-PUs in a particular order, wherein for each respective sub-PU from the plurality of sub-PUs, if a reference block for the respective sub-PU is not coded using motion compensated prediction, the motion parameters of the respective sub-PU are not set in response to a subsequent determination that a reference block for any later sub-PU in the order is coded using motion compensated prediction, wherein a reference block for at least one of the sub-PUs is not coded using motion compensated prediction, and wherein processing the sub-PUs comprises, for each respective sub-PU from the plurality of sub-PUs: determining a reference block for the respective sub-PU, wherein a reference picture includes the reference block for the respective sub-PU; if the reference block for the respective sub-PU is coded using motion compensated prediction, setting motion parameters of the respective sub-PU based on motion parameters of the reference block for the respective sub-PU; and if the reference block for the respective sub-PU is not coded using motion compensated prediction, setting the motion parameters of the respective sub-PU to the default motion parameters; and including a candidate in a candidate list of the current PU, wherein the candidate is based on the motion parameters of the plurality of sub-PUs; obtaining, from a bitstream, a syntax element that indicates a selected candidate in the candidate list; and using motion parameters of the selected candidate to reconstruct a predictive block for the current PU.

In another example, this disclosure describes a method of encoding video data, the method comprising: dividing a current PU into a plurality of sub-PUs, wherein the current PU is in a current picture; determining default motion parameters; processing sub-PUs from the plurality of sub-PUs in a particular order, wherein for each respective sub-PU from the plurality of sub-PUs, if a reference block for the respective sub-PU is not coded using motion compensated prediction, the motion parameters of the respective sub-PU are not set in response to a subsequent determination that a reference block for any later sub-PU in the order is coded using motion compensated prediction, wherein a reference block for at least one of the sub-PUs is not coded using motion compensated prediction, and wherein processing the sub-PUs comprises, for each respective sub-PU from the plurality of sub-PUs: determining a reference block for the respective sub-PU, wherein a reference picture includes the reference block for the respective sub-PU; if the reference block for the respective sub-PU is coded using motion compensated prediction, setting motion parameters of the respective sub-PU based on motion parameters of the reference block for the respective sub-PU; and if the reference block for the respective sub-PU is not coded using motion compensated prediction, setting the motion parameters of the respective sub-PU to the default motion parameters; and including a candidate in a candidate list of the current PU, wherein the candidate is based on the motion parameters of the plurality of sub-PUs; and signaling, in a bitstream, a syntax element that indicates a selected candidate in the candidate list.

In another example, this disclosure describes a device for coding video data, the device comprising: a memory for storing decoded pictures; and one or more processors configured to: divide a current PU into a plurality of sub-PUs, wherein the current PU is in a current picture; determine default motion parameters; process sub-PUs from the plurality of sub-PUs in a particular order, wherein for each respective sub-PU from the plurality of sub-PUs, if a reference block for the respective sub-PU is not coded using motion compensated prediction, the motion parameters of the respective sub-PU are not set in response to a subsequent determination that a reference block for any later sub-PU in the order is coded using motion compensated prediction, wherein a reference block for at least one of the sub-PUs is not coded using motion compensated prediction, and wherein processing the sub-PUs comprises, for each respective sub-PU from the plurality of sub-PUs: determine a reference block for the respective sub-PU, wherein a reference picture includes the reference block for the respective sub-PU; if the reference block for the respective sub-PU is coded using motion compensated prediction, set motion parameters of the respective sub-PU based on motion parameters of the reference block for the respective sub-PU; and if the reference block for the respective sub-PU is not coded using motion compensated prediction, set the motion parameters of the respective sub-PU to the default motion parameters; and include a candidate in a candidate list of the current PU, wherein the candidate is based on the motion parameters of the plurality of sub-PUs.

In another example, this disclosure describes a device for coding video data, the device comprising: means for dividing a current PU into a plurality of sub-PUs, wherein the current PU is in a current picture; means for determining default motion parameters; means for processing sub-PUs from the plurality of sub-PUs in a particular order, wherein for each respective sub-PU from the plurality of sub-PUs, if a reference block for the respective sub-PU is not coded using motion compensated prediction, the motion parameters of the respective sub-PU are not set in response to a subsequent determination that a reference block for any later sub-PU in the order is coded using motion compensated prediction, wherein a reference block for at least one of the sub-PUs is not coded using motion compensated prediction, and wherein the means for processing the sub-PUs comprises, for each respective sub-PU from the plurality of sub-PUs: means for determining a reference block for the respective sub-PU, wherein a reference picture includes the reference block for the respective sub-PU; means for setting, if the reference block for the respective sub-PU is coded using motion compensated prediction, motion parameters of the respective sub-PU based on motion parameters of the reference block for the respective sub-PU; and means for setting, if the reference block for the respective sub-PU is not coded using motion compensated prediction, the motion parameters of the respective sub-PU to the default motion parameters; and means for including a candidate in a candidate list of the current PU, wherein the candidate is based on the motion parameters of the plurality of sub-PUs.

In another example, this disclosure describes a non-transitory computer-readable data storage medium having instructions stored thereon that when executed cause a device to: divide a current PU into a plurality of sub-PUs, wherein the current PU is in a current picture; determine default motion parameters; process sub-PUs from the plurality of sub-PUs in a particular order, wherein for each respective sub-PU from the plurality of sub-PUs, if a reference block for the respective sub-PU is not coded using motion compensated prediction, the motion parameters of the respective sub-PU are not set in response to a subsequent determination that a reference block for any later sub-PU in the order is coded using motion compensated prediction, wherein a reference block for at least one of the sub-PUs is not coded using motion compensated prediction, and wherein processing the sub-PUs comprises, for each respective sub-PU from the plurality of sub-PUs: determining a reference block for the respective sub-PU, wherein a reference picture includes the reference block for the respective sub-PU; if the reference block for the respective sub-PU is coded using motion compensated prediction, setting motion parameters of the respective sub-PU based on motion parameters of the reference block for the respective sub-PU; and if the reference block for the respective sub-PU is not coded using motion compensated prediction, setting the motion parameters of the respective sub-PU to the default motion parameters; and include a candidate in a candidate list of the current PU, wherein the candidate is based on the motion parameters of the plurality of sub-PUs.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 9 is a table indicating an example specification of l0CandIdx and l1CandIdx in 3D-HEVC.

FIG. 19A is a flowchart illustrating an example operation of a video encoder to encode a coding unit (CU) using inter prediction, in accordance with an example of this disclosure.

FIG. 19B is a flowchart illustrating an example operation of a video decoder to decode a CU using inter prediction, in accordance with an example of this disclosure.

DETAILED DESCRIPTION

Figure 1:
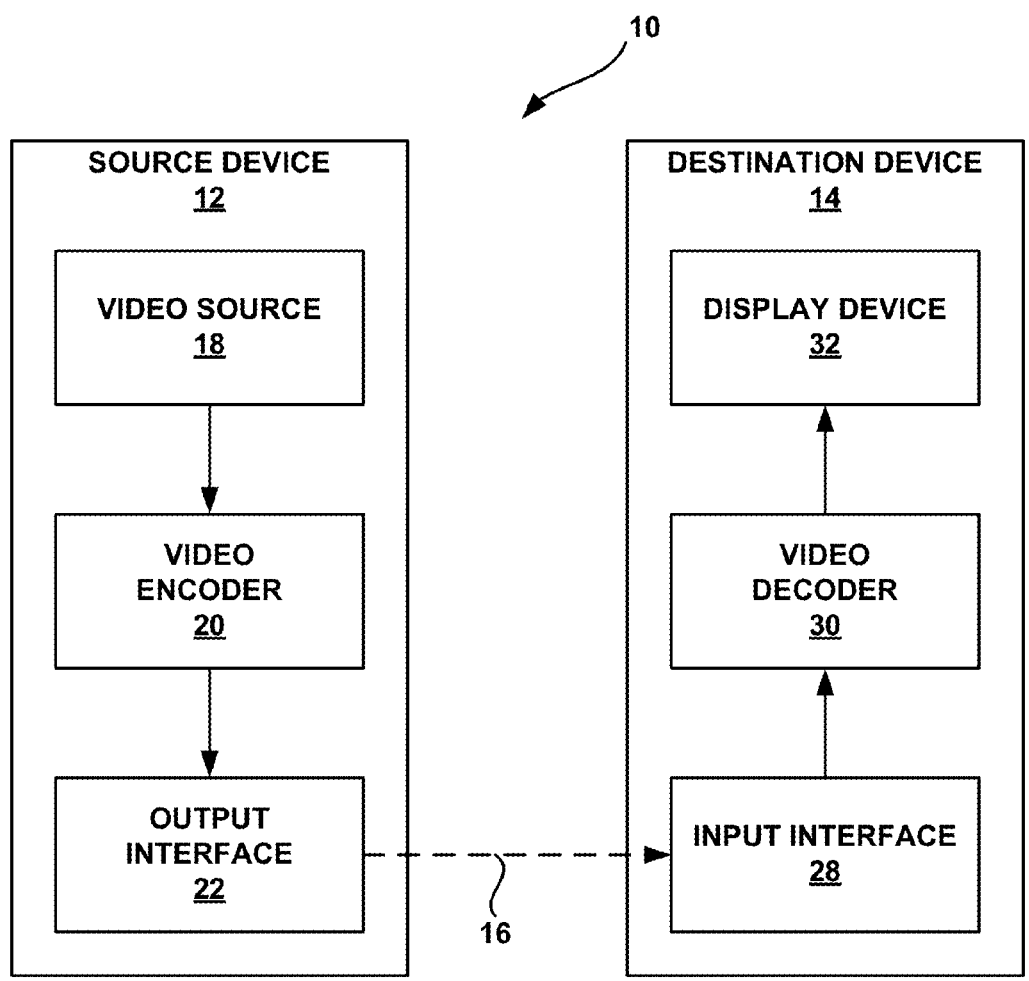
FIG. 1 is a block diagram illustrating an example video coding system that may utilize the techniques described in this disclosure.

This disclosure is related to three-dimensional 3D video coding based on advanced codecs, including depth coding techniques. The proposed coding techniques are related to controlling of motion prediction in 3D-HEVC, more specifically on depth coding.

High-Efficiency Video Coding (HEVC) is a newly-developed video coding standard. 3D-HEVC is an extension of HEVC for 3D video data. 3D-HEVC provides for multiple views of the same scene from different viewpoints. Part of the standardization efforts for 3D-HEVC includes the standardization of the multi-view video codec based on HEVC. In 3D-HEVC, inter-view prediction based on the reconstructed view components from different views is enabled.

In 3D-HEVC, inter-view motion prediction is similar to the motion compensation used in standard HEVC and may utilize the same or similar syntax elements. Merge mode, skip mode, and Advanced Motion Vector Prediction (AMVP) mode are example types of motion prediction. When a video coder performs inter-view motion prediction on a prediction unit (PU), the video coder may use, as a source of motion information (i.e., motion parameters), a picture that is in the same access unit as the PU, but in a different view. In contrast, other approaches to motion compensation may only use pictures in different access units as reference pictures. Thus, in 3D-HEVC, the motion parameters of a block in a dependent view may be predicted or inferred based on already-coded motion parameters in other views of the same access unit.

When a video coder performs motion prediction, the video coder may generate a candidate list (e.g., a merging candidate list or an AMVP candidate list) when the motion information of a current PU is signaled using merge mode, skip mode, or AMVP mode. To implement inter-view motion prediction in 3D-HEVC, the video coder may include inter-view predicted motion vector candidates (IPMVCs) in merging candidate lists and AMVP candidate lists. The video coder may use an IPMVC in the same manner as other candidates in a candidate list. An IPMVC may specify the motion information of a PU (i.e., a reference PU) in an inter-view reference picture. The inter-view reference picture may be in the same access unit as a current PU, but in a different view than the current PU.

In some examples, an IPMVC may specify the motion parameters (e.g., motion vectors, reference indices, etc.) of a plurality of sub-PUs of a current PU. In general, each sub-PU of a PU may be associated with a different equally-sized sub-block of a prediction block of the PU. For example, if a luma prediction block of a PU is 32×32 and the sub-PU size is 4×4, the video coder may partition the PU into 64 sub-PUs associated with different 4×4 sub-blocks of the luma prediction block of the PU. In this example, the sub-PUs may also be associated with the corresponding sub-blocks of chroma prediction blocks of the PU. Thus, the IPMVC may specify multiple sets of motion parameters. In such examples, if the IPMVC is the selected candidate in a candidate list, a video coder may determine a predictive block for the current PU based on the multiple sets of motion parameters specified by the IPMVC.

To determine an IPMVC that specifies the motion parameters of sub-PUs of the current PU, the video coder may process each of the sub-PUs according to a raster scan order. When the video coder processes a sub-PU (i.e., the current sub-PU), the video coder may determine, based on a disparity vector for the current PU, a reference block that corresponds to the sub-PU. The reference block may be in the same time instance as the current picture, but is in a different view than the current picture. If the reference block corresponding to the current sub-PU is coded using motion compensated prediction (e.g., the reference block has one or more motion vectors, reference indices, etc.), the video coder may set the motion parameters of the current sub-PU to the motion parameters of the reference block corresponding to the sub-PU. Otherwise, if the reference block corresponding to the current sub-PU is not coded using motion compensated prediction (e.g., the reference block is coded using intra prediction), the video coder may identify a nearest sub-PU, in the raster scan order, whose corresponding reference block is coded using motion compensated prediction. The video coder may then set the motion parameters of the current sub-PU to the motion parameters of the reference block corresponding to the identified sub-PU.

In some instances, the identified sub-PU occurs later in the raster scan order of the sub-PUs than the current sub-PU. Thus, when determining the motion parameters for the current sub-PU, the video coder may scan forward to find a sub-PU whose corresponding reference block is coded using motion compensated prediction. Alternatively, the video coder may delay determining the motion parameters of the current sub-PU until the video coder encounters, during the processing of the sub-PUs, a PU whose corresponding reference block is coded using motion compensated prediction. In either of these cases, additional complexity and coding delay is added.

In accordance with one or more techniques of this disclosure, a video coder may divide a current prediction unit (PU) into a plurality of sub-PUs. Each of the sub-PUs may have a size smaller than a size of the PU. Furthermore, the current PU may be in a depth view of the multi-view video data. For each respective sub-PU from the plurality of sub-PUs, the video coder may identify a reference block for the respective sub-PU. The reference block may be co-located with the respective sub-PU in a texture view corresponding to the depth view. The video coder may use motion parameters of the identified reference block for the respective sub-PU to determine motion parameters for the respective sub-PU In accordance with one or more techniques of this disclosure, a video coder may, for each respective sub-PU from a plurality of sub-PUs of a current PU in a depth view of multi-view video data, identify a reference block for the respective sub-PU. The identified reference block for the respective sub-PU is co-located with the respective sub-PU in a texture view corresponding to the depth view. When the identified reference block for the respective sub-PU is coded using temporal motion vectors, the video coder may use motion parameters of the identified reference block for the respective sub-PU as motion parameters for the respective sub-PU. In addition, the video coder may include a particular candidate in a candidate list of the current PU. In at least some examples, the particular candidate has the motion parameters of each of the sub-PUs of the current PU. When a selected candidate in the candidate list is the particular candidate, the video coder invokes motion compensation for each of the sub-PUs of the current PU. Rather than attempting to encode and decode each depth block using traditional coding techniques, techniques of the current disclosure use motion information already encoded or decoded for a texture block in the same view and access unit as the current depth block to encode or decode the current depth block. This may decrease the number of operations performed by a video coding device, thereby reducing power consumption and execution time.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Video decoder 30 may decode encoded video data. Display device 32 may display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In some instances, any bitstream conforming to the MVC-based 3DV extension of H.264/AVC always contains a sub-bitstream that is compliant to the MVC extension of H.264/AVC. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, and ITU-T H.264, ISO/IEC Visual.

In other examples, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 10" is described in Bross et al., "High Efficiency Video Coding (HEVC) text specification draft 10 (for FDIS & Consent)," Joint Collaborative Team on Video Coding (JCT-VC) of ITU-T SG16 WP3 and ISO/IEC JTC1/SC29/WG11, $12^{th}$ Meeting, Geneva, CH, January 2013 (hereinafter, "HEVC Working Draft 10" or the "HEVC base specification"). Furthermore, there are ongoing efforts to produce a scalable video coding extension for HEVC. The scalable video coding extension of HEVC may be referred to as SHEVC or SHVC.

Furthermore, a Joint Collaboration Team on 3D Video Coding (JCT-3V) of VCEG and MPEG is currently developing a multi-view coding extension of HEVC (i.e., MV-HEVC). Tech et al., "MV-HEVC Draft Text 4," Joint Collaborative Team on 3D Video Coding Extension Development of ITU-T SG 16 WP 3 and ISO/IEC JTC 1/SC 29/WG 11, 4nd Meeting: Incheon, KR, April 2013 (hereinafter, "MV-HEVC Test Model 4") is a draft of MV-HEVC. In MV-HEVC, there may only be high-level syntax (HLS) changes, such that no module at the CU or PU level in HEVC needs to be re-designed. This may allow modules configured for HEVC to be reused for MV-HEVC. In other words, MV-HEVC only provides for high-level syntax changes and not for low-level syntax changes, such as those at the CU/PU level.

In addition, the JCT-3V of VCEG and MPEG is developing a 3DV standard based on HEVC, for which part of the standardization efforts includes the standardization of the multi-view video codec based on HEVC (MV-HEVC) and another part for 3D video coding based on HEVC (3D-HEVC). For 3D-HEVC, new coding tools, including those in at the CU and/or PU level, for both texture and depth views may be included and supported. As of Dec. 17, 2013, software for 3D-HEVC (e.g., 3D-HTM) can be downloaded from the following link: [3D-HTM version 7.0]: https://hevc.hhi.fraunhofer.de/svn/svn_3DVCSoftware/tags/HTM-7.0/

A reference software description as well as the working draft of 3D-HEVC is available as follows: Gerhard Tech et al., "3D-HEVC Test Model 4," JCT3V-D1005_spec_v1, Joint Collaborative Team on 3D Video Coding Extension Development of ITU-T SG 16 WP 3 and ISO/IEC JTC 1/SC 29/WG 11, 4nd Meeting: Incheon, KR, April 2013 (hereinafter, "3D-HEVC Test Model 4"), which as of Dec. 17, 2013, is downloadable from the following link: http://phenix.it-sudparis.eu/jct2/doc_end_user/documents/2_Shanghai/wg11/JCT3V-B1005-v1.zip. Tech et al., "3D-HEVC Draft Text 3," Joint Collaborative Team on 3D Video Coding Extension Development of ITU-T SG 16 WP 3 and ISO/IEC JTC 1/SC 29/WG 11, 3rd Meeting: Geneva, CH, January 2013, document no. JCT3V-C1005 (hereinafter, "3D-HEVC Test Model 3"), which as of Dec. 17, 2013 is available from available from http://phenix.it-sudparis.eu/jct2/doc_end_user/current_document.php?id=706, is another version of the reference software description of 3D-HEVC. 3D-HEVC is also described in Tech et al., "3D-HEVC Draft Text 2," Joint Collaborative Team on 3D Video Coding Extension Development of ITU-T SG 16 WP 3 and ISO/IEC JTC 1/SC 29/WG 11, 6th Meeting: Geneva, CH, 25 Oct.-1 Nov. 2013, document no. JCT3V-F1001-v2 (hereinafter, "3D-HEVC Draft Text 2"). Video encoder 20 and video decoder 30 may operate according to SHEVC, MV-HEVC, and/or 3D-HEVC.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Figure 2:
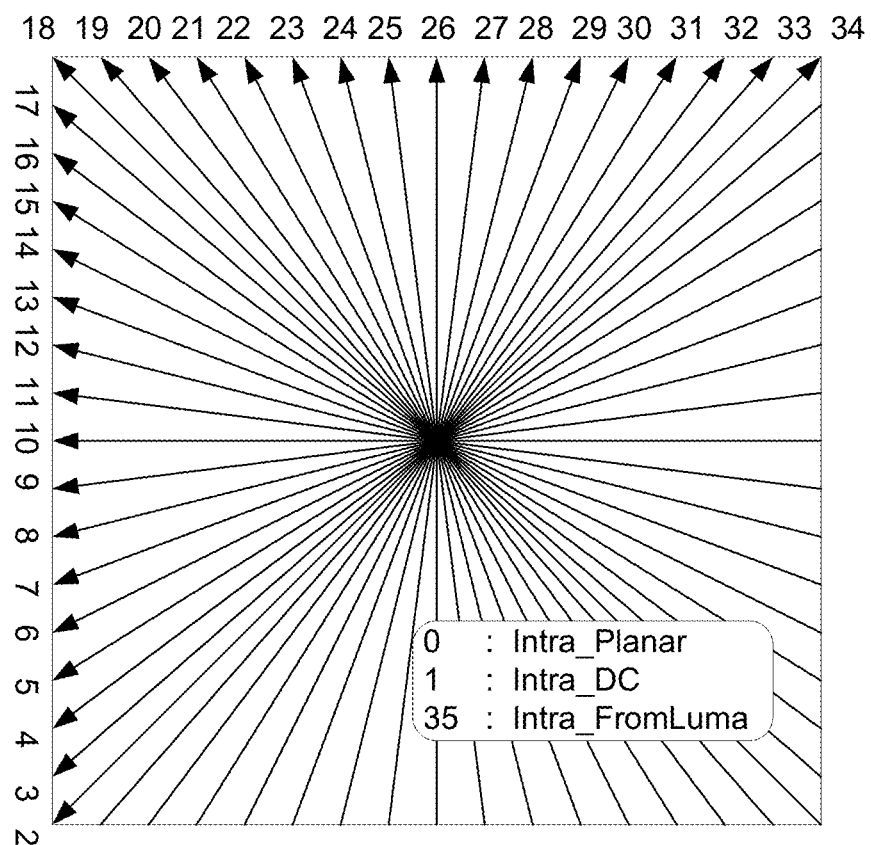
FIG. 2 is a conceptual diagram illustrating example intra prediction modes in High Efficiency Video Coding (HEVC).

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. In some versions of HEVC, for the luma component of each PU, an intra prediction method is utilized with 33 angular prediction modes (indexed from 2 to 34), DC mode (indexed with 1) and Planar mode (indexed with 0), as shown in FIG. 2. FIG. 2 is a conceptual diagram illustrating example intra prediction modes in HEVC.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform inter prediction, video encoder 20 may generate a first reference picture list (RefPicList0) for a current slice and may, in some instances, also generate a second reference picture list (RefPicList1) for the current slice. Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion vector indicating a spatial displacement between a sample block of the PU and the first reference location and a second motion vector indicating a spatial displacement between the prediction block of the PU and the second reference location.

Typically, reference picture list construction for the first or the second reference picture list (e.g., RefPicList0 or RefPicList1) of a B picture includes two steps: reference picture list initialization and reference picture list reordering (modification). The reference picture list initialization is an explicit mechanism that puts the reference pictures in the reference picture memory (also known as decoded picture buffer (DPB)) into a list based on the order of POC (Picture Order Count, aligned with display order of a picture) values. The reference picture list reordering mechanism can modify the position of a picture that was put in the list during the reference picture list initialization to any new position, or put any reference picture in the reference picture memory in any position even the picture does not belong to the initialized list. Some pictures after the reference picture list reordering (modification), may be put in a very further position in the list. However, if a position of a picture exceeds the number of active reference pictures of the list, the picture is not considered as an entry of the final reference picture list. The number of active reference pictures for each list may be signaled in a slice header. After the reference picture lists are constructed (namely RefPicList0 and RefPicList1, if available), a reference index to a reference picture list can be used to identify any reference picture included in the reference picture list.

After video encoder 20 generates predictive blocks (e.g., luma, Cb, and Cr blocks) for one or more PUs of a CU, video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, different types of NAL unit may encapsulate different RBSPs for video parameter sets (VPSs), sequence parameter sets (SPSs), picture parameter sets (PPSs), coded slices, supplemental enhancement information (SEI), and so on. NAL units that encapsulate RBSPs for video coding data (as opposed to RBSPs for parameter sets and SEI messages) may be referred to as video coding layer (VCL) NAL units.

In HEVC, SPSs may contain information that applies to all slices of a coded video sequence (CVS). A CVS may comprise a sequence of pictures. In HEVC, a CVS may start from an instantaneous decoding refresh (IDR) picture, or a broken link access (BLA) picture, or a clean random access (CRA) picture that is the first picture in the bitstream, including all subsequent pictures that are not an IDR or BLA picture. That is, in HEVC, a CVS may comprise a sequence of access units that may consist, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit. In HEVC, an access unit may be a set of NAL units that are consecutive in decoding order and contain exactly one coded picture. In addition to the coded slice NAL units of the coded picture, the access unit may also contain other NAL units not containing slices of the coded picture. In some examples, the decoding of an access unit always results in a decoded picture.

A VPS is a syntax structure comprising syntax elements that apply to zero or more entire CVSs. An SPS is also a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 may signal the motion information of a PU using merge mode or advanced motion vector prediction (AMVP) mode. For instance, in HEVC, there are two modes for the prediction of motion parameters, one being the merge mode and the other being AMVP. Motion prediction may comprise the determination of motion information of a block (e.g., a PU) based on motion information of one or more other blocks. The motion information (also referred to herein as motion parameters) of a PU may include motion vector(s) of the PU and reference index(es) of the PU.

When video encoder 20 signals the motion information of a current PU using merge mode, video encoder 20 generates a merge candidate list. In other words, video encoder 20 may perform a motion vector predictor list construction process. The merge candidate list includes a set of merge candidates that indicate the motion information of PUs that spatially or temporally neighbor the current PU. That is, in the merge mode, a candidate list of motion parameters (e.g., reference indexes, motion vectors, etc.) is constructed where a candidate can be from spatial and temporal neighboring blocks.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index into the candidate list. Video decoder 30 may obtain, from the bitstream, the index into the candidate list (i.e., a candidate list index). In addition, video decoder 30 may generate the same merge candidate list and may determine, based on the indication of the position of the selected merge candidate, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion vector for the current PU. In this way, at the decoder side, once the index is decoded, all motion parameters of the corresponding block where the index points may be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may determine, without use of residual data, a predictive block for the PU based on a reference block indicated by the motion information of a selected candidate in the merge candidate list.

AMVP mode is similar to merge mode in that video encoder 20 may generate a candidate list and may select a candidate from the candidate list. However, when video encoder 20 signals the RefPicListX motion information of a current PU using AMVP mode, video encoder 20 may signal a RefPicListX motion vector difference (MVD) for the current PU and a RefPicListX reference index for the current PU in addition to signaling a RefPicListX MVP flag for the current PU. The RefPicListX MVP flag for the current PU may indicate the position of a selected AMVP candidate in the AMVP candidate list. The RefPicListX MVD for the current PU may indicate a difference between a RefPicListX motion vector of the current PU and a motion vector of the selected AMVP candidate. In this way, video encoder 20 may signal the RefPicListX motion information of the current PU by signaling a RefPicListX motion vector predictor (MVP) flag, a RefPicListX reference index value, and a RefPicListX MVD. In other words, the data in the bitstream representing the motion vector for the current PU may include data representing a reference index, an index to a candidate list, and an MVD.

Furthermore, when the motion information of a current PU is signaled using AMVP mode, video decoder 30 may obtain, from the bitstream, a MVD for a current PU and a MVP flag. Video decoder 30 may generate the same AMVP candidate list and may determine, based on the MVP flag, the selected AMVP candidate. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

Figure 3:
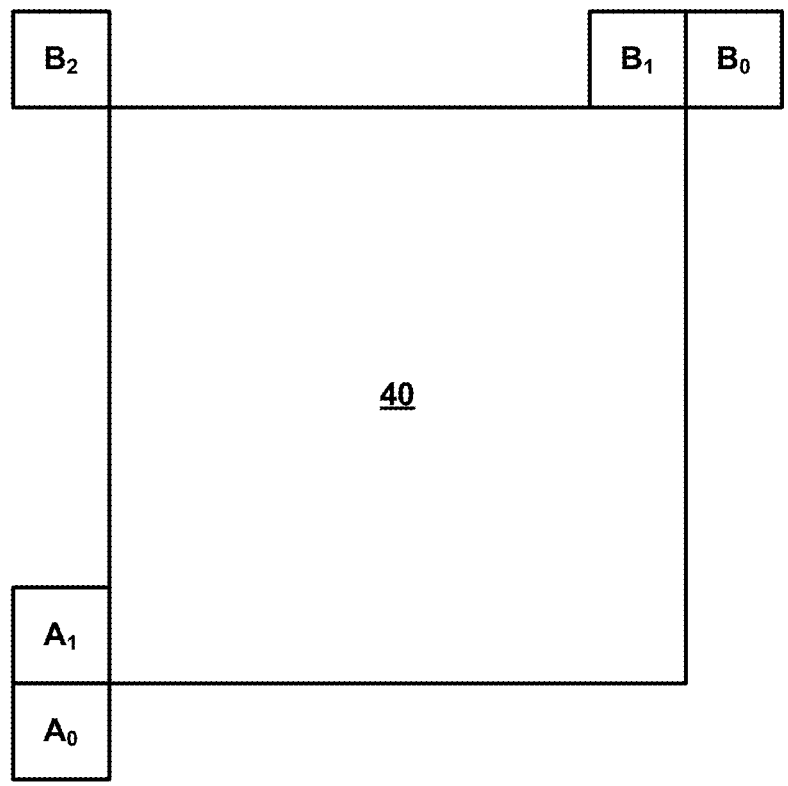
FIG. 3 is a conceptual diagram illustrating example spatially-neighboring blocks relative to a current block.

When video decoder 30 generates an AMVP candidate list for a current PU, video decoder 30 may derive one or more AMVP candidates based on the motion information of PUs (i.e., spatially-neighboring PUs) that cover locations that spatially neighbor the current PU. FIG. 3 is a conceptual diagram illustrating example spatially-neighboring PUs relative to a current block 40. In the example of FIG. 3, the spatially-neighboring PUs may be PUs that cover the locations indicated as $A_0$, $A_1$, $B_0$, $B_1$, and $B_2$. A PU may cover a location when a prediction block of the PU includes the location.

A candidate in a merge candidate list or an AMVP candidate list that is based on the motion information of a PU that temporally neighbors a current PU (i.e., a PU that is in a different time instance than the current PU) may be referred to as a temporal motion vector predictor. The use of a temporal motion vector prediction may be referred to as a temporal motion vector prediction (TMVP). TMVP may be used to improve the coding efficiency of HEVC and, different from other coding tools, TMVP may need to access the motion vector of a frame in a decoded picture buffer, more specifically in a reference picture list.

TMVP may be enabled or disabled on a CVS-by-CVS basis, a slice-by-slice basis, or on another basis. A syntax element (e.g., sps_temporal_mvp_enable_flag) in a SPS may indicate whether the use of TMVPs is enabled for a CVS. Furthermore, when TMVP is enabled for a CVS, TMVP may be enabled or disabled for particular slices within the CVS. For instance, a syntax element (e.g., slice_temporal_mvp_enable_flag) in a slice header may indicate whether TMVP is enabled for a slice. Thus, in an inter predicted slice, when TMVP is enabled for a whole CVS (e.g., sps_temporal_mvp_enable_flag in a SPS is set to 1), a slice_temporal_mvp_enable_flag is signaled in the slice header to indicate whether TMVP is enabled for the current slice.

To determine a temporal motion vector predictor, a video coder may firstly identify a reference picture that includes a PU that is co-located with the current PU. In other words, the video coder may identify a so-called "co-located picture." If the current slice of the current picture is a B slice (i.e., a slice that is allowed to include bi-directionally inter predicted PUs), video encoder 20 may signal, in a slice header, a syntax element (e.g., collocated_from_l0_flag) that indicates whether the co-located picture is from RefPicList0 or RefPicList1. In other words, when TMVP is enabled for a current slice, and the current slice is a B slice (e.g., a slice that is allowed to include bi-directionally inter predicted PUs), video encoder 20 may signal a syntax element (e.g., collocated_from_l0_flag) in a slice header to indicate whether the co-located picture is in RefPicList0 or RefPicList1.

A syntax element (e.g., collocated_ref_idx) in a slice header may indicate a co-located picture in the identified reference picture list. Thus, after video decoder 30 identifies the reference picture list that includes the co-located picture, video decoder 30 may use collocated_ref_idx, which may be signaled in a slice header, to identify the co-located picture in the identified reference picture list. The video coder may identify a co-located PU by checking the co-located picture. The temporal motion vector predictor may indicate either the motion information of a right-bottom PU a co-located PU, or the motion information of a center PU of the co-located PU.

When motion vectors identified by the above process (i.e., motion vectors of a temporal motion vector predictor) are used to generate a motion candidate for merge mode or AMVP mode, the video coder may scale the motion vectors based on the temporal location (reflected by POC value). For instance, a video coder may increase the magnitude of a motion vector by greater amounts when a difference between the POC values of a current picture and a reference picture is greater than when a difference between the POC values of the current picture and the reference picture is less.

The target reference index of all possible reference picture lists for the temporal merging candidate derived from a temporal motion vector predictor may be always set to 0. However, for AMVP, the target reference index of all possible reference pictures may be set equal to a decoded reference index. In other words, the target reference index of all possible reference picture lists for the temporal merging candidate derived from TMVP is always set to 0 while for AMVP, the temporal merging candidate may be set equal to the decoded reference index. In HEVC, a SPS may include a flag (e.g., sps_temporal_mvp_enable_flag) and the slice header may include a flag (e.g., pic_temporal_mvp_enable_flag) when sps_temporal_mvp_enable_flag is equal to 1. When both pic_temporal_mvp_enable_flag and a temporal_id are equal to 0 for a particular picture, no motion vector from pictures before that particular picture in decoding order are used as a temporal motion vector predictor in decoding of the particular picture or a picture after the particular picture in decoding order.

The techniques of this disclosure are potentially applicable to multi-view coding and/or 3DV standards and specifications, including MV-HEVC and 3D-HEVC. In multi-view coding, such as that defined in MV-HEVC and 3D-HEVC, there may be multiple views of the same scene from different viewpoints. In the context of multi-view coding, the term "access unit" may be used to refer to the set of pictures that correspond to the same time instance. In some instances, in the context of multi-view coding, an access unit may be a set of NAL units that are associated with each other according to a specified classification rule, are consecutive in decoding order, and contain the VCL NAL units of all coded pictures associated with the same output time and their associated non-VCL NAL units. Thus, video data may be conceptualized as a series of access units occurring over time.

In 3DV coding, such as that defined in 3D-HEVC, a "view component" may be a coded representation of a view in a single access unit. A view component may contain a depth view component and a texture view component. A depth view component may be a coded representation of the depth of a view in a single access unit. A texture view component may be a coded representation of the texture of a view in a single access unit. In this disclosure, a "view" may refer to a sequence of view components associated with the same view identifier.

The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component means that the texture view component and the depth view component are co-located. In other words. the texture view component and the depth view component are part of the same view and the same access unit.

The texture view component includes the actual image content that is displayed. For example, the texture view component may include luma (Y) and chroma (Cb and Cr) components. The depth view component may indicate relative depths of the pixels in its corresponding texture view component. As one example, the depth view component is a gray scale image that includes only luma values. In other words, the depth view component may not convey any image content, but rather provide a measure of the relative depths of the pixels in the texture view component.

For example, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a very gray pixel in the depth view component indicates that its corresponding pixel in the texture view component is further away than a slightly gray pixel in the depth view component. Because only gray scale is needed to identify the depth of pixels, the depth view component need not include chroma components, as color values for the depth view component may not serve any purpose.

The depth view component using only luma values (e.g., intensity values) to identify depth is provided for illustration purposes and should not be considered limiting. In other examples, any technique may be utilized to indicate relative depths of the pixels in the texture view component.

In multi-view coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list (e.g., RefPicList0 or RefPicList1) if the picture is in a different view but within a same time instance (i.e., access unit) as the picture that the video coder is currently coding. Like other inter prediction reference pictures, the video coder may insert an inter-view prediction reference picture at any position of a reference picture list.

Multi-view coding supports inter-view prediction. Inter-view prediction is similar to the inter prediction used in H.264/AVC, HEVC, or other video coding specifications and may use the same syntax elements. However, when a video coder performs inter-view prediction on a current block (such as a macroblock, CU, or PU), video encoder 20 may use, as a reference picture, a picture that is in the same access unit as the current block, but in a different view. In other words, in multi-view coding, inter-view prediction is performed among pictures captured in the different views of the same access unit (i.e., within the same time instance) to remove correlation between views. In contrast, conventional inter prediction only uses pictures in different access units as reference pictures.

Figure 4:
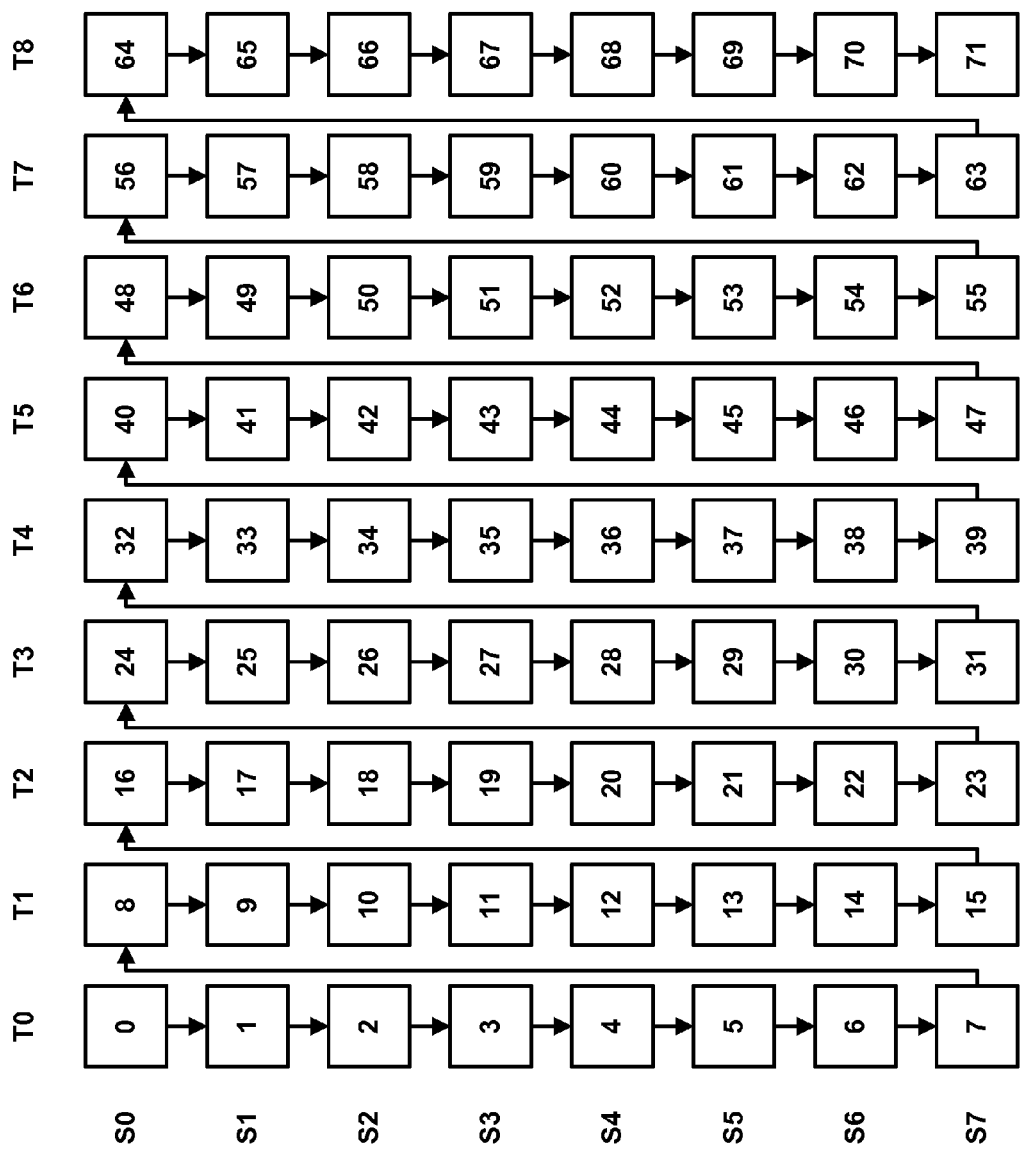
FIG. 4 is a conceptual diagram illustrating an example multi-view decoding order.

FIG. 4 is a conceptual diagram illustrating an example multi-view decoding order. The multi-view decoding order may be a bitstream order. In the example of FIG. 4, each square corresponds to a view component. Columns of squares correspond to access units. Each access unit may be defined to contain the coded pictures of all the views of a time instance. Rows of squares correspond to views. In the example of FIG. 4, the access units are labeled T0 . . . T8 and the views are labeled S0 . . . S7. Because each view component of an access unit is decoded before any view component of the next access unit, the decoding order of FIG. 4 may be referred to as time-first coding. The decoding order of access units may not be identical to the output or display order of the views.

Figure 5:
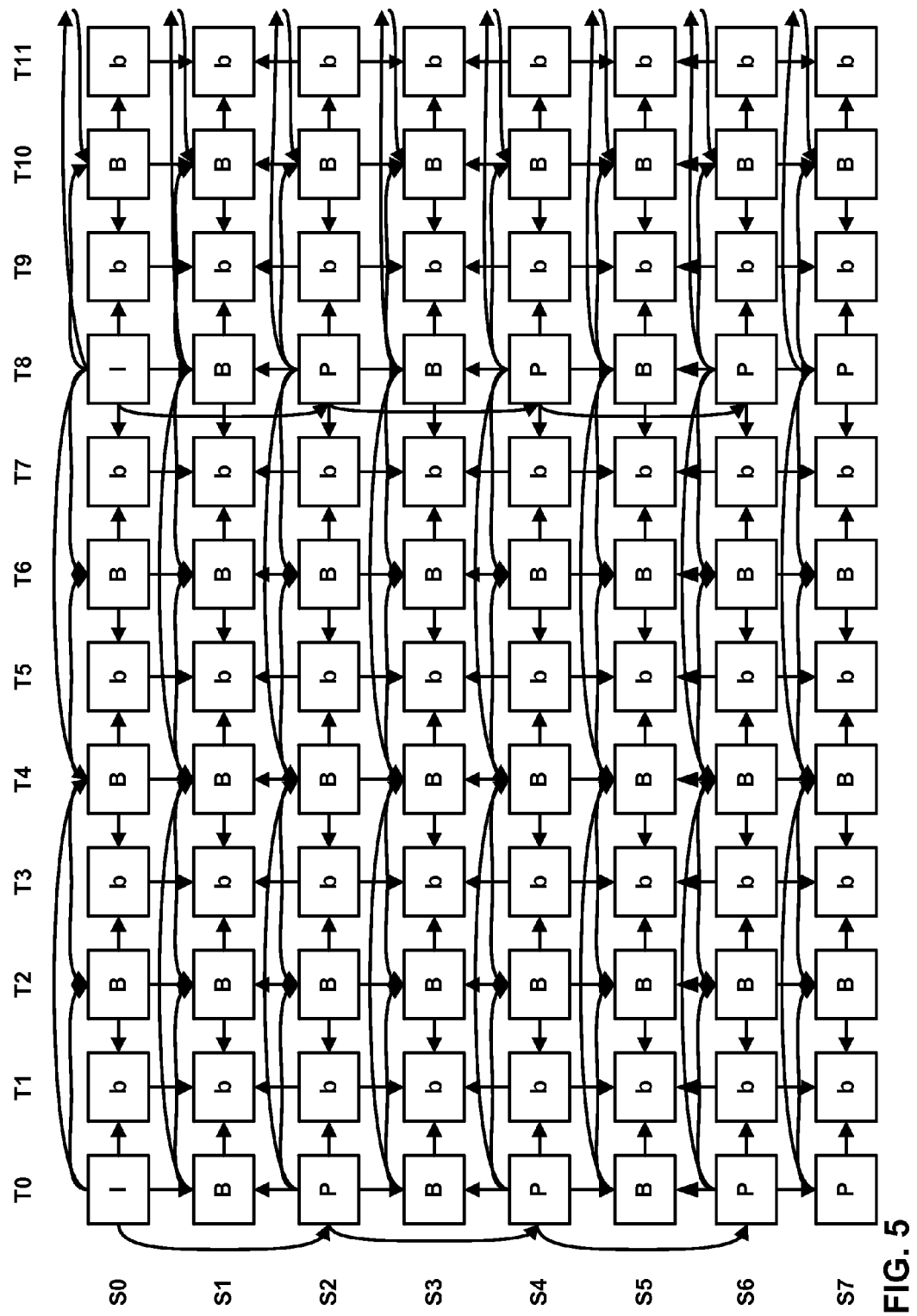
FIG. 5 is a conceptual diagram illustrating an example prediction structure for multi-view coding.

FIG. 5 is a conceptual diagram illustrating an example prediction structure for multi-view coding. The multi-view prediction structure of FIG. 5 includes temporal and inter-view prediction. In the example of FIG. 5, each square corresponds to a view component. In the example of FIG. 5, the access units are labeled T0 . . . T11 and the views are labeled S0 . . . S7. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 5, view components in different views of the same access unit may be available as reference pictures. The use of one view component of an access unit as a reference picture for another view component of the same access unit may be referred to as inter-view prediction.

In multi-view coding, such as the MVC extension of H.264/AVC, inter-view prediction is supported by disparity motion compensation, which uses the syntax of the H.264/AVC motion compensation, but allows a picture in a different view to be used as a reference picture. Coding of two views may also be supported by the MVC extension of H.264/AVC. One of the advantages of the MVC extension of H.264/AVC is that an MVC encoder may take more than two views as a 3D video input and an MVC decoder may decode such a multi-view representation. Consequently, any renderer with a MVC decoder may expect 3D video contents with more than two views.

In the context of multi-view video coding, such as that defined in MV-HEVC and 3D-HEVC, there are two kinds of motion vectors. One kind of motion vector is a normal motion vector that points to a temporal reference picture. The type of inter prediction corresponding to a normal, temporal motion vector may be referred to as "motion-compensated prediction" or "MCP." When an inter-view prediction reference picture is used for motion compensation, the corresponding motion vector is referred to as a "disparity motion vector." In other words, a disparity motion vector points to a picture in a different view (i.e., an inter-view reference picture). The type of inter prediction corresponding to a disparity motion vector may be referred to as "disparity-compensated prediction" or "DCP."

3D-HEVC may improve coding efficiency using inter-view motion prediction and inter-view residual prediction. In other words, to further improve the coding efficiency, two new technologies namely "inter-view motion prediction" and "inter-view residual prediction" have been adopted in reference software. In inter-view motion prediction, a video coder may determine (i.e., predict) the motion information of a current PU based on the motion information of a PU in a different view than the current PU. In inter-view residual prediction, a video coder may determine residual blocks of a current CU based on residual data in a different view than the current CU.

To enable inter-view motion prediction and inter-view residual prediction, a video coder may determine disparity vectors for blocks (e.g., PUs, CUs, etc.). In other words, to enable these two coding tools, the first step is to derive a disparity vector. In general, a disparity vector is used as an estimator of the displacement between two views. A video coder may use a disparity vector for a block either to locate a reference block in another view for inter-view motion or residual prediction, or the video coder may convert the disparity vector to a disparity motion vector for inter-view motion prediction. That is, the disparity vector may be used to either locate the corresponding block in the other view for inter-view motion/residual prediction or may be converted to a disparity motion vector for inter-view motion prediction.

In some examples, the video coder may use the method of Neighboring Blocks Based Disparity Vector (NBDV) derivation to derive the disparity vector for a PU (i.e., the current PU). For instance, to derive a disparity vector for the current PU, a process called NBDV derivation may be used in a test model for 3D-HEVC (i.e., 3D-HTM).

The NBDV derivation process uses disparity motion vectors from spatial and temporal neighboring blocks to derive the disparity vector for the current block. Because neighboring blocks (e.g., blocks that spatially or temporally neighbor a current block) are likely to share almost the same motion and disparity information in video coding, the current block can use the motion vector information in the neighboring blocks as a predictor of the disparity vector of the current block. Thus, the NBDV derivation process uses the neighboring disparity information for estimating the disparity vector in different views.

In the NBDV derivation process, the video coder may check, in a fixed checking order, motion vectors of spatially-neighboring and temporally-neighboring PUs. When the video coder checks the motion vector(s) of a spatially-neighboring or temporally-neighboring PU, the video coder may determine whether the motion vector(s) are disparity motion vectors. A disparity motion vector of a PU of a picture is a motion vector pointing to a location within an inter-view reference picture of the picture. An inter-view reference picture of a picture may be a picture that is in the same access unit as the picture, but in a different view. When the video coder identifies a disparity motion vector or an implicit disparity vector (IDV), the video coder may terminate the checking process. An IDV may be a disparity vector of a spatially- or temporally-neighboring PU that is coded using inter-view prediction. An IDV may be generated when a PU employs inter-view motion vector prediction, i.e., the candidate for AMVP or merge modes is derived from a reference block in the other view with the help of a disparity vector. An IDV may be stored to the PU for the purpose of disparity vector derivation. Furthermore, when the video coder identifies a disparity motion vector or an IDV, the video coder may return the identified disparity motion vector or IDV.

IDVs were included with a simplified version of the NBDV derivation process in Sung et al., "3D-CE5.h: Simplification of disparity vector derivation for HEVC-based 3D video coding, document JCTV3-A0126." The use of IDVs in the NBDV derivation process was further simplified in Kang et al., "3D-CE5.h related: improvements for disparity vector derivation," document JCT3V-B0047, by removing the IDVs stored in the decoded picture buffer and also providing improved coding gain with a random access point (RAP) picture selection. The video coder may convert the returned disparity motion vector or IDV to a disparity vector and may use the disparity vector for inter-view motion prediction and inter-view residual prediction.

In some designs of 3D-HEVC, when the video coder performs the NBDV derivation process, the video coder checks disparity motion vectors in the temporal neighboring blocks, disparity motion vectors in the spatial neighboring blocks, and then the IDVs in order. Once the video coder finds a disparity motion vector for the current block, the video coder may terminate the NBDV derivation process. Thus, once a disparity motion vector or an IDV is identified, the checking process is terminated and the identified disparity motion vector is returned and converted to the disparity vector which will be used in inter-view motion prediction and inter-view residue prediction. When the video coder is unable to determine a disparity vector for the current block by performing the NBDV derivation process (i.e., when there is no disparity motion vector or IDV found during the NBDV derivation process), the video coder may mark the NBDV as unavailable.

In some examples, if the video coder is unable to derive a disparity vector for the current PU (i.e., if no disparity vector is found) by performing the NBDV derivation process, the video coder may use a zero disparity vector as the disparity vector for the current PU. The zero disparity vector is a disparity vector having both horizontal and vertical components equal to 0. Thus, even when the NBDV derivation process returns an unavailable result, other coding processes of the video coder that require a disparity vector may use a zero disparity vector for the current block.

In some examples, if the video coder is unable to derive a disparity vector for the current PU by performing the NBDV derivation process, the video coder may disable inter-view residual prediction for the current PU. However, regardless of whether the video coder is able to derive a disparity vector for the current PU by performing the NBDV derivation process, the video coder may use inter-view motion prediction for the current PU. That is, if no disparity vector is found after checking all the pre-defined neighboring blocks, a zero disparity vector may be used for inter-view motion prediction while inter-view residual prediction may be disabled for the corresponding PU.

As mentioned above, the video coder may check spatially-neighboring PUs as part of the process of determining the disparity vector for the current PU. In some examples, the video coder checks the following spatially-neighboring blocks: the below-left spatially-neighboring block, the left spatially-neighboring block, the above-right spatially-neighboring block, the above spatially-neighboring block, and the above-left spatially-neighboring block. For instance, in some versions of the NBDV derivation process, five spatial neighboring blocks are used for disparity vector derivation. The five spatially-neighboring blocks may cover the locations $A_0$, $A_1$, $B_0$, $B_1$, and $B_2$, respectively, as indicated in FIG. 3. The video coder may check the five spatially-neighboring blocks in the order of $A_1$, $B_1$, $B_0$, $A_0$, and $B_2$. The same five spatially-neighboring blocks may be used in merge modes for HEVC. Therefore, in some examples, no additional memory access is required. If one of the spatially-neighboring blocks has a disparity motion vector, the video coder may terminate the checking process and the video coder may use the disparity motion vector as the final disparity vector for the current PU. In other words, if one of them uses a disparity motion vector, the checking process is terminated and the corresponding disparity motion vector will be used as the final disparity vector.

Furthermore, as mentioned above, the video coder may check temporally-neighboring PUs as part of the process to determine the disparity vector for the current PU. For checking temporal neighboring blocks (e.g., PUs), a construction process of a candidate picture list may be performed first. In some examples, the video coder may check up to two reference pictures from the current view for disparity motion vectors. The first reference picture may be the co-located picture. Thus, the co-located picture (i.e., the co-located reference picture) may be first inserted into the candidate picture list. The second reference picture may be a random access picture or a reference picture with a smallest POC value difference and a smallest temporal identifier. In other words, up to two reference pictures from the current view, the co-located picture and the random-access picture or the reference picture with the smallest POC difference and smallest temporal ID are considered for temporal block checks. The video coder may check the random-access picture first, followed by the co-located picture.

Figure 6:
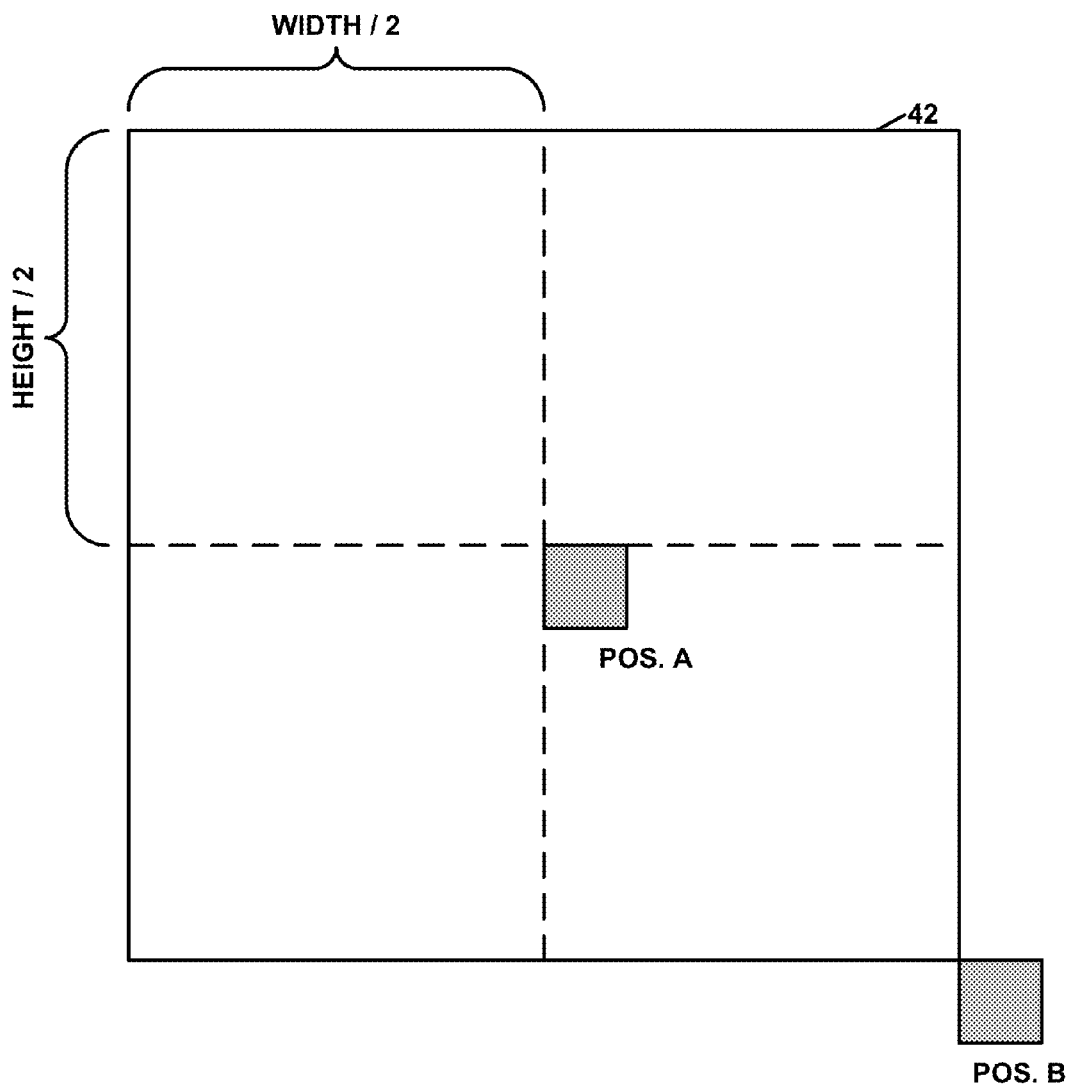
FIG. 6 is a conceptual diagram illustrating example temporal neighboring blocks in Neighboring Blocks Based Disparity Vector (NBDV) derivation.

For each candidate picture (i.e., the random-access picture and the co-located picture), the video coder may check two blocks. In particular, the video coder may check a center block (CR) and a bottom-right block (BR). FIG. 6 is a conceptual diagram illustrating example temporal neighboring blocks in the NBDV derivation process. The center block may be the center 4×4 block of a co-located region of the current PU. The bottom-right block may be the bottom-right 4×4 block of a co-located region of the current PU. Thus, for each candidate picture, the two blocks are checked in order, CR and BR for the first non-base view or BR, CR for the second non-base view. If one of the PUs covering CR or BR has a disparity motion vector, the video coder may terminate the checking process and may use the disparity motion vector as the final disparity vector for the current PU. In this example, decoding of pictures associated with the first non-base view may depend on decoding of pictures associated with a base view, but not pictures associated with other views. Furthermore, in this example, decoding of pictures associated with the second non-base view may depend on decoding of pictures associated with the base view and, in some instances, the first non-base view, but not pictures associated with other views, if present.

In the example of FIG. 6, a block 42 indicates a co-located region for a current PU. Furthermore, in the example of FIG. 6, the block labeled "Pos. A" corresponds to the center block. The block labeled "Pos. B" corresponds to the bottom-right block. As indicated in the example of FIG. 6, the center block may be located immediately below and to the right of the center of a center point of the co-located region.

When the video coder checks a neighboring PU (i.e., a spatially- or temporally-neighboring PU), the video coder may check first whether the neighboring PU has a disparity motion vector. If the none of the neighboring PUs has a disparity motion vector, the video coder may determine whether any of the spatially-neighboring PUs have an IDV. In other words, whether disparity motion vectors are used is firstly checked for all the spatial/temporal neighboring blocks, followed by IDVs. Spatial neighboring blocks are firstly checked, followed by temporal neighboring blocks. When checking neighboring blocks for IDVs, the video coder may check the spatially-neighboring PUs in the order of $A_0, A_1, B_0, B_1$, and $B_2$. If one of the spatially-neighboring PUs has an IDV and the IDV is coded as merge/skip mode, the video coder may terminate the checking process and may use the IDV as the final disparity vector for the current PU. In other words, five spatial neighboring blocks are checked in the order of $A_0, A_1, B_0, B_1$ and $B_2$. If one of them uses a IDV and it may be coded as skip/merge mode, the checking process is terminated and the corresponding IDV may be used as the final disparity vector.

As indicated above, the disparity vector for a current block may indicate a location in a reference picture (i.e., a reference view component) in a reference view. In some 3D-HEVC designs, the video coder is allowed to access depth information for the reference view. In some such 3D-HEVC designs, when the video coder uses the NBDV derivation process to derive the disparity vector for the current block, the video coder may apply a refinement process to refine the disparity vector for the current block further. The video coder may refine the disparity vector for the current block based on the reference picture's depth map. In other words, the disparity vector, generated from the NBDV scheme could be further refined using the information in the coded depth map. That is, the accuracy of the disparity vector could be enhanced by taking advantage of the information coded in a base view depth map. This refinement process may be referred to herein as NBDV refinement ("NBDV-R"), the NBDV refinement process, or depth-oriented NBDV (Do-NBDV).

When the NBDV derivation process returns an available disparity vector (e.g., when the NBDV derivation process returns a variable that indicates that the NBDV derivation process was able to derive a disparity vector for the current block based on a disparity motion vector or an IDV of a neighboring block), the video coder may further refine the disparity vector by retrieving depth data from the reference view's depth map. In some examples, the refinement process includes the following steps:

1. Use the disparity vector of the current block to locate a block in the reference view's depth map. In other words, locate a corresponding depth block by the derived disparity vector in the previously-coded reference depth view, such as the base view. In this example, the size of the corresponding block in the depth may be the same as the size of the current PU (i.e., a size of a prediction block of the current PU).
2. A disparity vector is calculated from the collocated depth block, from the maximum value of the four corner depth values. This is set equal to the horizontal component of a disparity vector, while the vertical component of the disparity vector is set to 0.

In some examples, when the NBDV derivation process does not return an available disparity vector (e.g., when the NBDV derivation process returns a variable that indicates that the NBDV derivation process was unable to derive a disparity vector for the current block based on a disparity motion vector or an IDV of a neighboring block), the video coder does not perform the NBDV refinement process and the video coder may use, as the disparity vector for the current block, the zero disparity vector. In other words, when NBDV derivation process does not provide an available disparity vector, and thus the result of NBDV derivation process is unavailable, the above NBDV-R process is skipped and a zero disparity vector is directly returned.

In some proposals for 3D-HEVC, the video coder uses a refined disparity vector for a current block for inter-view motion prediction while the video coder uses an unrefined disparity vector for the current block for inter-view residual prediction. For example, the video coder may use the NBDV derivation process to derive an unrefined disparity vector for the current block. The video coder may then apply the NBDV refinement process to derive a refined disparity vector for the current block. The video coder may use the refined disparity vector for the current block for determining motion information of the current block. Moreover, the video coder may use the unrefined disparity vector for the current block for determining a residual block of the current block.

In this way, this new disparity vector is called as "depth oriented neighboring block based disparity vector (DoN-BDV)". The disparity vector from the NBDV scheme is then replaced by this newly derived disparity vector from the DoNBDV scheme for inter-view candidate derivation for the AMVP and merge modes. The video coder may use the unrefined disparity vector for inter-view residual prediction.

The video coder may use a similar refinement process to refine a disparity motion vector for backward view synthesis prediction (BVSP). In this way, the depth can be used to refine the disparity vector or disparity motion vector to be used for BVSP. The refined disparity vector may be stored as the motion vector of one PU if the refined disparity vector is coded with BVSP mode.

A video coder may perform BVSP to synthesize a view component. A BVSP approach was proposed in Tian et al., "CE1.h: Backward View Synthesis Prediction Using Neighboring Blocks," document JCT3V-C0152 (hereinafter, "JCT3V-C0152") and was adopted in the third JCT-3V meeting. BVSP is conceptually similar to block-based VSP in 3D-AVC. In other words, the basic idea of backward-warping VSP is the same as the block-based VSP in 3D-AVC. Both BVSP and block-based VSP in 3D-AVC use backward warping and block-based VSP to avoid transmitting motion vector differences and to use more precise motion vectors. However, implementation details may be different due to different platforms.

In some versions of 3D-HEVC, texture first coding is applied. In texture first coding, a video coder codes (e.g., encodes or decodes) a texture view component prior to coding the corresponding depth view component (i.e., the depth view component having the same POC value and view identifier as the texture view component). Therefore, a non-base view depth view component is unavailable for use in coding a corresponding a non-base view texture view component. In other words, when a video coder codes a non-base texture view component, the corresponding non-base depth view component is unavailable. Therefore, the depth information may be estimated and used to perform BVSP.

Figure 7:
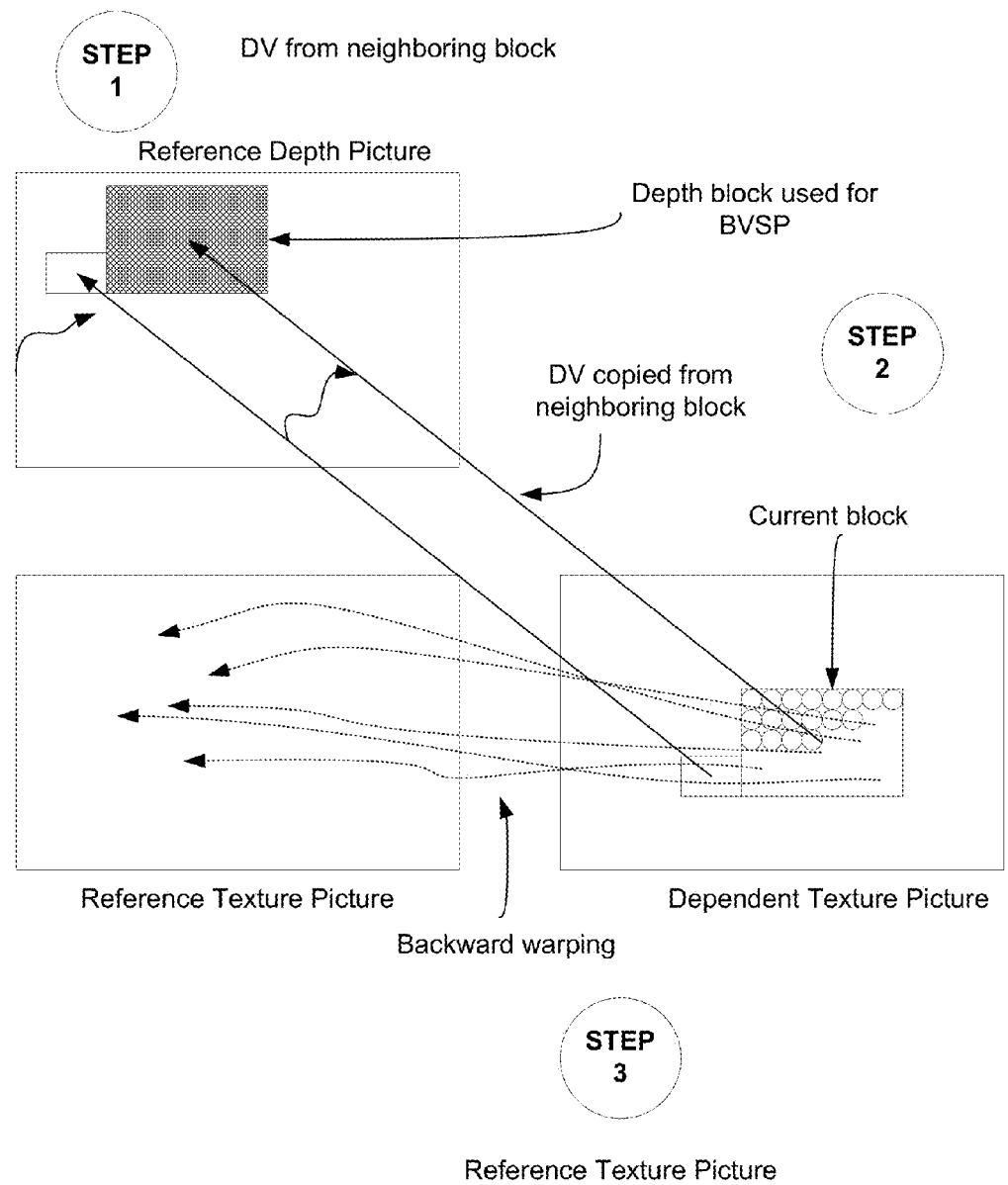
FIG. 7 is a conceptual diagram illustrating depth block derivation from a reference view to perform backward view synthesis prediction (BVSP).

In order to estimate the depth information for a block, it is proposed to first derive a disparity vector from the neighboring blocks, and then use the derived disparity vector to obtain a depth block from a reference view. In 3D-HEVC Test Model 5.1 (i.e., the HTM 5.1 test model), there exists a process to derive a disparity vector predictor, known as the NBDV derivation process. Let $(dv_x, dv_y)$ denote the disparity vector identified from the NBDV derivation process, and the current block position is $(block_x, block_y)$. The video coder may fetch a depth block at $(block_x+dv_x, block_y+dv_y)$ in the depth image of the reference view. The fetched depth block may have the same size as the current PU. The video coder may then use the fetched depth block to do backward warping for the current PU. FIG. 7 is a conceptual diagram illustrating depth block derivation from a reference view to perform BVSP. FIG. 7 illuminates the three steps how a depth block from the reference view is located and then used for BVSP prediction.

If BVSP is enabled in the sequence, the NBDV derivation process for inter-view motion prediction may be changed and the differences are shown in bold in the following paragraphs:

For each of the temporal neighboring blocks, if the temporal neighboring block uses a disparity motion vector, the disparity motion vector is returned as the disparity vector and it is further refined with the method described elsewhere in this disclosure.

For each of the spatial neighboring blocks, the following apply:

For each reference picture list 0 or reference picture list 1, the following apply:

If the spatial neighboring block uses a disparity motion vector, the disparity motion vector is returned as the disparity vector and it is further refined with the method described elsewhere in this disclosure.

Otherwise, if the spatial neighboring block uses BVSP mode, the associated motion vector may be returned as the disparity vector. The disparity vector may be further refined in a similar way as described elsewhere in this disclosure. However, the maximum depth value may be selected from all pixels of the corresponding depth block rather than four corner pixels.

For each of the spatial neighboring blocks, if the spatial neighboring block uses an IDV, the IDV is returned as the disparity vector. The video coder may further refine the disparity vector using one or more of the methods described elsewhere in this disclosure.

The video coder may treat the BVSP mode described above as a special inter-coded mode and the video coder may maintain a flag of indicating the usage of BVSP mode for each PU. Rather than signaling the flag in the bit stream, the video coder may add a new merging candidate (BVSP merging candidate) to a merge candidate list and the flag is dependent on whether a decoded merge candidate index corresponds to a BVSP merging candidate. In some examples, the BVSP merging candidate is defined as follows:

Reference picture index for each reference picture list: −1

Motion vector for each reference picture list: the refined disparity vector

In some examples, the insertion position of a BVSP merging candidate is dependent on the spatial neighboring blocks. For example, if any of the five spatial neighboring blocks ($A_0, A_1, B_0, B_1$ or $B_2$) is coded with the BVSP mode, i.e., the maintained flag of the neighboring block is equal to 1, the video coder may treat the BVSP merging candidate as the corresponding spatial merging candidate and may insert the BVSP merging candidate into the merge candidate list. The video coder may only insert the BVSP merging candidate into the merge candidate list once. Otherwise, in this example, (e.g., when none of the five spatial neighboring blocks are coded with the BVSP mode), the video coder may insert the BVSP merging candidate into the merge candidate list immediate before any temporal merging candidates. During a combined bi-predictive merging candidate derivation process, the video coder may check additional conditions to avoid including the BVSP merging candidate.

For each BVSP-coded PU, the video coder may further partition the BVSP into several sub-regions with the size equal to K×K (wherein K may be 4 or 2). The size of the BVSP-coded PU may be denoted by N×M. For each sub-region, the video coder may derive a separate disparity motion vector. Furthermore, the video coder may predict each sub-region from one block located by the derived disparity motion vector in the inter-view reference picture. In other words, the size of motion-compensation unit for BVSP coded PUs are set to K×K. In some test conditions, K is set to 4.

With regard to BVSP, the video coder may perform the following disparity motion vector derivation process. For each sub-region (4×4 block) within one PU coded with BVSP mode, the video coder may firstly locate a corresponding 4×4 depth block in the reference depth view with the refined disparity vector mentioned above. Secondly, the video coder may select the maximum value of the sixteen depth pixels in the corresponding depth block. Thirdly, the video coder may convert the maximum value to the horizontal component of a disparity motion vector. The video coder may set the vertical component of the disparity motion vector to 0.

Based on the disparity vector derived from the DoNBDV techniques, the video coder may add a new motion vector candidate (i.e., an Inter-view Predicted Motion Vector Candidate (IPMVC)), if available, to AMVP and skip/merge modes. The IPMVC, if available, is a temporal motion vector. Since skip mode has the same motion vector derivation process as merge mode, techniques described in this document may apply to both merge and skip modes.

For the merge/skip mode, the IPMVC may be derived by the following steps. First, the video coder may locate, using the disparity vector, a corresponding block of the current block (e.g., a PU, a CU, etc.) in a reference view of the same access unit. Second, if the corresponding block is not intra-coded and not inter-view predicted and a reference picture of the corresponding block has a POC value equal to that of one entry in the same reference picture list of the current block, the video coder may convert the reference index of the corresponding block based on POC values. Furthermore, the video coder may derive the IPMVC to specify the prediction direction of the corresponding block, the motion vectors of the corresponding block, and the converted reference indices.

Section H.8.5.2.1.10 of 3D-HEVC Test Model 4 describes a derivation process for a temporal inter-view motion vector candidate. An IPMVC may be referred to as a temporal inter-view motion vector candidate because it indicates a location in a temporal reference picture. As described in section H.8.5.2.1.10 of 3D-HEVC Test Model 4, a reference layer luma location (xRef, yRef) is derived by:

$$xRef=Clip3(0,PicWidthInSamples_L-1,xP+((nPSW-1)\!\!>\!\!>\!\!1)+((mvDisp[0]+2)\!\!>\!\!>\!\!2))\quad\text{(H-124)}$$

$$yRef=Clip3(0,PicHeightInSamples_L-1,yP+((nPSH-1)\!\!>\!\!>\!\!1)+((mvDisp[1]+2)\!\!>\!\!>\!\!2))\quad\text{(H-125)}$$

In equations H-124 and H-125 above, (xP, yP) denotes coordinates of a top-left luma sample of the current PU relative to a top-left luma sample of the current picture, nPSW and nPSH denote the width and height of the current prediction unit, respectively, refViewIdx denotes a reference view order index, and mvDisp denotes a disparity vector. The corresponding block is set to a PU that covers the luma location (xRef, yRef) in a view component with ViewIdx equal to refViewIdx. In equations H-124 and H-125 above, and other equations in this disclosure, the Clip3 function may be defined as:

$$Clip3(x, y, z) = \begin{cases} x; & z < x \\ y; & z > y \\ z; & \text{otherwise} \end{cases}$$

Figure 8:
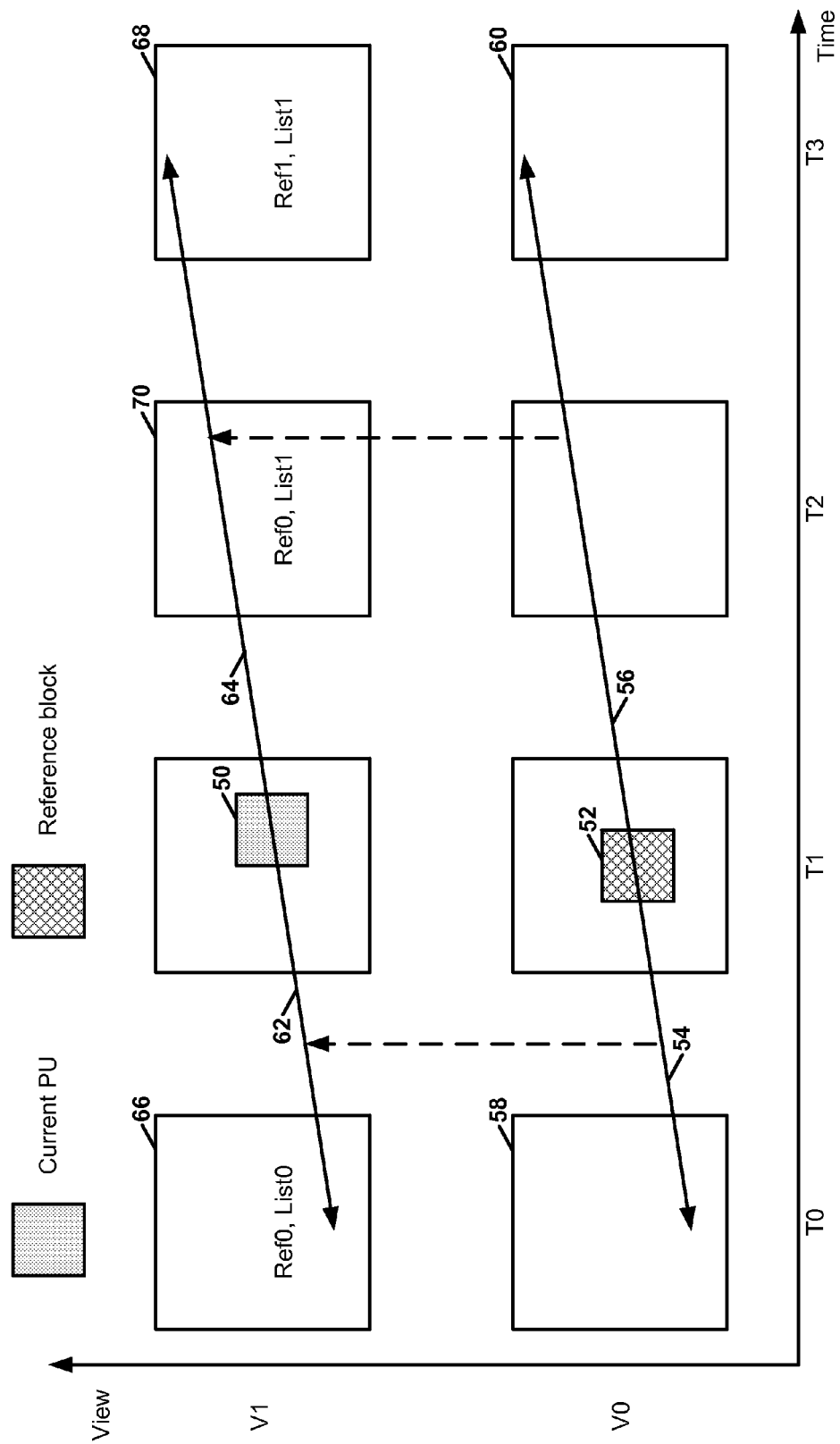
FIG. 8 is a conceptual diagram illustrating an example derivation of an inter-view predicted motion vector candidate for merge/skip mode.

FIG. 8 is a conceptual diagram illustrating an example derivation of an IPMVC for merge/skip mode. In other words, FIG. 8 shows an example of the derivation process of the inter-view predicted motion vector candidate. In the example of FIG. 8, a current PU 50 occurs in view V1 at a time instance T1. A reference PU 52 for current PU 50 occurs in a different view than current PU 50 (i.e., view V0) and at the same time instance as current PU (i.e., time instance T1). In the example of FIG. 8, reference PU 52 is bi-directionally inter predicted. Hence, reference PU 52 has a first motion vector 54 and a second motion vector 56. Motion vector 54 indicates a position in a reference picture 58. Reference picture 58 occurs in view V0 and in time instance T0. Motion vector 56 indicates a position in reference picture 60. Reference picture 60 occurs in view V0 and in time instance T3.

The video coder may generate, based on the motion information of reference PU 52, an IPMVC for inclusion in a merge candidate list of current PU 50. The IPMVC may have a first motion vector 62 and a second motion vector 64. Motion vector 62 matches motion vector 54 and motion vector 64 matches motion vector 56. The video coder generates the IPMVC such that a first reference index of the IPMVC indicates a position in RefPicList0 for current PU 50 of a reference picture (i.e., reference picture 66) occurring in the same time instance as reference picture 58 (i.e., time instance T0). In the example of FIG. 8, reference picture 66 occurs in the first position (i.e., Ref0) in RefPicList0 for current PU 50. Furthermore, the video coder generates the IPMVC such that a second reference index of the IPMVC indicates a position in RefPicList1 for current PU 50 of a reference picture (i.e., reference picture 68) occurring in the same time instance as reference picture 60. Thus, in the example of FIG. 8, the RefPicList0 reference index of the IPMVC may be equal to 0. In the example of FIG. 8, a reference picture 70 occurs in the first position (i.e., Ref0) in RefPicList1 for current PU 50 and reference picture 68 occurs in the second position (i.e., Ref1) in RefPicList1 for current PU 50. Thus, the RefPicList1 reference index of the IPMVC may be equal to 1.

In addition to generating the IPMVC and including the IPMVC in the merge candidate list, the video coder may convert the disparity vector for the current PU into an inter-view disparity motion vector (IDMVC) and may include the IDMVC in a merge candidate list for the current PU. In other words, the disparity vector may be converted to an IDMVC, which is added into a merge candidate list in a different position from an IPMVC, or added into the AMVP candidate list in the same position as the IPMVC when the IDMVC is available. Either IPMVC or IDMVC is called 'inter-view candidate' in this context. In other words, the term "inter-view candidate" may be used to refer to either an IPMVC or an IDMVC. In some examples, in the merge/skip mode, the video coder always inserts an IPMVC, if available, into the merge candidate list before all spatial and temporal merging candidates. Furthermore, the video coder may insert the IDMVC before the spatial merging candidate derived from $A_0$.

As indicated above, a video coder may derive a disparity vector with the method of DoNBDV. With the disparity vector, the merging candidate list construction process in 3D-HEVC can be defined as follows:

1. IPMVC insertion

An IPMVC is derived by the procedure described above. If the IPMVC is available, the IPMVC is inserted to the merge list.

2. Derivation process for spatial merging candidates and IDMVC insertion in 3D-HEVC Check the motion information of spatial neighboring PUs in the following order: $A_1$, $B_1$, $B_0$, $A_0$, or $B_2$. Constrained pruning is performed by the following procedures:

If $A_1$ and IPMVC have the same motion vectors and the same reference indices, $A_1$ is not inserted into the candidate list; otherwise $A_1$ is inserted into the list.

If $B_1$ and $A_1$/IPMVC have the same motion vectors and the same reference indices, $B_1$ is not inserted into the candidate list; otherwise $B_1$ is inserted into the list.

If $B_0$ is available, $B_0$ is added to the candidate list. An IDMVC is derived by the procedure described above. If the IDMVC is available and the IDMVC is different from the candidates derived from $A_1$ and $B_1$, the IDMVC is inserted to the candidate list.

If BVSP is enabled for the whole picture or for the current slice, then the BVSP merging candidate is inserted to the merge candidate list.

If $A_0$ is available, $A_0$ is added to the candidate list.

If $B_2$ is available, $B_2$ is added to the candidate list.

3. Derivation process for temporal merging candidate

Similar to the temporal merging candidate derivation process in HEVC where the motion information of the co-located PU is utilized, however, the target reference picture index of the temporal merging candidate may be changed instead being fixed to 0. When the target reference index equal to 0 corresponds to a temporal reference picture (in the same view) while the motion vector of the co-located PU points to an inter-view reference picture, the target reference index may be changed to another index which corresponds to the first entry of inter-view reference picture in the reference picture list. On the contrary, when the target reference index equal to 0 corresponds to an inter-view reference picture while the motion vector of the co-located PU points to a temporal reference picture, the target reference index may be changed to another index which corresponds to the first entry of temporal reference picture in the reference picture list.

4. Derivation process for combined bi-predictive merging candidates in 3D-HEVC

If the total number of candidates derived from the above two steps are less than the maximum number of candidates, the same process as defined in HEVC is performed except the specification of l0CandIdx and l1CandIdx. FIG. 9 is a table indicating an example specification of l0CandIdx and l1CandIdx in 3D-HEVC. The relationship among combIdx, l0CandIdx and l1CandIdx are defined in the table of FIG. 9. Section 8.5.3.2.3 of HEVC Working Draft 10 defines an example use of l0CandIdx and l1CandIdx in deriving combined bi-predictive merging candidates.

5. Derivation process for zero motion vector merging candidates

The same procedure as defined in HEVC is performed.

In some versions of the reference software for 3D-HEVC, the total number of candidates in the merge (e.g., MRG) list is up to six and five_minus_max_num_merge_cand is signaled to specify the maximum number of the merge candidates subtracted from 6 in slice header. five_minus_max_num_merge_cand is in the range of 0 to 5, inclusive. The five_minus_max_num_merge_cand syntax element may specify the maximum number of merging MVP candidates supported in the slice subtracted from 5. The maximum number of merging motion vector prediction (MVP) candidates, MaxNumMergeCand may be computed as MaxNumMergeCand=5−five_minus_max_num_merge_cand+iv_mv_pred_flag[nuh_layer_id]. The value of five_minus_max_num_merge_cand may be limited such that MaxNumMergeCand is in the range of 0 to (5+iv_mv_pred_flag[nuh_layer_id]), inclusive.

As indicated above, section 8.5.3.2.3 of HEVC Working Draft 10 defines an example use of l0CandIdx and l1CandIdx in deriving combined bi-predictive merging candidates. Section 8.5.3.2.3 of HEVC Working Draft 10 is reproduced below.

Derivation Process for Combined Bi-Predictive Merging Candidates

Inputs to this process are:
  a merging candidate list mergeCandList,
  the reference indices refIdxL0N and refIdxL1N of every candidate N in mergeCandList,
  the prediction list utilization flags predFlagL0N and predFlagL1N of every candidate N in mergeCandList,
  the motion vectors mvL0N and mvL1N of every candidate N in mergeCandList,
  the number of elements numCurrMergeCand within mergeCandList,
  the number of elements numOrigMergeCand within the mergeCandList after the spatial and temporal merge candidate derivation process.

Outputs of this process are:
  the merging candidate list mergeCandList,
  the number of elements numCurrMergeCand within mergeCandList,
  the reference indices refIdxL0combCand$_k$ and refIdxL1combCand$_k$ of every new candidate combCand$_k$ added into mergeCandList during the invokation of this process,
  the prediction list utilization flags predFlagL0combCand$_k$ and predFlagL1combCand$_k$ of every new candidate combCand$_k$ added into mergeCandList during the invokation of this process,
  the motion vectors mvL0combCand$_k$ and mvL1combCand$_k$ of every new candidate combCand$_k$ added into mergeCandList during the invokation of this process.

When numOrigMergeCand is greater than 1 and less than MaxNumMergeCand, the variable numInputMergeCand is set equal to numCurrMergeCand, the variable combIdx is set equal to 0, the variable combStop is set equal to FALSE, and the following steps are repeated until combStop is equal to TRUE:

1. The variables l0CandIdx and l1CandIdx are derived using combIdx as specified in Table 8-6.
  2. The following assignments are made, with l0Cand being the candidate at position l0CandIdx and l1Cand being the candidate at position l1CandIdx in the merging candidate list mergeCandList:
     l0Cand=mergeCandList[l0CandIdx]
     l1Cand=mergeCandList[l1CandIdx]
  3. When all of the following conditions are true:
     predFlagL0l0Cand==1
     predFlagL1l1Cand==1
     (DiffPicOrderCnt(RefPicList0[refIdxL0l0Cand], RefPicList1[refIdxL1l1Cand]) !=0)||(mvL0l0Cand !=mvL1l1Cand)
     the candidate combCand$_k$ with k equal to (numCurrMergeCand−numInputMergeCand) is added at the end of mergeCandList, i.e. mergeCandList[numCurrMergeCand] is set equal to combCand$_k$, and the reference indices, the prediction list utilization flags, and the motion vectors of combCand$_k$ are derived as follows and numCurrMergeCand is incremented by 1:

$$\text{refIdx}L0\text{combCand}_k=\text{refIdx}L0l0\text{Cand} \quad (8\text{-}113)$$

$$\text{refIdx}L1\text{combCand}_k=\text{refIdx}L1l1\text{Cand} \quad (8\text{-}114)$$

$$\text{predFlag}L0\text{combCand}_k=1 \quad (8\text{-}115)$$

$$\text{predFlag}L1\text{combCand}_k=1 \quad (8\text{-}116)$$

| | |
|---|---|
| $mvL0combCand_k[0] = mvL0l0Cand[0]$ | (8-117) |
| $mvL0combCand_k[1] = mvL\,0l0Cand[1]$ | (8-118) |
| $mvL1combCand_k[0] = mvL\,1l1Cand[0]$ | (8-119) |
| $mvL1combCand_k[1] = mvL\,1l1Cand[1]$ | (8-120) |
| numCurrMergeCand = numCurrMergeCand+1 | (8-121) |

4. The variable combIdx is incremented by 1.
5. When combIdx is equal to (numOrigMergeCand*(numOrigMergeCand−1)) or numCurrMergeCand is equal to MaxNumMergeCand, combStop is set equal to TRUE.

Figure 10:
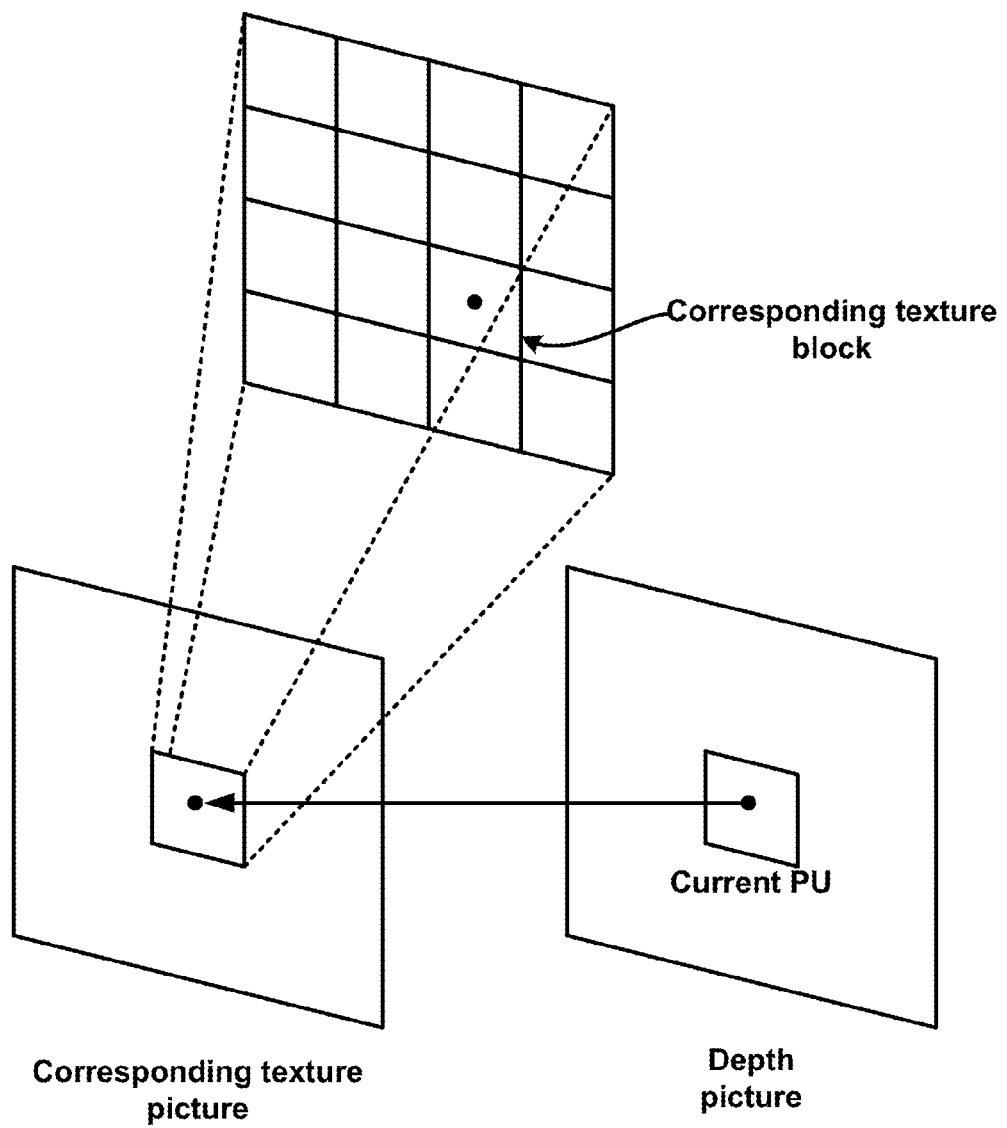
FIG. 10 is a conceptual diagram illustrating an example derivation of a motion vector inheritance candidate for depth coding.

Motion vector inheritance (MVI) exploits the similarity of the motion characteristics between the texture images and its associated depth images. In particular, a video coder may include an MVI candidate in a merge candidate list. For a given PU in the depth image, the MVI candidate reuses using the motion vectors and reference indices of the already coded corresponding texture block, if it is available. FIG. 10 is a conceptual diagram illustrating an example derivation of a motion vector inheritance candidate for depth coding. FIG. 10 shows an example of the derivation process of the MVI candidate where the corresponding texture block is selected as the 4×4 block located to the right bottom of the center of the current PU.

In some examples, motion vectors with integer precision are used in depth coding while quarter precision of motion vectors is utilized for texture coding. Therefore, the motion vector of the corresponding texture block may be scaled before the motion vector is used as a MVI candidate.

With the MVI candidate generation, the merge candidate list for the depth views may be constructed as follows:
1. MVI insertion
    An MVI is derived by the procedure described above. If the MVI is available, the video coder may insert the MVI into the merge list.
2. Derivation process for spatial merging candidates and IDMVC insertion in 3D-HEVC
    Check the motion information of spatial neighboring PUs in the following order: $A_1$, $B_1$, $B_0$, $A_0$, or $B_2$. The video coder may perform constrained pruning by the following procedures:
    If $A_1$ and MVI have the same motion vectors and the same reference indices, the video coder does not insert the $A_1$ into the candidate list.
    If $B_1$ and $A_1$/MVI have the same motion vectors and the same reference indices, the video coder does not insert $B_1$ into the candidate list.
    If $B_0$ is available, the video coder adds $B_0$ to the candidate list.
    If $A_0$ is available, the video coder adds $A_0$ to the candidate list.
    If $B_2$ is available, the video coder adds $B_2$ to the candidate list.
3. Derivation process for temporal merging candidate
    Similar to the temporal merging candidate derivation process in HEVC where the motion information of the co-located PU is utilized, however, the target reference picture index of the temporal merging candidate may be changed as explained elsewhere in this disclosure with regard to merge candidate list construction for texture coding in 3D-HEVC, instead of fixing the target reference picture index to be 0.
4. Derivation process for combined bi-predictive merging candidates in 3D-HEVC If the total number of candidates derived from the above two steps is less than the maximum number of candidates, the video coder may perform the same process as defined in HEVC except the specification of l0CandIdx and l1CandIdx. The relationship among combIdx, l0CandIdx and l1CandIdx is defined in the table of FIG. 9.

6. Derivation process for zero motion vector merging candidates
    The same procedure as defined in HEVC is performed.

As indicated above, 3D-HEVC provides for inter-view residual prediction. Advanced residual prediction (ARP) is one form of inter-view residual prediction. Applying ARP to CUs with partition mode equal to Part_2N×2N was adopted in the 4$^{th}$ JCT3V meeting, as proposed in Zhang et al., "CE4: Advanced Residual Prediction for Multiview Coding," Joint Collaborative Team on 3D Video Coding Extensions of ITU-T SG 16 WP 3 and ISO/IEC JTC 1/SC 29/WG 11, 4th Meeting: Incheon, KR, 20-26 Apr. 2013, document JCT3V-D0177, which as of Dec. 17, 2013, is available from http://phenix.it-sudparis.eu/jct3v/doc_end_user/documents/4_Incheon/wg11/JCT3V-D0177-v2.zip (hereinafter JCT3V-D0177).

Figure 11:
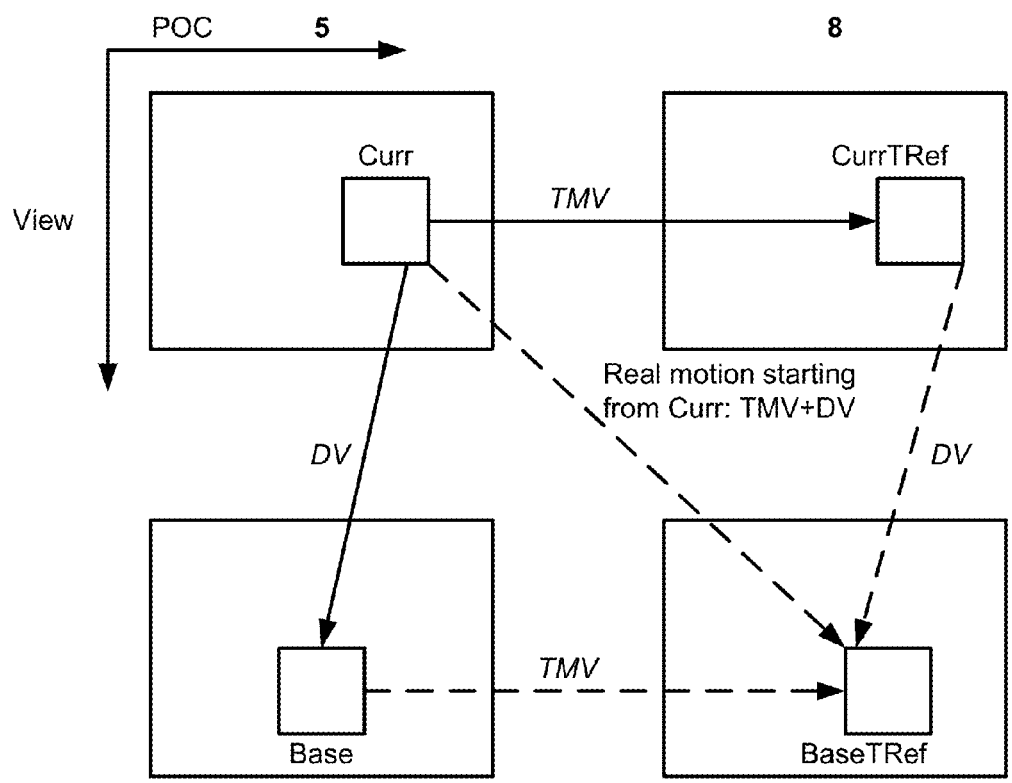
FIG. 11 illustrates an example prediction structure of advanced residual prediction (ARP) in multi-view video coding.

FIG. 11 illustrates an example prediction structure of ARP in multi-view video coding. As shown in FIG. 11, the video coder may invoke the following blocks in the prediction of a current block.
1. Current block: Curr
2. Reference block in reference/base view derived by the disparity vector (DV): Base.
3. A block in the same view as block Curr derived by the (temporal) motion vector (denoted as TMV) of the current block: CurrTRef.
4. A block in the same view as block Base derived by the temporal motion vector of the current block (TMV): BaseTRef. This block is identified with a vector of TMV+DV compared with the current block.

The residual predictor is denoted as BaseTRef-Base, wherein the subtraction operation applies to each pixel of the denoted pixel arrays. The video coder may multiply a weighting factor w to the residual predictor. Therefore, the final predictor of the current block may be denoted as: CurrTRef+w*(BaseTRef-Base).

The description above and FIG. 11 are both based on the assumption that uni-directional prediction is applied. When extending to the case of bi-directional prediction, the above steps are applied for each reference picture list. When the current block uses an inter-view reference picture (in a different view) for one reference picture list, the residual prediction process is disabled.

Figure 12:
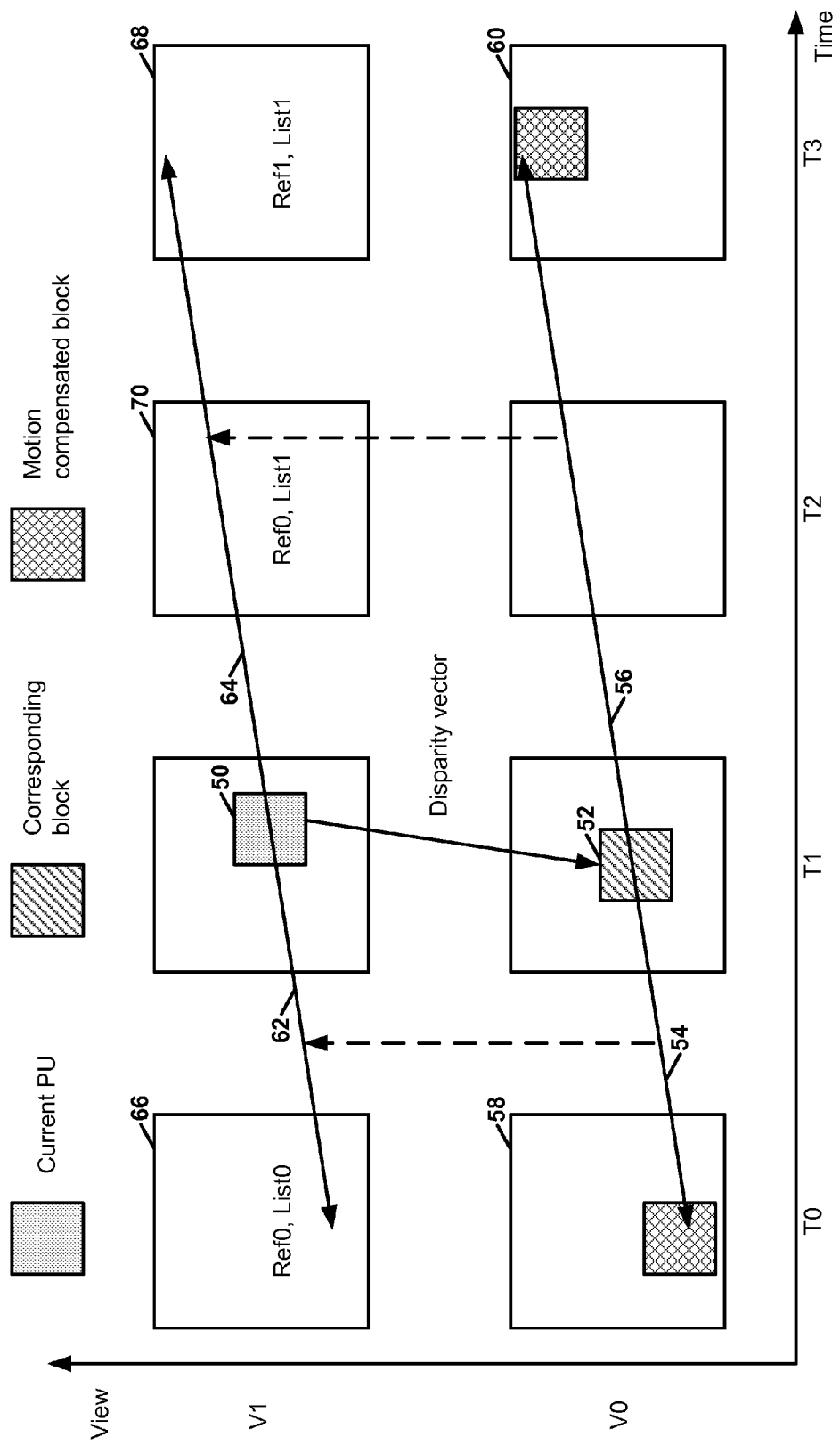
FIG. 12 is a conceptual diagram illustrating an example relationship among a current block, a reference block, and motion compensated blocks.

Main procedures of the proposed ARP at the decoder side can be described as follows. First, the video coder may obtain a disparity vector as specified in 3D-HEVC Working Draft 4, pointing to a target reference view. Then, in the picture of the reference view within the same access unit as the current picture, the video coder may use the disparity vector to locate the corresponding block. Next, the video coder may re-use the motion information of the current block to derive the motion information for the reference block. The video coder may then apply motion compensation for the corresponding block based the same motion vector of current block and derived reference picture in the reference view for the reference block, to derive a residue block. FIG. 12 shows the relationship among the current block, the corresponding block and the motion compensated block. In other words, FIG. 12 is a conceptual diagram illustrating an example relationship among a current block, a reference block, and motion compensated blocks. The reference picture in the reference view ($V_0$), which has the same POC (Picture Order Count) value as the reference picture of current view ($V_m$) is selected as the reference picture of the corresponding block. Next, the video coder may apply the weighting factor to the residue block to determine a weighted residue block. The video coder may add the values of the weighted residue block to the predicted samples.

Three weighting factors are used in ARP, i.e., 0, 0.5 and 1. Video encoder 20 may select the weighting factor leading to minimal rate-distortion cost for the current CU as the final weighting factor. Video encoder 20 may signal the corresponding weighting factor index (0, 1 and 2 which correspond to weighting factor 0, 1, and 0.5, respectively) in the bitstream at the CU level. All PU predictions in a CU may share the same weighting factor. When the weighting factor is equal to 0, the video coder does not use ARP for the current CU.

In Zhang et al., "3D-CE4: Advanced Residual Prediction for Multiview Coding," Joint Collaborative Team on 3D Video Coding Extension Development of ITU-T SG 16 WP 3 and ISO/IEC JTC 1/SC 29/WG 11, 3rd Meeting: Geneva, CH, 17-23 Jan. 2013, document JCT3V-C0049, which as of Aug. 30, 2013, is available from http://phenix.int-evry.fr/jct3v/doc_end_user/documents/3_Geneva/wg11/JCT3V-C0049-v2.zip (hereinafter, JCT3V-C0049), the reference pictures of PUs coded with non-zero weighting factors may be different from block to block. Therefore, the video coder may need to access different pictures from the reference view to generate the motion-compensated block (i.e., Base-TRef in the example of FIG. 11) of the corresponding block. The video coder may scale the decoded motion vectors of the current PU towards a fixed picture before performing motion compensation for the residual generation process, when the weighting factor is unequal to 0. In JCT3V-D0177, the fixed picture is defined as the first reference picture of each reference picture list if it is from the same view. When the decoded motion vector does not point to the fixed picture, the video coder may first scale the decoded motion vector and then use the scaled motion vector to identify CurrTRef and BaseTRef. Such a reference picture used for ARP may be referred to as the target ARP reference picture.

In JCT3V-C0049, the video coder may apply a bi-linear filter during the interpolation process of the corresponding block and a prediction block of the corresponding block. While for the prediction block of the current PU in the non-base views, the video coder may apply a conventional 8/4-tap filter. JCT3V-D0177 proposes always employing bi-linear regardless of whether the block is in base view or non-base view when ARP is applied.

In ARP, the video coder may identify the reference view by the view order index returned from the NBDV derivation process. In some designs of ARP, when the reference picture of one PU in one reference picture list is from a different view of the current view, ARP is disabled for this reference picture list.

In U.S. Provisional Patent Applications 61/840,400, filed Jun. 28, 2013 and 61/847,942, filed Jul. 18, 2013, when coding a depth picture, a disparity vector is converted by an estimated depth value from the neighboring samples of the current block. Furthermore, more merge candidates can be derived e.g., by accessing the reference block of the base view identified by a disparity vector.

In 3D-HEVC, a video coder may identify a reference 4×4 block by two steps. The first step is to identify a pixel with a disparity motion vector. The second step is to get the 4×4 block (with a unique set of motion information corresponding to RefPicList0 or RefPicList1 respectively) and utilize the motion information to create a merge candidate.

The pixel (xRef, yRef) in the reference view may be identified as follows:

$$xRef = Clip3(0, PicWidthInSamples_L - 1, xP + ((nPSW - 1) \gg 1) + ((mvDisp[0] + 2) \gg 2)) \quad (H\text{-}124)$$

$$yRef = Clip3(0, PicHeightInSamples_L - 1, yP + ((nPSH - 1) \gg 1) + ((mvDisp[1] + 2) \gg 2)) \quad (H\text{-}125)$$

wherein (xP, yP) is the coordination of the top-left sample of the current PU, mvDisp is the disparity vector and nPSW×nPSH is the size of the current PU and $PicWidthInSamples_L$ and $PicHeightInSamples_L$ define the resolution of the picture in the reference view (same as the current view).

Figure 13:
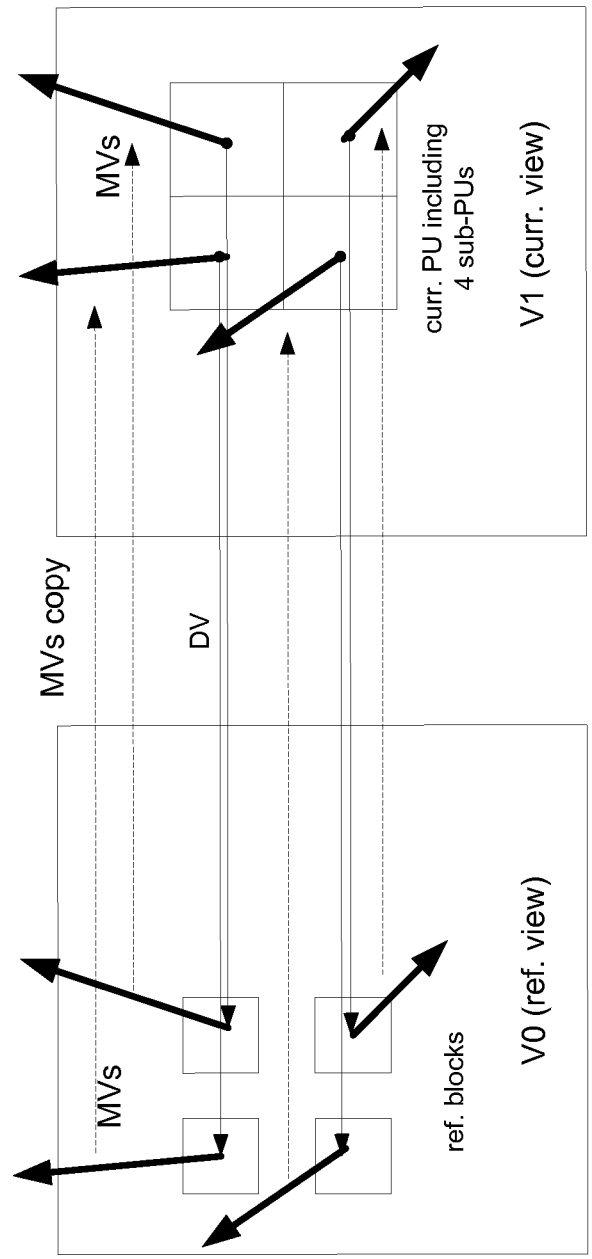
FIG. 13 is a conceptual diagram illustrating sub-prediction unit (PU) inter-view motion prediction.

An et al., "3D-CE3.h related: Sub-PU level inter-view motion prediction," Joint Collaborative Team on 3D Video Coding Extensions of ITU-T SG 16 WP 3 and ISO/IEC JTC 1/SC 29/WG 11, 5th Meeting: Vienna, AT, 27 Jul.-2 Aug. 2013, document JCT3V-E0184 (hereinafter, "JCT3V-E0184"), which as of Dec. 17, 2013 is available from http://phenix.it-sudparis.eu/jct2/doc_end_user/documents/5_Vienna/wg11/JCT3V-E0184-v2.zip proposes a sub-PU level inter-view motion prediction method for the temporal inter-view merge candidate (i.e., the candidate derived from a reference block in the reference view). The basic concept of inter-view motion prediction is described elsewhere in this disclosure. In the basic concept of inter-view motion prediction, only the motion information of the reference block is used for the current PU in the dependent view. However, the current PU may correspond to a reference area (with the same size as the current PU identified by the disparity vector of the current PU) in the reference view and the reference area may have plentiful motion information. Therefore, a sub-PU level inter-view motion prediction (SPIVMP) method is proposed as shown in FIG. 13. In other words, FIG. 13 is a conceptual diagram illustrating an example of sub-PU inter-view motion prediction.

The temporal inter-view merge candidate may be derived as follows. In the derivation process for the temporal inter-view merge candidate, the assigned sub-PU size may be denoted as N×N. Different sub-PU block sizes may be applied, for example, 4×4, 8×8, and 16×16.

In the derivation process for the temporal inter-view merge candidate, the video coder may first divide the current PU into multiple sub-PUs, each of which has a smaller size than the current PU. The size of the current PU may be denoted by nPSW×nPSH. The sizes of the sub-PUs may be denoted by nPSWsub×nPSHSub. nPSWsub and nPSHsub may be related to nPSW and nSPH as shown in the following equations.

$$nPSWsub = min(N, nPSW)$$

$$nPSHSub = min(N, nPSH)$$

In addition, the video coder may set a default motion vector tmvLX to (0, 0) and may set a reference index refLX to −1 (with X being 0 or 1) for each reference picture list.

Furthermore, when determining the temporal inter-view merge candidate, the video coder may apply the following actions for each sub-PU in the raster scan order. First, the video coder may add the disparity vector to a middle position of the current sub-PU (whose top-left sample location is (xPSub, yPSub)) to obtain a reference sample location (xRefSub, yRefSub). The video coder may determine (xRefSub, yRefSub) using the following equations:

xRefSub=Clip3(0,PicWidthInSamples$L$−1,$x$PSub+
  $n$PSWsub/2+((mvDisp[0]+2)>>2))

yRefSub=Clip3(0,PicHeightInSamples$L$−1,$y$PSub+
  $n$PSHSub/2+((mvDisp[1]+2)>>2))

The video coder may use a block in the reference view that covers (xRefSub, yRefSub) as the reference block for the current sub-PU.

If the identified reference block is coded using temporal motion vectors and if both refL0 and refL1 are equal to −1 and the current sub-PU is not the first one in the raster scan order, the motion information of the reference block is inherited by all the previous sub-PUs. Furthermore, if the identified reference block is coded using temporal motion vectors, the associated motion parameters can be used as motion parameters for the current sub-PU. In addition, if the identified reference block is coded using temporal motion vectors, the video coder may update tmvLX and refLX to the motion information of the current sub-PU. Otherwise, if the reference block is intra coded, the video coder may set the motion information of the current sub-PU to tmvLX and refLX. In this technique, even one PU may have different motion information for each sub-PU, it is enabled in a way that only one merge candidate is added to the merge list. When this candidate is selected, motion compensation for each sub-PU instead of current PU may be invoked separately.

The sub-PU motion prediction method as proposed in JCT3V-E0184 has one or more problems. For example, when the corresponding block of one sub-PU in a reference view is intra coded (i.e., its motion information is unavailable), the motion information of the nearest sub-PU in the raster scan order is copied to the current sub-PU. Therefore, if the corresponding blocks of the first N sub-PUs in the raster scan order are intra coded and the corresponding block of the (N+1)-th sub-PU is inter coded, the related motion information set to the (N+1)-th sub-PU shall be copied to the first N sub-PUs which causes additional complexity and coding delay.

One or more examples of this disclosure relate to inter-view motion prediction. For instance, one or more example of this disclosure are applicable in the context when the merge index indicates inter-view motion prediction.

For instance, in one example, when a video coder uses inter-view motion prediction in a sub-PU fashion, if a current sub-PU for which the motion information is unavailable, a video coder may copy the motion information from default motion vectors and reference indices. For instance, if the motion information for the current sub-PU is unavailable, a video coder may copy the motion information for the current sub-PU from default motion vectors and default reference indices. In this example, the default motion parameters are the same for each sub-PU in the plurality of sub-PUs, regardless of whether there are subsequently sub-PUs having reference blocks that are coded using motion compensated prediction.

In some examples, a video coder (e.g., video encoder 20 or video decoder 30) may divide a current PU into a plurality of sub-PUs. The current PU is in a current picture. In addition, the video coder may determine default motion parameters. The default motion parameters may include one or more default motion vectors and one or more default reference indices. In addition, the video coder may process sub-PUs from the plurality of sub-PUs in a particular order. For each respective sub-PU from the plurality of sub-PUs, the video coder may determine a reference block for the respective sub-PU.

In some examples, the reference picture may be in a different view than the current picture and the video coder may determine, based on a disparity vector of the current PU, a reference sample location in the reference picture. In such examples, the reference block for the respective sub-PU may cover the reference sample location. In other examples, the current picture is a depth view component and the reference picture is a texture view component that is in the same view and access unit as the current picture. In such examples, the video coder may determine that the reference block for the respective sub-PU is a PU of the reference picture that is co-located with the respective sub-PU.

Furthermore, for each respective sub-PU from the plurality of sub-PUs (or a subset of the plurality of sub-PUs), if the reference block for the respective sub-PU is coded using motion compensated prediction, the video coder may set motion parameters of the respective sub-PU based on motion parameters of the reference block for the respective sub-PU. On the other hand, if the reference block for the respective sub-PU is not coded using motion compensated prediction, the video coder may set the motion parameters of the respective sub-PU to the default motion parameters.

In accordance with one or more examples of this disclosure, if a reference block for the respective sub-PU is not coded using motion compensated prediction, the motion parameters of the respective sub-PU are not set in response to a subsequent determination that a reference block for any later sub-PU in the order is coded using motion compensated prediction. Thus, in the situation where a reference block for at least one of the sub-PUs is not coded using motion compensated prediction, the video coder may not need to scan forward to find a sub-PU whose corresponding reference block is coded using motion compensated prediction. Likewise, the video coder may not need to delay determining the motion parameters of the respective sub-PU until the video coder encounters, during the processing of the sub-PUs, a PU whose corresponding reference block is coded using motion compensated prediction. Advantageously, this may decrease complexity and coding delay.

The video coder may include a candidate in a candidate list of the current PU, wherein the candidate is based on the motion parameters of the plurality of sub-PUs. In some examples, the candidate list is a merge candidate list. Furthermore, if the video coder is a video encoder (e.g., video encoder 20), the video encoder may signal, in a bitstream, a syntax element (e.g., merge_idx) that indicates a selected candidate in the candidate list. If the video coder is a video decoder (e.g., video decoder 30), the video decoder may obtain, from a bitstream, a syntax element (e.g., merge_idx) that indicates a selected candidate in the candidate list. The video decoder may use motion parameters of the selected candidate to reconstruct a predictive block for the current PU.

The sub-PU motion prediction method as proposed in JCT3V-E0184 includes inefficiencies. Even if the sub-PUs in a PU share the same disparity vector, the accessing of the corresponding blocks are done one by one, which makes the memory access less efficient and leads to a lot of redundant calculations. In various methods of inter-view motion prediction, the motion information may be accessed from multiple reference blocks. When extending these method to sub-PU, the memory access might be doubled. Furthermore, reference indices of the sub-PUs corresponding to a reference picture list (RefPicList0 or RefPicList1) of a current PU may be different, therefore pixels within one PU may be predicted by more than reference pictures for one each prediction direction corresponding to RefPicList0 or RefPicList1. Therefore, the cache miss rate is much higher for such a PU. In addition, separate motion compensation processes are invoked for neighboring sub-PUs even when these neighboring sub-PUs may have identical motion information. This results in less efficient memory access and potentially high memory access bandwidth during motion compensation techniques.

Techniques related to inter-view motion prediction are disclosed herein to address in whole or part some of the above problems. Such techniques can be applied in the context when the merge index indicates inter-view motion prediction. It is to be recognized that the particular examples may incorporate the following features in any suitable combination.

At least some of the techniques described in this disclosure may be implemented separately or in conjunction with each other.

Figure 14:
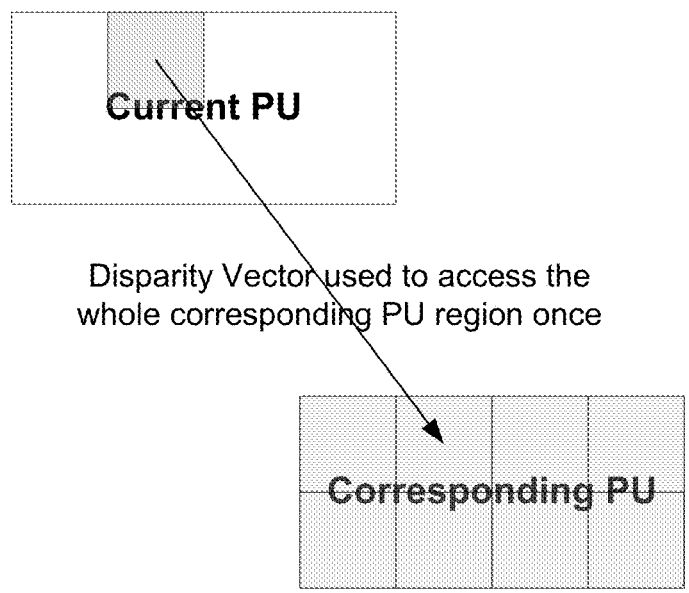
FIG. 14 is a conceptual diagram illustrating identification of a corresponding prediction unit (PU) region in inter-view motion prediction.

According to one example, the access of the motion information for sub-PUs are not done one by one, instead, the whole sub-PU aligned region corresponding to the current PU are identified and the motion information of the whole region are accessed together and once, as shown in FIG. 14. FIG. 14 is a conceptual diagram illustrating identification of a corresponding PU region in inter-view motion prediction. Denote the top-left sample of the current PU as (x, y), the top-left sample of the corresponding PU region in a reference view is identified as (xRefPU, yRefPU), wherein:

$$x\text{RefPU}=(x+dv[0]+(nPSW\text{Sub}>>1))/nPSW\text{Sub; and}$$

$$y\text{RefPU}=(y+dv[1]+(nPSH\text{Sub}>>1))/nPSH\text{Sub.}$$

After the (xRefPU, yRefPU) is identified, the corresponding PU region (which does not necessarily belong to one PU) is identified in the reference view by considering the top-left position as (xRefPU, yRefPU) and the size as the same as the current PU. The motion information of this region is accessed and allocated to each sub-PU with a one-to-one matching: a sub-PU with a top-left pixel having a coordination of (x+i*nPSWSub, y+j*nPSHSub) has a corresponding sub-PU region with the same size and the top-left pixel coordination of (xRefPU+i*nPSWSub, yRefPU+j*nPSHSub).

The dv is the disparity vector, which may be derived as dv[i]=(mvDisp[i]+2)>>2), for each i from 0 to 1 and mvDisp is the disparity vector derived as in the 3D-HEVC WD. nPSWSubxnPSHSub is the size of the sub-PU. More specifically, in some examples, only square sub-PUs are allowed and the width of the PU is a power of 2, denoted as (1<<SPU), where "SPU" is the width of the PU. Therefore, the top-left corresponding PU region has a coordination of ((x+dv[0]+(1<<(SPU−1)))>>SPU, (y+dv[1]+(1<<(SPU−1)))>>SPU). Typically, SPU can be 2, 3, or 4. Alternatively, a small shift may be added to the (x,y) before (XRefPU, YRefPU) is calculated, wherein x+=o, y+=o, and o being equal to −1, −2, −3, 1, 2 or 3.

In some examples, the corresponding PU region may be outside the boundary of a picture. In this example, the motion information might be padded to the unavailable region. In other words, a padding process may be used to generate pixel values for the location indicated by the motion information. Alternatively, the motion information of such unavailable region is not accessed and may be directly considered as unavailable. Alternatively, if a corresponding sub-PU is outside the coding tree block (CTB) row of the reference view that is in the same CTB row as the current picture, the sub-PU in the center position of the corresponding PU region is used for the current sub-PU. In other words, if the corresponding sub-PU is not in the same CTB row as the current sub-PU, the sub-PU in the center position of the corresponding PU region is used for motion prediction for the current sub-PU.

Figure 15:
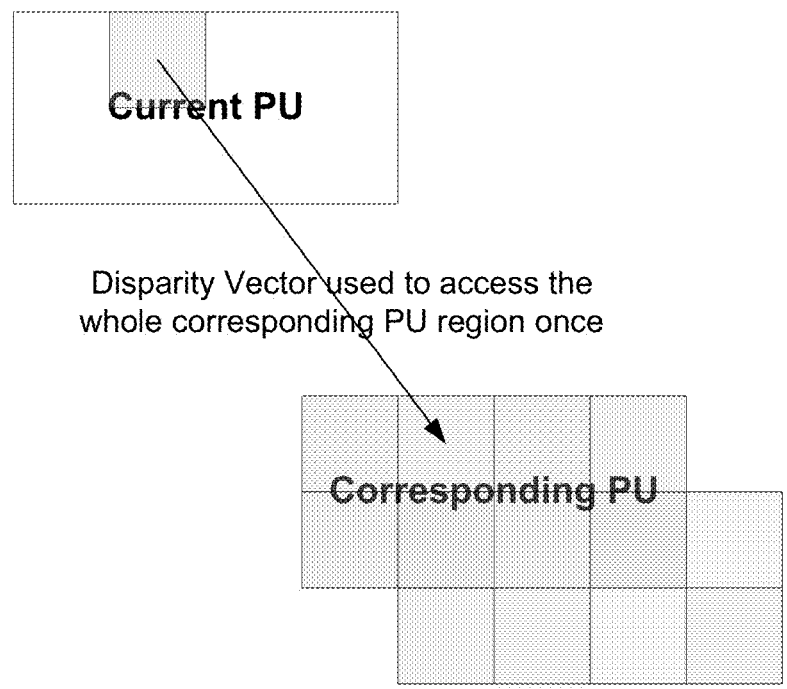
FIG. 15 is a conceptual diagram illustrating one additional sub-prediction unit (PU) row and sub-PU column for a corresponding PU in inter-view motion prediction.

In the example described above with respect to FIG. 14, optionally, when the accessing of multiple blocks is allowed for each sub-PU, more regions may be accessed, though this may be done once and together for all blocks. In one example, one more sub-PU row and one more sub-PU column are accessed, as shown in FIG. 15. FIG. 15 is a conceptual diagram illustrating one additional sub-PU row and sub-PU column for a corresponding PU in inter-view motion prediction. For a current sub-PU, the motion information of the corresponding sub-PU region is firstly used, if unavailable, the motion information of the bottom-right adjacent sub-PU is used. For example if the current sub-PU has a top-left pixel coordination of (x+i*nPSWSub, y+j*nPSHSub), and the corresponding sub-PU region (with a top-left pixel coordination of (xRefPU+i*nPSWSub, yRefPU+j*nPSHSub)) is not available, the one with a top-left pixel coordination of (xRefPU+(i+1)*nPSWSub, yRefPU+(j+1)*nPSHSub) can be used.

Figure 16:
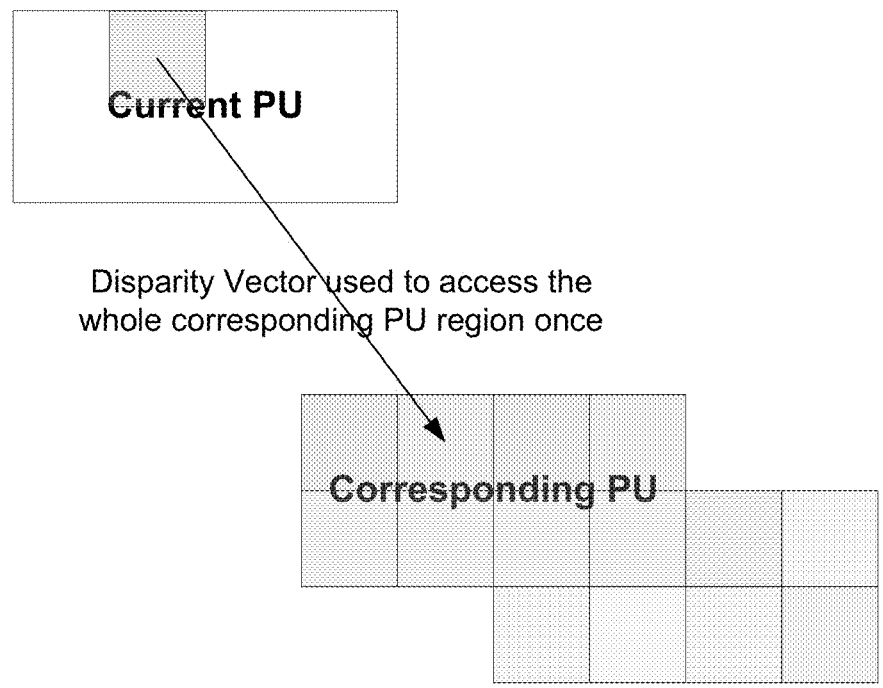
FIG. 16 is a conceptual diagram illustrating an extra prediction unit (PU) region three-quarters the size of the corresponding PU in inter-view motion prediction.

In another example, a region is extended to the right and bottom of the corresponding PU region, by a size of the ¾ of the current PU, as shown in FIG. 16. FIG. 16 is a conceptual diagram illustrating an extra PU region three-quarters the size of the corresponding PU in inter-view motion prediction. If the corresponding sub-PU region does not contain available motion information, the sub-PU in the corresponding sub-PU region's bottom-right direction, with a distance of half-PU width and half-PU height may be used. The top-left pixel coordination of such a PU is (xRefPU+i*nPSWSub+PUWidth/2, yRefPU+j*nPSHSub+PUHeight/2), wherein PUWidthxPUHeight is the size of the current PU. The above two techniques, as described with respect to FIGS. 15 and 16, may be combined, thereby using up to three sub-PUs to derive the motion information of the current sub-PU.

In some examples, all of the sub-PUs may be coded to use the same reference picture for the same reference picture list (denoted by targetRefLX) via scaling the motion vectors toward targetRefLX (with X being 0 or 1). The motion vectors are scaled based on POC distances similar as in the HEVC motion prediction. Such a picture may be referred to as a target sub-PU motion prediction picture. In one example, targetRefL0 and targetRefL1 may be the same. In another example, targetRefLX may be the reference picture that is most frequently used by all sub-PUs within a current PU. In yet another example, targetRefLX may be the first entry of a current reference picture list X.

In some examples, targetRefLX may be the reference picture that has the minimum POC difference to that of the current picture in the reference picture list of the current picture, the temporal reference picture (from the same view) which has the smallest reference picture index in a reference picture list, or the target reference picture used by advanced residual prediction. In some examples, all PUs of the whole picture use the same reference picture targetRefLX for sub-PU level inter-view motion prediction. In addition, such a picture may be signaled in the slice header. In some examples, if a sub-PU in a reference view contains a motion vector corresponding to an inter-view reference, the sub-PU is considered to be unavailable. A sub-PU may be unavailable when a PU covering a location associated the spatial merge candidate is coded using intra prediction or is outside a current slice or picture boundary.

In some examples, one target sub-PU motion prediction picture is allocated for temporal prediction when the reference picture corresponds to a temporal reference picture and another target sub-PU motion prediction picture is allocated for inter-view prediction when the reference picture corresponds to an inter-view reference picture. In this disclosure, target motion prediction pictures being allocated for prediction means that the motion information corresponding to the target motion prediction pictures is copied and assigned to the current pictures. The motion vectors corresponding to the second target sub-PU motion prediction picture are scaled based on view identifiers or other camera parameters.

Optionally, unification of the sub-PU motion may be done so that motion compensation of multiple neighboring sub-PUs may be done just once if they have the same motion information. In other words, the same motion information may be assigned to multiple neighboring sub-PUs, and future operations on one sub-PU may be inherited by neighboring sub-PUs with the same motion information. Consider the PU as a root of a group of sub-PUs with the same motion information. A video coder may set the current node as root and the following steps may apply. If all motion information of a group of sub-PUs is the same (same motion vectors and same reference indices are the same), the current node may be tagged as "no splitting," meaning that the sub-PUs are grouped together such that future operations performed on one sub-PU are inherited by the remaining sub-PUs in that group. Otherwise, split the current node into square size regions, each region corresponding to a new node. If the size of the current node is 2W×2W, the square size region may be W×W or 2W×2W. Otherwise, if the current node is 2W×W or W×2W, the square size region may be W×W. For each new node with a size of W×W, if the new node contains multiple sub-PUs, the video coder may set the current node to be the new node. Otherwise, the current node is tagged as "no splitting." During motion compensation, all pixels within a node tagged as "no splitting" have one motion compensation process, meaning that all operations performed on one sub-PU in a group of other sub-PUs tagged as "no splitting" are inherited by the remaining sub-PUs in the group. In some examples, in addition, a quad-tree structure similar to that in the current HEVC CTB may be defined inside a PU and motion compensation may be performed in the node when the splitting flag is equal to 0, which is equivalent to the situation when the node is tagged with "no splitting."

In some examples, instead of performing the motion compensation based on fixed size of sub-PUs (denoted by N×N, e.g., N is equal to 4, 8, or 16), the motion information of two neighboring sub-PUs is firstly checked and, if the motion information is identical (i.e., same motion vectors and same reference indices), these two sub-PUs are merged into one larger sub-PU and the motion compensation techniques are performed once to the merged larger sub-PU rather than twice, once to each of the sub-PUs. In one example, in a first loop of a video coder checking motion information for two neighboring sub-PUs, every two neighboring sub-PUs in the same row/column are firstly checked and merged to one 2N×N (or N×2N) sub-PU. In a second loop of a video coder checking motion information for two neighboring sub-PUs, for two neighboring sub-PUs in the same row/column with size equal to 2N×N (or N×2N), the motion information is further checked and merged to one 4N×N (or N×4N) sub-PU if the motion compensation is identical. In other words, the video coder checks the motion information for two neighboring sub-PUs and merges them into a single, larger sub-PU if the motion information is the same for both of the neighboring sub-PUs. In some examples, in the first loop, every two neighboring sub-PUs in the same row/column are firstly checked and merged to one 2N×N (or N×2N) sub-PU. In the second loop, for two neighboring sub-PUs in the same column/row with size equal to N×2N (or 2N×N), the motion information is further checked and merged to one 2N×2N sub-PU if the motion compensation is identical.

As indicated elsewhere in this disclosure, when a reference block for a current sub-PU is not coded using motion compensated prediction, a video coder may search in raster scan order for a nearest sub-PU that has a reference block that is coded using motion compensated prediction. If the video coder is able to identify a sub-PU that has a reference block that is coded using motion compensated prediction, the video coder may copy the motion information of the identified sub-PU as the motion information for the current sub-PU. However, in accordance with some techniques of this disclosure, instead of copying the motion information of the nearest sub-PU in the raster scan order to current sub-PU of which the motion information is unavailable, the video coder copies the motion information from the left, above, above-left or above-right neighboring sub-PU. In other words, if motion information for a reference picture is unavailable, a video coder may check the motion information from neighboring sub-PUs positioned either left, above-left, above-right, or above the current sub-PU. If one of the neighboring sub-PUs has been allocated motion information from a reference picture, motion information from that neighboring sub-PU may be copied and allocated to the current sub-PU.

If such motion information from a neighboring sub-PU is not found (e.g., it is the first sub-PU and its reference block is intra-coded, all neighboring sub-PU are unavailable), the video coder uses a default motion vector and reference index. In one example, three of the above, above-left and above-right neighboring sub-PUs are used together in a certain order. If one of the neighboring sub-PUs contains unavailable motion information, the others may be used. Alternatively, bottom, bottom-left or bottom-right neighboring sub-PUs can be used to fill the motion information of the current corresponding sub-PU, if its motion information is unavailable. In other words, neighboring sub-PUs different than the left, above, above-left, or above-right neighboring sub-PUs may be used. In some examples, the default motion vector is a zero motion vector (i.e., a motion vector having horizontal and vertical components equal to 0). Furthermore, in some examples, the default reference index is equal to the syntax element targetRefLX. In some examples, the default reference index is equal to 0.

In some examples, similar to current sub-PU level inter-view motion prediction from one texture view to another texture view, a video coder may apply sub-PU level motion prediction from one texture view to the corresponding depth view. For instance, the current PU is divided into several sub-PUs. Each of the sub-PUs uses the motion information of the co-located texture block for motion compensation. In other words, motion prediction may be performed once on a texture block, and the results of that motion prediction may be copied to a co-located depth block. In this case, the disparity vector used by inter-view motion prediction is considered to be always zero.

In accordance with one or more techniques of this disclosure, a video coder, such as video encoder 20, may divide a current prediction unit (PU) into a plurality of sub-PUs. Each of the sub-PUs may have a size smaller than a size of the PU. Furthermore, the current PU may be in a depth view of the multi-view video data. For each respective sub-PU from the plurality of sub-PUs, video encoder 20 may identify a reference block for the respective sub-PU. The reference block may be co-located with the respective sub-PU in a texture view corresponding to the depth view. Video encoder 20 may use motion parameters of the identified reference block for the respective sub-PU to determine motion parameters for the respective sub-PU.

In accordance with one or more techniques of this disclosure, video decoder 30 may divide a current prediction unit (PU) into a plurality of sub-PUs. Each of the sub-PUs may have a size smaller than a size of the PU. Furthermore, the current PU may be in a depth view of the multi-view video data. For each respective sub-PU from the plurality of sub-PUs, video decoder 30 may identify a reference block for the respective sub-PU. The reference block may be co-located with the respective sub-PU in a texture view corresponding to the depth view. Video decoder 30 may use motion parameters of the identified reference block for the respective sub-PU to determine motion parameters for the respective sub-PU. In some examples, disparity vectors may be different for sub-PUs within the same PU. Therefore, the corresponding sub-PU may be identified one by one in the reference picture, but higher coding efficiency may be expected.

In some examples, a video coder (e.g., video encoder 20 or video decoder 30) may divide a current PU into a plurality of sub-PUs. Each of the sub-PUs has a size smaller than a size of the PU. In such examples, the current PU is in a depth view of the multi-view video data. For at least one respective sub-PU of the plurality of sub-PUs, the video coder identifies a reference block for the respective sub-PU. The identified reference block for the respective sub-PU is co-located with the respective sub-PU in a texture view corresponding to the depth view. Furthermore, the video coder may use motion parameters of the identified reference block for the respective sub-PU to determine motion parameters for the respective sub-PU.

Figure 17:
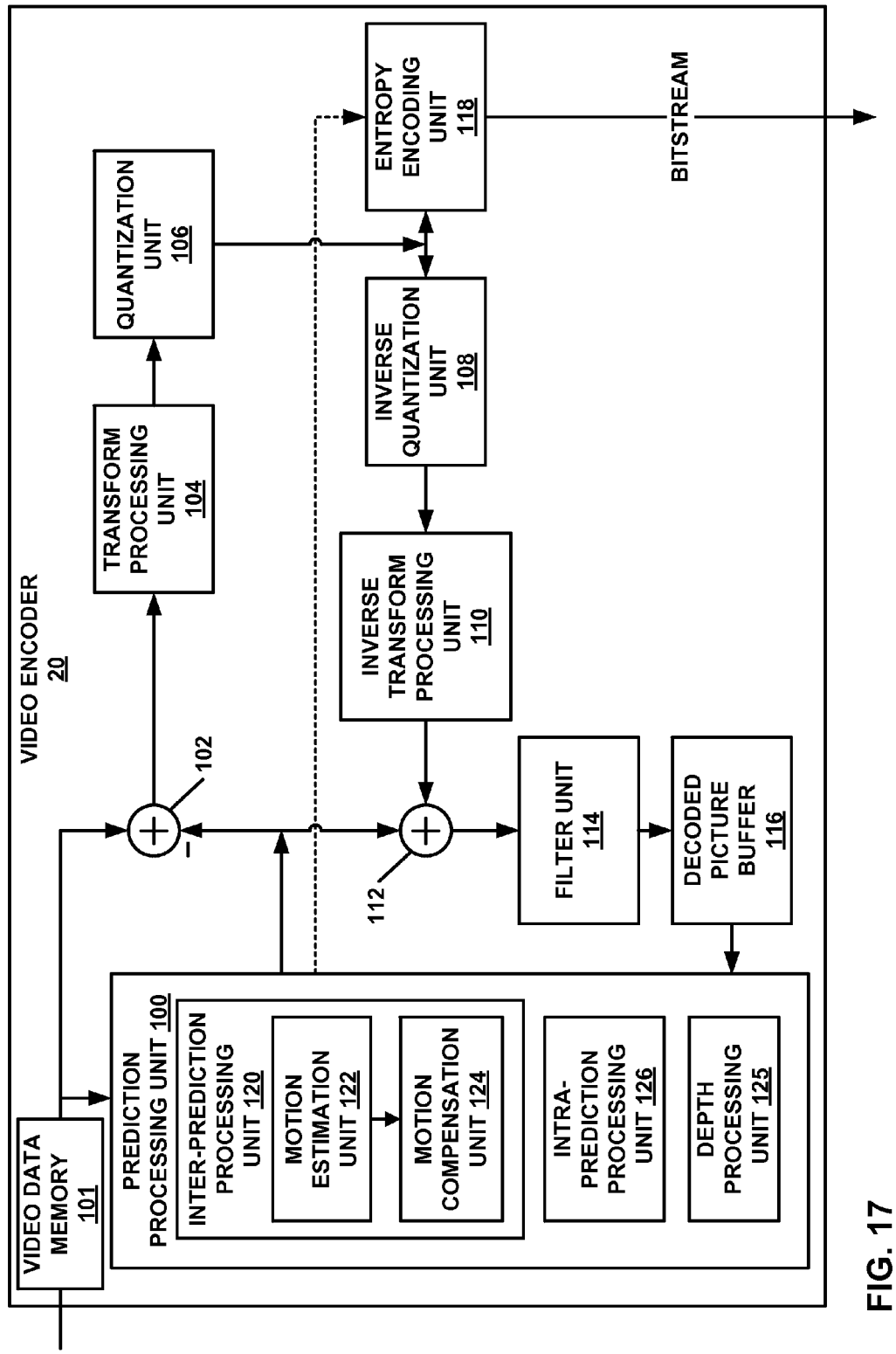
FIG. 17 is a block diagram illustrating an example video encoder that may implement the techniques described in this disclosure.

FIG. 17 is a block diagram illustrating an example video encoder 20 that may implement the techniques of this disclosure. FIG. 17 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 17, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

In some examples, video encoder 20 may further include video data memory 101. Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

If a PU is in a P slice, motion estimation unit 122 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a coding block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

In some examples, motion estimation unit 122 may generate a merge candidate list for the PU. As part of generating the merge candidate list, motion estimation unit 122 may determine an IPMVC and/or a texture merge candidate. When determining the IPMVC and/or the texture merge candidate, motion estimation unit 122 may partition the PU into sub-PUs and process the sub-PUs according to a particular order to determine motion parameters for the sub-PUs. In accordance with one or more techniques of this disclosure, if a reference block for a respective sub-PU is not coded using motion compensated prediction, motion estimation unit 122 does not set the motion parameters of the respective sub-PU in response to a subsequent determination that a reference block for any later sub-PU in the particular order is coded using motion compensated prediction. Rather, if a reference block for a respective sub-PU is not coded using motion compensated prediction, motion estimation unit 122 may set to motion parameters of the respective sub-PU to default motion parameters. If the IPMVC or the texture merge candidate is the selected merge candidate in the merge candidate list, motion compensation unit 124 may determine a predictive block for the respective PU based on motion parameters specified by the IPMVC or the texture merge candidate.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive blocks for the PU. When performing intra prediction using a particular intra prediction mode, intra-prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) of a CU and the selected predictive blocks (e.g., selected predictive luma, Cb and Cr blocks) of the PUs of the CU, residual blocks (e.g., luma, Cb and Cr residual blocks) of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118.

Figure 18:
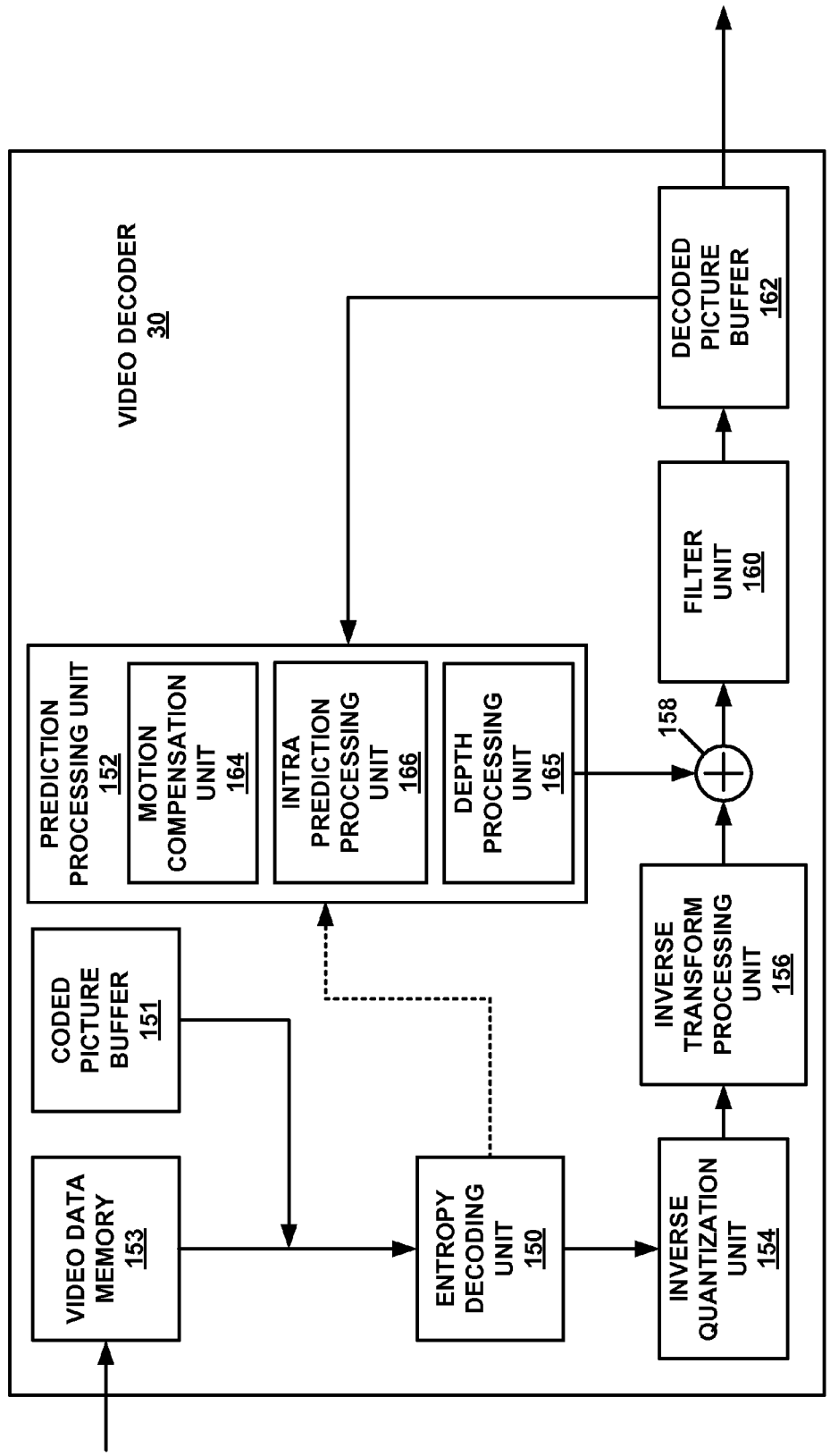
FIG. 18 is a block diagram illustrating an example video decoder that may implement the techniques described in this disclosure.

FIG. 18 is a block diagram illustrating an example video decoder 30 that may implement the techniques of this disclosure. FIG. 18 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 18, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

In some examples, video decoder 30 may further include video data memory 153. Video data memory 153 may store video data, such as an encoded video bitstream, to be decoded by the components of video decoder 30. The video data stored in video data memory 153 may be obtained, for example, from computer-readable medium 16, e.g., from a local video source, such as a camera, via wired or wireless network communication of video data, or by accessing physical data storage media. Video data memory 153 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 153 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 153 and decoded picture buffer 162 may be provided by the same memory device or separate memory devices. In various examples, video data memory 153 may be on-chip with other components of video decoder 30, or off-chip relative to those components.

A coded picture buffer (CPB) 151 may receive and store encoded video data (e.g., NAL units) of a bitstream. Entropy decoding unit 150 may receive NAL units from CPB 151 and parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice.

In addition to obtaining syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 154 may inverse quantize, i.e., de-quantize, coefficient blocks associated with TUs of the CU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb, and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive luma, Cb, and Cr blocks for the PU.

In some examples, motion compensation unit 164 may generate a merge candidate list for the PU. As part of generating the merge candidate list, motion compensation unit 164 may determine an IPMVC and/or a texture merge candidate. When determining the IPMVC and/or the texture merge candidate, motion compensation unit 164 may partition the PU into sub-PUs and process the sub-PUs according to a particular order to determine motion parameters for each of the sub-PUs. In accordance with one or more techniques of this disclosure, if a reference block for a respective sub-PU is not coded using motion compensated prediction, motion compensation unit 164 does not set the motion parameters of the respective sub-PU in response to a subsequent determination that a reference block for any later sub-PU in the particular order is coded using motion compensated prediction. Rather, if a reference block for a respective sub-PU is not coded using motion compensated prediction, motion compensation unit 164 may set to motion parameters of the respective sub-PU to default motion parameters. If the IPMVC or the texture merge candidate is the selected merge candidate in the merge candidate list, motion compensation unit 164 may determine a predictive block for the respective PU based on motion parameters specified by the IPMVC or the texture merge candidate.

Reconstruction unit 158 may use the residual values from the transform blocks (e.g., luma, Cb, and Cr transform blocks) associated with TUs of a CU and the predictive blocks (e.g., predictive luma, Cb, and Cr blocks) of the PUs of the CU, i.e., either intra-prediction data or inter-prediction data, as applicable, to reconstruct the coding blocks (e.g., luma, Cb, and Cr coding blocks) of the CU. For example, reconstruction unit 158 may add samples of the transform blocks (e.g., luma, Cb, and Cr transform blocks) to corresponding samples of the predictive blocks (e.g., predictive luma, Cb, and Cr blocks) to reconstruct the coding blocks (e.g., luma, Cb, and Cr coding blocks) of the CU.

Filter unit 160 may perform a deblocking operation to reduce blocking artifacts associated with the coding blocks (e.g., luma, Cb, and Cr coding blocks) of the CU. Video decoder 30 may store the coding blocks (e.g., luma, Cb, and Cr coding blocks) of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks (e.g., luma, Cb, and Cr blocks) in decoded picture buffer 162, intra prediction or inter prediction operations on PUs of other CUs. In this way, video decoder 30 may extract, from the bitstream, transform coefficient levels of a significant (e.g., luma) coefficient block, inverse quantize the transform coefficient levels, apply a transform to the transform coefficient levels to generate a transform block, generate, based at least in part on the transform block, a coding block, and output the coding block for display.

The following section provides example decoding process changes to 3D-HEVC (which is publicly available). In a derivation process for a sub-PU temporal inter-view motion vector candidate, a video coder may firstly generate a PU-level inter-view predicted motion vector candidate. If the center reference sub-PU (i.e., the center sub-PU in the inter-view reference block) is coded with inter prediction mode and the center reference sub-PU's reference picture in reference picture list X has a POC value identical to that of one entry in the reference picture list X of the current slice, for X=0 or 1, its motion vector and reference picture is used as PU-level predicted motion vector candidate. Otherwise, the video coder may use zero motion with reference picture index equal to 0 for reference picture list 0 and reference picture list 1 (if current slice is a B slice) as the PU-level predicted motion vector candidate. The video coder may then use the PU-level predicted motion vector candidate as motion of sub-PU whose corresponding reference block is either coded with intra prediction mode or coded with inter prediction mode but its reference picture is not included in the reference picture list of the current slice.

Examples of this disclosure may change the sub-PU level inter-view motion prediction process (or derivation process for a sub prediction block temporal inter-view motion vector candidate) defined in 3D-HEVC Draft Text 2 (i.e., document JCT3V-F1001v2). In accordance with one or more examples of this disclosure, text added to 3D-HEVC Draft Text 2 is underlined and text deleted from 3D-HEVC Draft Text 2 are italicized and enclosed in double square brackets.

Decoding Process

H.8.5.3.2.16 Derivation Process for a Sub Prediction Block Temporal Inter-View Motion Vector Candidate This process is not invoked when iv_mv_pred_flag [nuh_layer_id] is equal to 0.

Inputs to this process are:

a luma location (xPb, yPb) of the top-left luma sample of the current prediction unit relative to the top-left luma sample of the current picture, variables nPbW and nPbH specifying the width and the height, respectively, of the current prediction unit, a reference view index refViewIdx.

a disparity vector mvDisp,

Outputs of this process are:

the flags availableFlagLXInterView, with X in the range of 0 to 1, inclusive, specifying whether the temporal inter-view motion vector candidate is available, the temporal inter-view motion vector candidate mvLXInterView, with X in the range of 0 to 1, inclusive.

the reference index refIdxLXInterView, with X in the range of 0 to 1, inclusive, specifying a reference picture in the reference picture list RefPicListLX, For X in the range of 0 to 1, inclusive, the following applies:

The flag availableFlagLXInterView is set equal to 0.

The motion vector mvLXInterView is set equal to (0, 0).

The reference index refIdxLXInterView is set equal to −1.

The variables nSbW and nSbH are derived as:

$$nSbW = \text{Min}(nPbW, \text{SubPbSize}[\text{nuh\_layer\_id}]) \tag{H-173}$$

$$nSbH = \text{Min}(nPbH, \text{SubPbSize}[\text{nuh\_layer\_id}]) \tag{H-174}$$

The variable ivRefPic is set equal to the picture with ViewIdx equal to refViewIdx in the current access unit.

The following applies to derive variable flag centerPredFlagLX, motion vector centerMvLX and reference index centerRefIdxLX.

The variable centerAvailableFlag is set equal to 0.
 For X in the range of 0 to 1, inclusive, the following applies:
  The flag centerPredFlagLX is set equal to 0.
  The motion vector centerMvLX is set equal to (0, 0).
  The reference index centerRefIdxLX is set equal to −1.
 The reference layer luma location (xRef, yRef) is derived by $$x\text{Ref} = \text{Clip3}(0, \text{PicWidthInSamples}L-1, x\text{Pb} + (nPbW/nSbW/2)*nSbW + nSbW/2 + ((\text{mvDisp}[0]+2)>>2)) \quad \text{(H-175)}$$

$$y\text{Ref} = \text{Clip3}(0, \text{PicHeightInSamples}L-1, y\text{Pb} + (nPbH/nSbH/2)*nSbH + nSbH/2 + ((\text{mvDisp}[1]+2)>>2)) \quad \text{(H-176)}$$

The variable ivRefPb specifies the luma prediction block covering the location given by (xRef, yRef) inside the inter-view reference picture specified by ivRefPic.
 The luma location (xIvRefPb, yIvRefPb) is set equal to the top-left sample of the inter-view reference luma prediction block specified by ivRefPb relative to the top-left luma sample of the inter-view reference picture specified by ivRefPic.
 When ivRefPb is not coded in an intra prediction mode, the following applies for X in the range of 0 to 1, inclusive:
When X is equal 0 or the current slice is a B slice, the following applies for Y in the range of X to (1−X), inclusive:
 The variables refPicListLYIvRef, predFlagLYIvRef, mvLYIvRef, and refIdxLYIvRef are set equal to RefPicListLY, PredFlagLY, MvLY, and RefIdxLY of the picture ivRefPic, respectively.
 When predFlagLYIvRef[xIvRefPb][yIvRefPb] is equal to 1, the following applies for each i from 0 to num_ref_idx_lX_active_minus1, inclusive:
  When PicOrderCnt(refPicListLYIvRef[refIdxLYIvRef[xIvRefPb][yIvRefPb]]) is equal to PicOrderCnt(RefPicListLX[i]) and centerPredFlagLX is equal to 0, the following applies.

$$\text{centerMvLX} = \text{mvLYIvRef}[x\text{IvRefPb}][y\text{IvRefPb}] \quad \text{(H-177)}$$

$$\text{centerRefIdxLX} = i \quad \text{(H-178)}$$

$$\text{centerPredFlagLX} = 1 \quad \text{(H-179)}$$

$$\text{centerAvailableFlag} = 1 \quad \text{(H-180)}$$

if centerAvailableFlag is equal to 0 and ivRefPic is not I slice, the following applies for X in the range of 0 to 1, inclusive:

$$\text{center}M\nu LX = (0,0) \quad \text{(H-181)}$$

$$\text{centerRefIdxLX} = 0 \quad \text{(H-182)}$$

$$\text{centerPredFlagLX} = 1 \quad \text{(H-183)}$$

For X in the range of 0 to 1, inclusive, the following applies:
 The flag availableFlagLXInterView is set equal to centerPredFlagLX.
 The motion vector mvLXInterView is set equal to centerMvLX.
 The reference index refIdxLXInterView is set equal to centerRefIdxLX.

For yBlk in the range of 0 to (nPbH/nSbH−1), inclusive, and for xBlk in the range of 0 to (nPbW/nSbW−1), inclusive, the following applies:
 The variable curAvailableFlag is set equal to 0.
 For X in the range of 0 to 1, inclusive, the following applies:
  The flag spPredFlagL1[xBlk][yBlk] is set equal to 0.
  The motion vector spMvLX is set equal to (0, 0).
  The reference index spRefIdxLX[xBlk][yBlk] is set equal to −1.
 The reference layer luma location (xRef, yRef) is derived by $$x\text{Ref} = \text{Clip3}(0, \text{PicWidthInSamples}L-1, x\text{Pb} + x\text{Blk}*nSbW + nSbW/2 + ((\text{mvDisp}[0]+2)>>2)) \quad \text{(H-184)}$$

$$y\text{Ref} = \text{Clip3}(0, \text{PicHeightInSamples}L-1, y\text{Pb} + y\text{Blk}*nSbH + nSbH/2 + ((\text{mvDisp}[1]+2)>>2)) \quad \text{(H-185)}$$

The variable ivRefPb specifies the luma prediction block covering the location given by (xRef, yRef) inside the inter-view reference picture specified by ivRefPic.
 The luma location (xIvRefPb, yIvRefPb) is set equal to the top-left sample of the inter-view reference luma prediction block specified by ivRefPb relative to the top-left luma sample of the inter-view reference picture specified by ivRefPic.
 When ivRefPb is not coded in an intra prediction mode, the following applies for X in the range of 0 to 1, inclusive:
When X is equal 0 or the current slice is a B slice, the following applies for Y in the range of X to (1−X), inclusive:
 The variables refPicListLYIvRef, predFlagLYIvRef[x][y], mvLYIvRef[x][y], and refIdxLYIvRef[x][y] are set equal to RefPicListLY, PredFlagLY[x][y], MvLY[x][y], and RefIdxLY[x][y] of the picture ivRefPic, respectively.
 When predFlagLYIvRef[xIvRefPb][yIvRefPb] is equal to 1, the following applies for each i from 0 to num_ref_idx_lX_active_minus1, inclusive:
  When PicOrderCnt(refPicListLYIvRef[refIdxLYIvRef[xIvRefPb][yIvRefPb]]) is equal to PicOrderCnt(RefPicListLX[i]) and spPredFlagLX[xBlk][yBlk] is equal to 0, the following applies.

$$\text{spMvLX}[x\text{Blk}][y\text{Blk}] = \text{mvLYIvRef}[x\text{IvRefPb}][y\text{IvRefPb}] \quad \text{(H-186)}$$

$$\text{spRefIdxLX}[x\text{Blk}][y\text{Blk}] = i \quad \text{(H-187)}$$

$$\text{spPredFlagLX}[x\text{Blk}][y\text{Blk}] = 1 \quad \text{(H-188)}$$

$$\text{curAvailableFlag} = 1 \quad \text{(H-189)}$$

if curAvailableFlag is equal to 0 the following applies for X in the range of 0 to 1, inclusive:

$$\text{spMvLX}[x\text{Blk}][y\text{Blk}] = \text{center}M\nu LX \quad \text{(H-190)}$$

$$\text{spRefIdxLX}[x\text{Blk}][y\text{Blk}] = \text{centerRefIdxLX} \quad \text{(H-191)}$$

$$\text{spPredFlagLX}[x\text{Blk}][y\text{Blk}] = \text{centerPredFlagLX} \quad \text{(H-192)}$$

For use in derivation processes of variables invoked later in the decoding process, the following assignments are made for x=0 . . . nPbW−1 and y=0 . . . nPbH−1:
For X in the range of 0 to 1, inclusive, the following applies:
The variables SubPbPredFlagLX, SubPbMvLX and SubPbRefIdxLX are derived as specified in following:

$$\text{Sub}Pb\text{PredFlag}LX[xPb+x][yPb+y]=sp\text{PredFlag}LX[x/nSbW][y/nSbW] \quad \text{(H-193)}$$

$$\text{Sub}PbMvLX[xPb+x][yPb+y]=spMvLX[x/nSbW][y/nSbW] \quad \text{(H-194)}$$

$$\text{Sub}Pb\text{RefIdx}LX[xPb+x][yPb+y]=sp\text{RefIdx}LX[x/nSbW][y/nSbW] \quad \text{(H-195)}$$

The derivation process for chroma motion vectors in subclause 8.5.3.2.9 is invoked with SubPbMvLX[xPb+x][yPb+y] as input and the output is SubPbMvCLX[xPb+x][yPb+y].

In accordance with one or more techniques of this disclosure, a video coder may partition a current PU into a plurality of sub-PUs. Furthermore, the video coder may determine default motion parameters. In addition, the video coder may process sub-PUs from the plurality of sub-PUs in a particular order. In some instances, the video coder may determine the default motion parameters prior to processing any of the sub-PUs. For each respective PU of the current PU, the video coder may determine a reference block for the respective sub-PU. If the reference block for the respective sub-PU is coded using motion compensated prediction, the video coder may set motion parameters of the respective sub-PU based on motion parameters of the reference block for the respective sub-PU. However, if the reference block for the respective sub-PU is not coded using motion compensated prediction, the video coder may set the motion parameters of the respective sub-PU to the default motion parameters.

In accordance with one or more techniques of this disclosure, if a reference block for a respective sub-PU is not coded using motion compensated prediction, the motion parameters of the respective sub-PU are not set in response to a subsequent determination that a reference block for any later sub-PU in the particular order is coded using motion compensated prediction. Thus, when the video coder is processing the sub-PUs, the video coder may not need to scan forward to find a sub-PU whose corresponding reference block is coded using motion compensated prediction or delay determining the motion parameters of the respective sub-PU until the video coder encounters, during the processing of the sub-PUs, a PU whose corresponding reference block is coded using motion compensated prediction. Advantageously, this may decrease complexity and coding delay.

FIG. 19A is a flowchart illustrating an example operation of video encoder 20 to encode a CU using inter prediction, in accordance with an example of this disclosure. In the example of FIG. 19A, video encoder 20 may generate a merge candidate list for a current PU of a current CU (200). In accordance with one or more examples of this disclosure, video encoder 20 may generate the merge candidate list such that the merge candidate list includes a temporal inter-view merge candidate based on motion information for sub-PUs of the current PU. In some examples, the current PU may be a depth PU and video encoder 20 may generate the merge candidate list such that the merge candidate list includes a texture merge candidate based on motion information for sub-PUs of the current depth PU. Furthermore, in some examples, video encoder 20 may perform the operation of FIG. 20 to generate the merge candidate list for the current PU.

After generating the merge candidate list for the current PU, video encoder 20 may select a merge candidate from the merge candidate list (202). In some examples, video encoder 20 may select the merge candidate based on a rate/distortion analysis. Furthermore, video encoder 20 may use the motion information (e.g., the motion vectors and reference indexes) of the selected merge candidate to determine predictive blocks for the current PU (204). Video encoder 20 may signal a merge candidate index that indicates a position within the merge candidate list of the selected merge candidate (206).

If the selected merge candidate is an IPMVC or an MVI candidate (i.e., a texture merge candidate) constructed using sub-PUs as described in the examples of this disclosure, the IPMVC or MVI candidate may specify a separate set of motion parameters (e.g., a set of one or more motion vectors and a set of one or more reference indexes) for each sub-PU of the current PU. When video encoder 20 is determining the predictive block for the current PU, video encoder 20 may use the motion parameters of the sub-PUs of the current PU to determine predictive blocks for the sub-PUs. Video encoder 20 may determine the predictive blocks for the current PU by assembling the predictive blocks for the sub-PUs of the current PU.

Video encoder 20 may determine whether there are any remaining PUs in the current CU (208). If there are one or more remaining PUs in the current CU ("YES" of 208), video encoder 20 may repeat actions 200-208 with another PU of the current CU as the current PU. In this way, video encoder 20 may repeat actions 200-208 for each PU of the current CU.

When there are no remaining PUs of the current CU ("NO" of 208), video encoder 20 may determine residual data for the current CU (210). In some examples, each sample of the residual data may indicate a difference between a sample in a coding block of the current CU and a corresponding sample in a predictive block of a PU of the current CU. In other examples, video encoder 20 may use ARP to determine the residual data for the current CU. Video encoder 20 may signal the residual data in a bitstream (212). For instance, video encoder 20 may signal the residual data in the bitstream by applying one or more transforms to the residual data to generate coefficient blocks, quantize the coefficients, entropy encode syntax elements indicating the quantized coefficients, and include the entropy encoded syntax elements in the bitstream.

FIG. 19B is a flowchart illustrating an example operation of video decoder 30 to decode a CU using inter prediction, in accordance with an example of this disclosure. In the example of FIG. 19B, video decoder 30 may generate a merge candidate list for a current PU of a current CU (220). In accordance with one or more examples of this disclosure, video decoder 30 may generate the merge candidate list such that the merge candidate list includes a temporal inter-view merge candidate based on motion information for sub-PUs of the current PU. In some examples, the current PU may be a depth PU and video decoder 30 may generate the merge candidate list such that the merge candidate list includes a texture merge candidate based on motion information for sub-PUs of the current depth PU. Furthermore, in some examples, video decoder 30 may perform the operation of FIG. 20 to generate the merge candidate list for the current PU.

After generating the merge candidate list for the current PU, video decoder 30 may determine a selected merge candidate from the merge candidate list (222). In some examples, video decoder 30 may determine the selected merge candidate based on a merge candidate index signaled in the bitstream. Furthermore, video decoder 30 may use the motion parameters (e.g., the motion vectors and reference indexes) of the selected merge candidate to determine predictive blocks for the current PU (224). For instance, video decoder 30 may use the motion parameters of the selected merge candidate to determine a luma predictive block, a Cb predictive block, and a Cr predictive block for the current PU.

If the selected merge candidate is an IPMVC or a MVI candidate constructed using sub-PUs as described in the examples of this disclosure, the IPMVC or MVI candidate may specify a separate set of motion parameters (e.g., a set of one or more motion vectors and a set of one or more reference indexes) for each sub-PU of the current PU. When video decoder 30 is determining the predictive block for the current PU, video decoder 30 may use the motion parameters of the sub-PUs of the current PU to determine predictive blocks for the sub-PUs. Video decoder 30 may determine the predictive blocks for the current PU by assembling the predictive blocks for the sub-PUs of the current PU.

Video decoder 30 may then determine whether there are any remaining PUs in the current CU (226). If there are one or more remaining PUs in the current CU ("YES" of 226), video decoder 30 may repeat actions 220-226 with another PU of the current CU as the current PU. In this way, video decoder 30 may repeat actions 220-226 for each PU of the current CU.

When there are no remaining PUs of the current CU ("NO" of 226), video decoder 30 may determine residual data for the current CU (228). In some examples, video decoder 30 may determine the residual data in parallel with determining the motion parameters of the PUs of the current CU. In some examples, video decoder 30 may use ARP to determine the residual data for the current CU. In addition, video decoder 30 may reconstruct the coding blocks of the current CU based on the predictive blocks for the PUs of the current CU and the residual data for the current CU (230).

Figure 20:
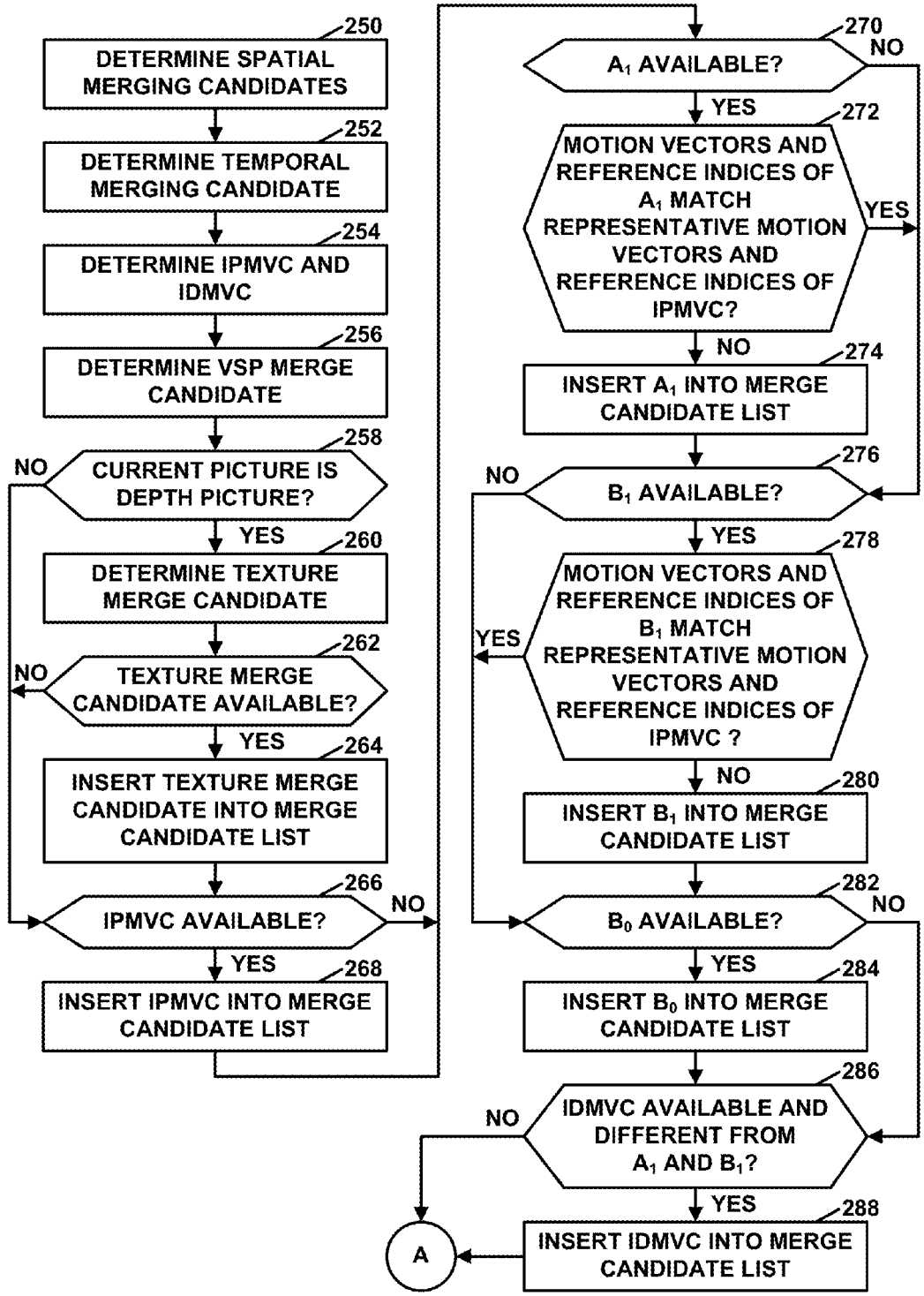
FIG. 20 is a flowchart illustrating an example operation of a video coder to construct a merge candidate list for a current PU in a current view component, in accordance with an example of this disclosure.

FIG. 20 is a flowchart illustrating an example operation of a video coder to construct a merge candidate list for a current PU in a current view component, in accordance with an example of this disclosure. In the example of FIG. 20, the video coder (e.g., video encoder 20 or video decoder 30) may determine spatial merging candidates (250). The spatial merge candidates may include merge candidates that specify the motion parameters of PUs that cover locations $A_0$, $A_1$, $B_0$, $B_1$, and $B_2$ in FIG. 3. In some examples, the video coder may determine the spatial merge candidates by performing the operation described in subclause G.8.5.2.1.2 of MV-HEVC Test Model 4. Furthermore, in the example of FIG. 20, the video coder may determine a temporal merging candidate (252). The temporal merging candidate may specify the motion parameters of a PU of a reference view component that is in a different time instance than the current view component. In some examples, the video coder may determine the temporal merge candidate by performing the operation described in subclause H.8.5.2.1.7 of 3D-HEVC Test Model 4.

In addition, the video coder may determine an IPMVC and an IDMVC (254). In accordance with the examples of this disclosure, the video coder may generate the IPMVC using a sub-PU level inter-view motion prediction technique. Hence, the IPMVC may specify motion parameters of each sub-PU of the current PU. In some examples, the video coder may perform the operation of FIG. 22 or FIG. 24 to determine the IPMVC. The IDMVC may specify the disparity vector for the current PU. In some examples, the video coder only determines the IPMVC and the IDMVC when an inter-view motion prediction flag (e.g., iv_mv_pred_flag) for a current layer indicates that inter-view motion prediction is enabled for the current layer. The current layer may be the layer to which the current view component belongs.

Furthermore, in the example of FIG. 20, the video coder may determine a VSP merge candidate (256). In some examples, the video coder may determine the VSP merge candidate by performing the operation described in subclause H.8.5.2.1.12 of 3D-HEVC Test Model 4. In some examples, the video coder only determines the VSP merge candidate when a view synthesis prediction flag for the current layer indicates that view synthesis prediction is enabled for the current layer.

In addition, the video coder may determine whether the current view component is a depth view component (258). Responsive to determining that the current view component is a depth view component ("YES" of 258), the video coder may determine a texture merge candidate (260). The texture merge candidate may specify the motion information of one or more PUs in a texture view component that corresponds to the current (depth) view component. In accordance with one or more examples of this disclosure, the video coder may generate the texture merge candidate using a sub-PU level motion prediction technique. Hence, the texture merge candidate may specify motion parameters of each sub-PU of the current PU. In some examples, the video coder may perform the operation of FIG. 22 to determine the texture merge candidate. The video coder may then determine whether the texture merge component is available (262). Responsive to determining that the texture merge component is available ("YES" of 262), the video coder may insert the texture merge candidate into the merge candidate list (264).

Responsive to determining that the current picture is not a depth picture ("NO" of 258), responsive to determining that the texture merge candidate is not available ("NO" of 262), or after inserting the texture merge candidate into the merge candidate list, the video coder may determine whether the IPMVC is available (266). The IPMVC may be unavailable when the video coder was unable to determine the IPMVC, such as when the current PU is in a base view. Responsive to determining that the IPMVC is available ("YES" of 268), the video coder may insert the IPMVC into the merge candidate list (268).

Responsive to determining that the IPMVC is not available ("NO" of 266) or after inserting the IPMVC into the merge candidate list, the video coder may determine whether the spatial merge candidate for location $A_1$ (i.e., the $A_1$ spatial merge candidate) is available (270). A spatial merge candidate, such as the $A_1$ spatial merge candidate, may be unavailable when a PU covering a location associated the spatial merge candidate (e.g., location $A_0$, $A_1$, $B_0$, $B_1$, or $B_2$) is coded using intra prediction or is outside a current slice or picture boundary. Responsive to determining that the $A_1$ spatial merge candidate is available ("YES" of 270), the video coder may determine whether the motion vectors and reference indices of the $A_1$ spatial merge candidate match representative motion vectors and representative reference indices of the IPMVC (270). Responsive to determining that the motion vectors and reference indices of the $A_1$ spatial merge candidate do not match the representative motion vectors and the representative reference indices of the IPMVC ("NO" of 272), the video coder may insert the $A_1$ spatial merge candidate into the merge candidate list (274).

As indicated above, the video coder may generate the IPMVC and/or texture merge candidate using a sub-PU level motion prediction technique. Hence, the IPMVC and/or texture merge candidate may specify multiple motion vectors and multiple reference indices. Accordingly, the video coder may determine whether the motion vectors of the $A_1$ spatial merge candidate match representative motion vectors of the IPMVC and/or the texture merge candidate and whether the reference indices of the $A_1$ spatial merge candidate match representative reference indices of the IPMVC and/or texture merge candidate. The representative motion vectors and representative reference indices of the IPMVC may be referred to herein as a "PU-level IPMVC." The representative motion vectors and representative reference indices of the texture merge candidate may be referred to herein as a "PU-level motion parameter inheritance (MPI) candidate." The video coder may determine the PU-level IPMVC and PU-level MPI candidate in various ways. Examples of how the video coder may determine the PU-level IPMVC and PU-level MPI candidate are described elsewhere in this disclosure.

Responsive to determining that the $A_1$ spatial merge candidate is not available ("NO" of 270), responsive to determining that the motion vectors and reference indices of the $A_1$ spatial merge candidate match the representative motion vectors and representative reference indices of the IPMVC ("YES" of 272), or after inserting the $A_1$ spatial merge candidate into the merge candidate list, the video coder may determine whether the spatial merge candidate for location $B_1$ (i.e., the $B_1$ spatial merge candidate) is available (276). Responsive to determining that the $B_1$ spatial merge candidate is available ("YES of 276), the video coder may determine whether motion vectors and reference indices of the $B_1$ spatial merge candidate match the representative motion vectors and the representative reference indices of the IPMVC (278). Responsive to determining that the motion vectors and reference indices of the $B_1$ spatial merge candidate do not match the representative motion vectors and the representative reference indices of the IPMVC ("NO" of 278), the video coder may include the $B_1$ spatial merge candidate in the merge candidate list (280).

Responsive to determining that the $B_1$ spatial motion vector is not available ("NO" of 276), responsive to determining that the motion vectors and reference indices of the $B_1$ spatial motion vector match the representative motion vectors and the representative reference indices of the IPMVC ("YES" of 278), or after inserting the $B_1$ spatial merge candidate into the merge candidate list, the video coder may determine whether the spatial merge candidate for location $B_0$ (i.e., the $B_0$ spatial merge candidate) is available (282). Responsive to determining that the $B_0$ spatial merge candidate is available ("YES" of 282), the video coder may insert the $B_0$ spatial merge candidate into the merge candidate list (284).

As indicated above, the video coder may determine the representative motion vectors and representative reference indices of the IPMVC in various ways. In one example, the video coder may determine, from among the sub-PUs of the current PU, a center sub-PU. In this example, the center sub-PU is the closest sub-PU to a center pixel of a luma prediction block of the current PU. Because the height and/or width of a prediction block may be an even number of samples, a "center" pixel of a prediction block may be a pixel adjacent to a true center of the prediction block. Furthermore, in this example, the video coder may then determine an inter-view reference block for the center sub-PU by adding the disparity vector for the current PU to the coordinates of a center of a luma prediction block of the center sub-PU. If the inter-view reference block for the center sub-PU is coded using motion compensated prediction (i.e., the inter-view reference block for the center sub-PU has one or more motion vectors and reference indices), the video coder may set the motion information of the PU-level IPMVC to the motion information of the inter-view reference block for the center sub-PU. Thus, the PU-level IPMVC, as provided by the center sub-PU, can be used for pruning this sub-PU candidate with other candidates, such as the spatial neighboring candidate $A_1$ and $B_1$. For example, if a conventional candidate (e.g., the $A_1$ spatial merge candidate or the $B_1$ spatial merge candidates) is equal to the candidate produced by the center sub-PU, the other conventional candidate is not added into the merge candidate list.

Responsive to determining that the $B_0$ spatial merge candidate is not available ("NO" of 282) or after inserting the $B_0$ spatial merge candidate into the merge candidate list, the video coder may determine whether the IDMVC is available and the motion vector and reference index of the IDMVC are different than the motion vectors and reference indices of the $A_1$ spatial merge candidate and the $B_1$ spatial merge candidate (286). Responsive to determining that the IDMVC is available and the motion vector and reference index of the IDMVC are different than the motion vectors and reference indices of the $A_1$ spatial merge candidate and the $B_1$ spatial merge candidate ("YES" of 286), the video coder may insert the IDMVC into the merge candidate list (288).

Responsive to determining the IDMVC is not available or the motion vector and reference index of the IDMVC are not different than the motion vectors and reference indices of the $A_1$ spatial merge candidate or the $B_1$ spatial merge candidate ("NO" of 286) or after inserting the IDMVC into the merge candidate list, the video coder may perform the portion of the reference picture list construction operation shown in FIG. 18 (denoted in FIG. 20 as "A").

Figure 21:
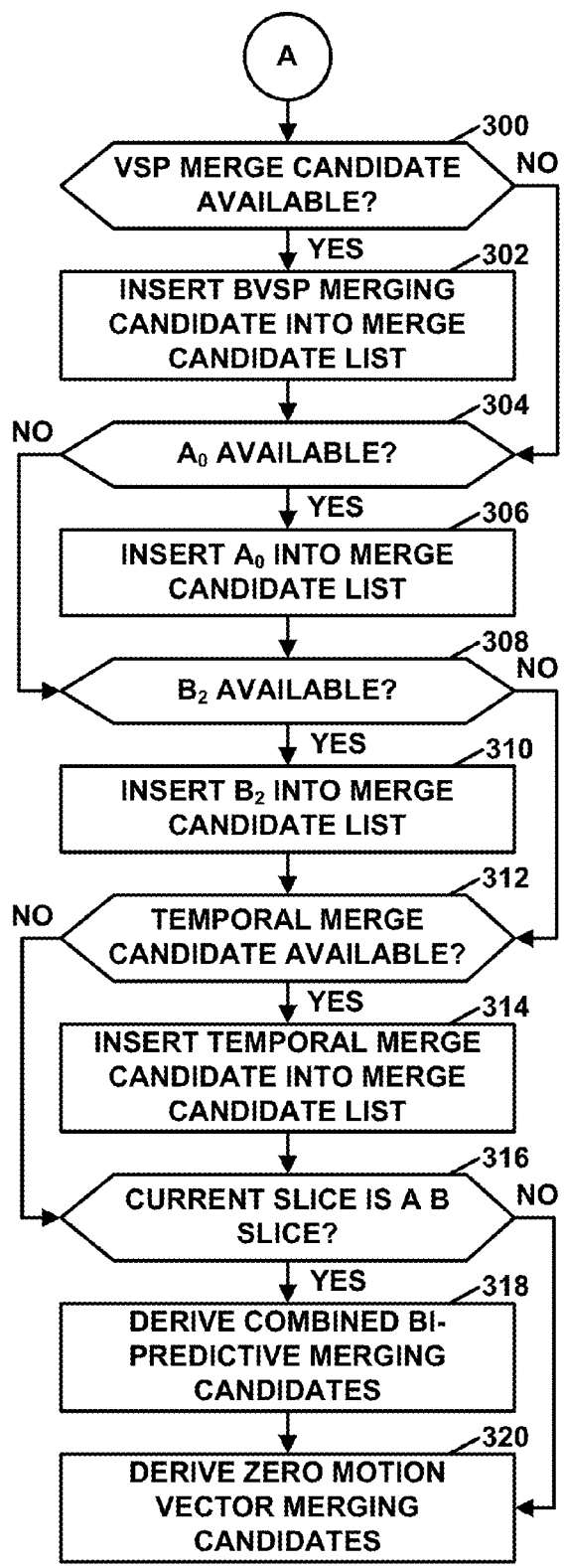
FIG. 21 is a flowchart illustrating a continuation of the reference picture list construction operation of FIG. 20, in accordance with an example of this disclosure.

FIG. 21 is a flowchart illustrating a continuation of the reference picture list construction operation of FIG. 20, in accordance with an example of this disclosure. In the example of FIG. 21, the video coder may determine whether the VSP merge candidate is available (300). Responsive to determining that the VSP merge candidate is available ("YES" of 300), the video coder may insert the VSP merge candidate into the merge candidate list (302).

Responsive to determining that the VSP merge candidate is not available ("NO" of 300) or after inserting the VSP merge candidate into the merge candidate list, the video coder may determine whether the spatial merge candidate for location $A_0$ (i.e., the $A_0$ spatial merge candidate) is available (304). Responsive to determining that the $A_0$ spatial merge candidate is available ("YES" of 304), the video coder may insert the $A_0$ spatial merge candidate into the merge candidate list (306).

Furthermore, responsive to determining that the $A_0$ spatial merge candidate is not available ("NO" of 306), or after inserting the $A_0$ spatial merge candidate into the merge candidate list, the video coder may determine whether the spatial merge candidate for location $B_2$ (i.e., the $B_2$ spatial merge candidate) is available (308). Responsive to determining that the $B_2$ spatial merge candidate is available ("YES" of 308), the video coder may insert the $B_2$ spatial merge candidate into the merge candidate list (310).

Responsive to determining that the $B_2$ spatial merge candidate is not available ("NO" of 308) or after inserting the $B_2$ spatial merge candidate into the merge candidate list, the video coder may determine whether the temporal merge candidate is available (312). Responsive to determining that the temporal merge candidate is available ("YES" of 312), the video coder may insert the temporal merge candidate into the merge candidate list (314).

Furthermore, responsive to determining that the temporal merge candidate is not available ("NO" of 312) or after inserting the temporal merge candidate into the merge candidate list, the video coder may determine whether the current slice is a B slice (316). Responsive to determining that the current slice is a B slice ("YES" of 316), the video coder may derive combined bi-predictive merge candidates (318). In some examples, the video coder may derive the combined bi-predictive merge candidates by performing the operation described in subclause H.8.5.2.1.3 of 3D-HEVC Test Model 4.

Responsive to determining that the current slice is not a B slice ("NO" of 316) or after deriving the combined bi-predictive merging candidates, the video coder may derive zero motion vector merge candidates (320). The zero motion vector merge candidates may specify motion vectors having horizontal and vertical components equal to 0. In some examples, the video coder may derive the zero motion vector candidates by performing the operation described in subclause 8.5.2.1.4 of 3D-HEVC Test Model 4.

Figure 22:
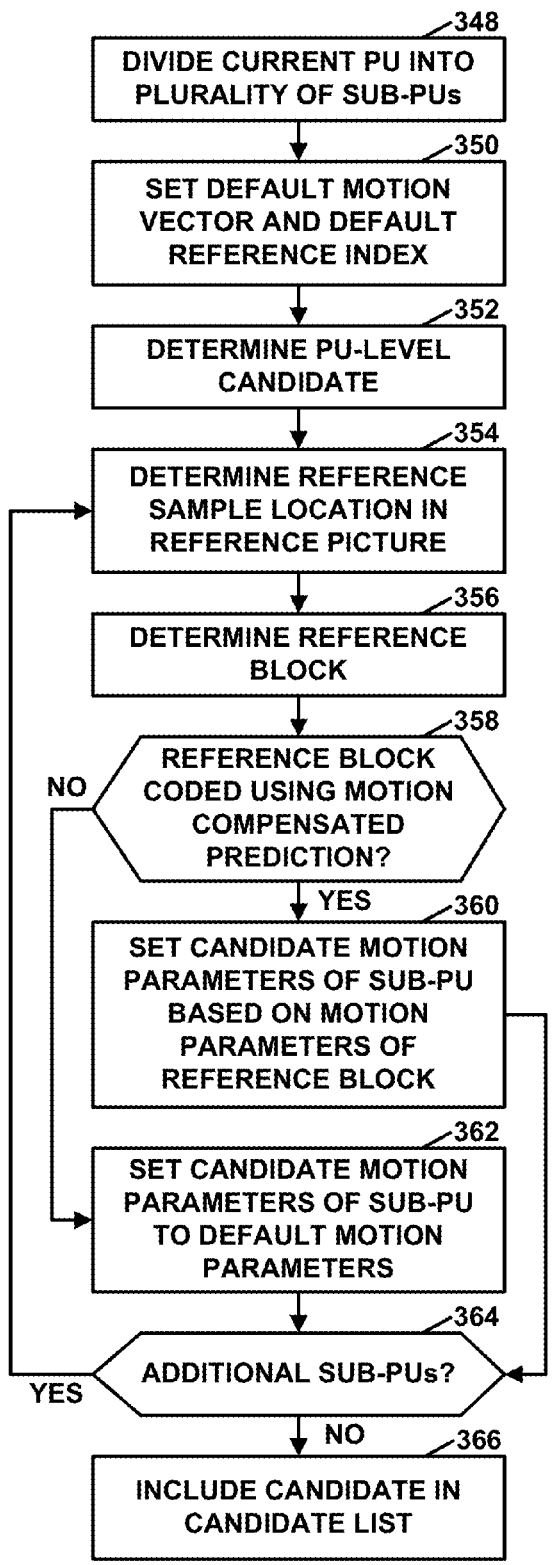
FIG. 22 is a flowchart illustrating an operation of a video coder to determine an inter-view prediction motion vector candidate or a texture merge candidate, in accordance with an example of this disclosure.

FIG. 22 is a flowchart illustrating an operation of a video coder to determine an IPMVC or a texture merge candidate, in accordance with an example of this disclosure. In the example of FIG. 22, the video coder (e.g., video encoder 20 or video decoder 30) may divide a current PU into a plurality of sub-PUs (348). In different examples, the block size of each of the sub-PUs may be 4×4, 8×8, 16×16, or another size.

Furthermore, in the example of FIG. 22, the video coder may set a default motion vector and a default reference index (350). In different examples, the video coder may set the default motion vector and the default reference index in various ways. In some examples, the default motion parameters (i.e., the default motion vectors and the default reference indices) are equal to the PU-level motion vector candidate. Furthermore, in some examples, the video coder may determine the default motion information differently depending on whether the video coder is determining an IPMVC or a texture merge candidate.

In some examples where the video coder is determining an IPMVC, the video coder may derive a PU-level IPMVC from a center position of the corresponding region of the current PU, as defined in 3D-HEVC Test Model 4. Furthermore, in this example, the video coder may set the default motion vectors and reference indices equal to the PU-level IPMVC. For instance, the video coder may set the default motion vectors and the default reference indices to a PU-level IPMVC. In this instance, the video coder may derive the PU-level IPMVC from a center position of a corresponding region for the current PU.

In another example where the video coder is determining an IPMVC, the video coder may set the default motion parameters to the motion parameters contained by an inter-view reference block covering a pixel at coordinates (xRef, yRef) of a reference picture in a reference view. The video coder may determine the coordinates (xRef, yRef) as follows:

$$xRef=Clip3(0, PicWidthInSamplesL-1, xP+((nPSW)>>1)+((mvDisp[0]+2)>>2))$$

$$yRef=Clip3(0, PicHeightInSamplesL-1, yP+((nPSH)>>1)+((mvDisp[1]+2)>>2))$$

In the equations above, (xP, yP) indicates the coordinates of the top-left sample of the current PU, mvDisp is the disparity vector and nPSW×nPSH is the size of the current PU and PicWidthInSamplesL and PicHeightInSamplesL define the resolution of the picture in the reference view (same as the current view). In the equations above, the italicized text in double square brackets indicates text deleted from equations H-124 and H-125 in section H.8.5.2.1.10 of 3D-HEVC Test Model 4.

As discussed above, section H.8.5.2.1.10 of 3D-HEVC Test Model 4 describes a derivation process for a temporal inter-view motion vector candidate. Furthermore, as discussed above, equations H-124 and H-125 are used in section H.8.5.2.1.10 of 3D-HEVC Test Model 4 to determine a luma location of a reference block in a reference picture. In contrast to equations H-124 and H-125 in 3D-HEVC Test Model 4, the equations of this example do not subtract 1 from nPSW and nPSH. As a result, xRef and yRef indicate the coordinates of a pixel immediately below and right of the true center of the prediction block of the current PU. Because the width and height of the prediction block of the current PU in sample values may be even numbers, there may not be a sample value at the true center of the prediction block of the current PU. A coding gain may result when xRef and yRef indicate the coordinates of a pixel immediately below and right of the true center of the prediction block of the current PU relative to when xRef and yRef indicate the coordinates of a pixel immediately above and left of the true center of the prediction block of the current PU. In other examples, the video coder may use other blocks covering different pixels (xRef, yRef) to derive the default motion vectors and reference indices.

In another example of how the video coder may set the default motion parameters when the video coder is determining an IPMVC, prior to setting the motion parameters of the sub-PUs of the current PU, the video coder may choose from among all the sub-PUs of the current PU, a sub-PU that is closest to a center pixel of a luma prediction block of the current PU. The video coder may then determine, for the chosen sub-PU, a reference block in a reference view component. In other words, the video coder may determine an inter-view reference block for the chosen sub-PU. When the inter-view reference block for the chosen sub-PU is coded using motion compensated prediction, the video coder may use the inter-view reference block for the chosen sub-PU to derive the default motion vectors and reference indices. In other words, the video coder may set the default motion parameters to the motion parameters of the sub-PU of the reference block that is closest to a center pixel of a luma prediction block of the current PU.

In this way, the video coder may determine a reference block in the reference picture, the reference block having a same size as a prediction block of the current PU. In addition, the video coder may determine, from among sub-PUs of the reference block, a sub-PU that is closest to a center pixel of the reference block. The video coder may derive the default motion parameters from motion parameters of the determined sub-PU of the reference block.

The video coder may determine the sub-PU that is closest to the center pixel of the reference block in various ways. For instance, assuming that the sub-PU size is $2^U \times 2^U$, the video coder may choose the sub-PU with the following coordinates relative to the top-left sample of the luma prediction block of the current PU: $(((nPSW>>(u+1))-1)<<u, (((nPSH>>(u+1))-1)<<u)$. Otherwise stated, the sub-PU that is closest to the center pixel of the reference block includes a pixel having the following coordinates relative to a top-left sample of the reference block: (((nPSW>>(u+1))−1)<<u, (((nPSH>>(u+1))−1)<<u). Alternatively, the video coder may choose the sub-PU with the following coordinates relative coordinates relative to the top-left sample of the luma prediction block of the current PU ((nPSW>>(u+1))<<u, (nPSH>>(u+1))<<u). Otherwise stated, the sub-PU that is closest to the center pixel of the reference block includes a pixel having the following coordinates relative to a top-left sample of the reference block: ((nPSW>>(u+1))<<u, (nPSH>>(u+1))<<u). In these equations, nPSW and nPSH are the width and height of the luma prediction block of the current PU, respectively. Thus, in one example, a video coder may determine, from among the plurality of sub-PUs of the current PU, a sub-PU that is closest to a center pixel of the luma prediction block of the current PU. In this example, the video coder may derive the default motion parameters from an inter-view reference block for the determined sub-PU.

In other examples where the video coder is determining an IPMVC, the default motion vector is a zero motion vector. Furthermore, in some examples, the default reference index is equal to the first available temporal reference picture (i.e., a reference picture in a different time instance than the current picture) in a current reference picture list or the default reference index may be equal to 0. In other words, the default motion parameters may include a default motion vector and a default reference index. The video coder may set a default motion vector to a zero motion vector and may set the default reference index to 0 or a first available temporal reference picture in a current reference picture list.

For example, if the current slice is a P slice, the default reference index may indicate a first available temporal reference picture in the current picture's RefPicList0 (i.e., a temporal reference picture in the current picture's RefPicList0 having a lowest reference index). Furthermore, if the current slice is a B slice and inter prediction from RefPicList0 is enabled, but inter prediction from the current picture's RefPicList1 is not enabled, the default reference index may indicate a first available temporal reference picture in the current picture's RefPicList0. If the current slice is a B slice and inter prediction from the current picture's RefPicList1 is enabled, but inter prediction from the current picture's RefPicList0 is not enabled, the default reference index may indicate a first available temporal reference picture in the current picture's RefPicList1 (i.e., a temporal reference picture in the current picture's RefPicList1 having a lowest reference index). If the current slice is a B slice and inter prediction from the current picture's RefPicList0 and the current picture's RefPicList1 is enabled, a default RefPicList0 reference index may indicate a first available temporal reference picture in the current picture's RefPicList0 and a default RefPicList1 reference index may indicate a first available temporal reference picture in the current picture's RefPicList1.

Furthermore, in some examples provided above for determining the default motion parameters when the video coder is determining an IPMVC, the video coder may set the default motion parameters to the motion parameters of a sub-PU closest to a center pixel of the luma prediction block of the current PU. However, in these and other examples, the default motion parameters may remain unavailable. For instance, if the inter-view reference block corresponding to the sub-PU closest to a center pixel of the luma prediction block of the current PU is intra predicted, the default motion parameters may remain unavailable. Hence, in some examples, when the default motion parameters are unavailable and an inter-view reference block for a first sub-PU is coded using motion compensated prediction (i.e., the inter-view reference block for the first sub-PU has available motion information), the video coder may set the default motion parameters to the motion parameters of the first sub-PU. In this example, the first sub-PU may be the first sub-PU of the current PU in a raster scan order of the sub-PUs of the current PU. Thus, when determining the default motion parameters, the video coder may, in response to determining that the first sub-PU in a raster scan order of the plurality of sub-PUs has available motion parameters, set the default motion parameters to the available motion parameters of the first sub-PU in the raster scan order of the plurality of sub-PUs.

Otherwise, when the default motion information is unavailable (e.g., when the motion parameters of the inter-view reference block for the first sub-PU are unavailable), the video coder may set the default motion information to the motion parameters of the first sub-PU of a current sub-PU row if the first sub-PU of the current sub-PU row has available motion parameters. When the default motion parameters are still unavailable (e.g., when the inter-view reference block for the first sub-PU of the current sub-PU row are unavailable), the video coder may set the default motion vector to a zero motion vector and may set the default reference index equal to the first available temporal reference picture in the current reference picture list. In this way, when the video coder is determining the default motion parameters, the video coder may, in response to determining that the first sub-PU of a row of sub-PUs that includes the respective sub-PU has available motion parameters, set the default motion parameters to the available motion parameters of the first sub-PU of the row of sub-PUs that includes the respective sub-PU.

Furthermore, as described above with regard to the example of FIG. 20, the video coder may determine a texture merge candidate using a sub-PU level motion prediction technique. In such examples, the current PU may be referred to herein as the "current depth PU." The video coder may perform the operation of FIG. 22 to determine the texture merge candidate. Hence, when the video coder is determining the texture merge candidate, the video coder may divide the current depth PU into several sub-PUs and each sub-PU uses the motion information of a co-located texture block for motion compensation. Furthermore, when the video coder is determining the texture merge candidate, the video coder may assign the default motion vectors and reference indices to a sub-PU if the corresponding texture block of the sub-PU is intra coded or a picture in the same access unit as a reference picture of corresponding texture block is not included in a reference picture list of the current depth PU. Thus, in general, the video coder may determine that a co-located texture block has available motion information when the co-located texture block is not intra coded and a reference picture used by the co-located texture block is in a reference picture list of the current depth picture. Conversely, the motion parameters of a co-located texture block may be unavailable when the co-located texture block is intra coded or the co-located texture block uses a reference picture that is not in a reference picture list of the current depth picture.

As indicated above, the video coder may determine the default motion information differently depending on whether the video coder is determining an IPMVC or a texture merge candidate. For instance, when the video coder is determining a texture merge candidate, the video coder may determine the default motion vectors and default reference indices according to one of the following examples or other examples. In one example, a co-located texture block may be co-located with the current depth PU and may have the same size as the current depth PU. In this example, the video coder sets the default motion vectors and default reference indices to the motion information of a block covering a center pixel of the co-located texture block.

Thus, in some examples were the current picture is a depth view component and the reference picture is a texture view component that is in the same view and access unit as the current picture, the video coder may set the default motion parameters to motion parameters associated with a block covering a pixel of a reference block that is in the reference picture, that is co-located with the current PU, and that has the same size as the current PU. In such examples, the pixel may be a center pixel of the reference block or another pixel of the reference block.

In another example where the video coder is determining a texture merge candidate, a co-located texture block may have the same size as the current depth PU. In this example, the video coder may set the default motion vectors and default reference indices to the motion information of a block (e.g., a PU) covering any given pixel within the co-located texture block.

In another example where the video coder is determining a texture merge candidate, the video coder may firstly choose a center sub-PU of the current depth PU. Among all the sub-PUs of the current depth PU, the center sub-PU may be located closest to (or may include) a center pixel of the prediction block of the current depth PU. The video coder may then use a texture block co-located with the center sub-PU to derive the default motion vectors and reference indices. Assuming the sub-PU size is $2^U \times 2^U$, the video coder may determine that the center sub-PU is the sub-PU with the following coordinates relative to a top-left sample of the prediction block of the current depth PU (and hence, the top-left sample of a co-located texture block): $(((nPSW>>(u+1))-1)<<u, (((nPSH>>(u+1))-1)<<u)$. Alternatively, the video coder may determine that the relative coordinates of the center sub-PU are: $((nPSW>>(u+1))<<u, (nPSH>>(u+1))<<u)$. In these equations, nPSW and nPSH are the width and height of the prediction block of the current depth PU, respectively.

Thus, in one example, a video coder may determine, from among the plurality of sub-PUs of the current PU, a sub-PU that is closest to a center of a prediction block of the current PU. In this example, the video coder may derive the default motion parameters from a co-located texture block for the determined sub-PU.

In some examples where the video coder is determining a texture merge candidate and the default motion information is unavailable (e.g., when the motion parameters of the co-located texture block for the center sub-PU are unavailable), the video coder may determine whether a co-located texture block for a first sub-PU of the current depth PU has available motion information. The first sub-PU of the current depth PU may be the first sub-PU of the current depth PU in a raster scan order of the sub-PUs of the current depth PU. If the motion parameters of the co-located texture block for the first sub-PU of the current depth PU are available, the video coder may set the default motion parameters to the motion parameters of the first sub-PU of the current depth PU.

Furthermore, in some examples where the video coder is determining a texture merge candidate, when the default motion information is unavailable (e.g., when the motion parameters of the co-located texture block for the first sub-PU are unavailable), the video coder sets the default motion information to the motion information of a first sub-PU of a current sub-PU row if the first sub-PU of the current sub-PU row has available motion information. Furthermore, when the default motion information is unavailable (e.g., when the motion information of the first sub-PU of the current sub-PU row is unavailable), the default motion vector is a zero motion vector, and the default reference index is equal to the first available temporal reference picture in a current reference picture list or 0.

In some examples where the video coder is determining a texture merge candidate, the default motion vector is a zero motion vector, and the default reference index is equal to the first available temporal reference picture in a current reference picture list or 0.

Regardless of whether the video coder is determining an IPMVC or a texture merge candidate, the video coder may set the default motion information for the whole current PU. Therefore, the video coder does not need to store more motion vectors in the current PU either for predicting spatial neighboring blocks, temporal neighboring blocks (when the picture containing this PU is used as a co-located picture during TMVP), or de-blocking.

Furthermore, the video coder may determine a PU-level motion vector candidate (352). For instance, the video coder may determine a PU-level IPMVC or a PU-level motion parameter inheritance (MPI) candidate (i.e., a PU-level texture merge candidate), depending on whether the video coder is determining an IPMVC or a texture merge candidate. The video coder may determine, based on the PU-level motion vector candidate, whether to include one or more spatial merge candidates in the candidate list. In some examples the PU-level motion vector candidate specifies the same motion parameters as the default motion parameters.

In some examples where the video coder is determining an IPMVC, the video coder may derive a PU-level IPMVC from a center position of the corresponding region of the current PU, as defined in 3D-HEVC Test Model 4. As described in the example of FIG. 20, the video coder may use representative motion vectors and representative reference indices of the IPMVC (i.e., the PU-level IPMVC) to determine whether to include the $A_1$ spatial merge candidate and the $B_1$ spatial merge candidate in the merge candidate list.

In another example where the video coder is determining an IPMVC, the video coder may determine, based on a disparity vector of the current PU, a reference block in an inter-view reference picture. The video coder may then determine a sub-PU that covers a center pixel of the reference block (i.e., a sub-PU that is closest to the center pixel of the reference block). In this example, the video coder may determine that the PU-level IPMVC specifies the motion parameters of the determined sub-PU of the reference block. As indicated elsewhere in this disclosure, the video coder may determine the sub-PU that is closest to the center pixel of the reference block in various ways. For instance, assuming that the sub-PU size is $2^U \times 2^U$, the sub-PU that is closest to the center pixel of the reference block includes a pixel having the following coordinates relative to a top-left sample of the reference block: $(((nPSW>>(u+1))-1)<<u, (((nPSH>>(u+1))-1)<<u)$. Alternatively, the sub-PU that is closest to the center pixel of the reference block includes a pixel having the following coordinates relative to a top-left sample of the reference block: $((nPSW>>(u+1))<<u, (nPSH>>(u+1))<<u)$. In these equations, nPSW and nPSH are the width and height of the luma prediction block of the current PU, respectively. In this example, the video coder may use the motion parameters of the determined sub-PU as a PU-level IPMVC. The PU-level IPMVC may specify the representative motion vectors and representative reference indices of the IPMVC. In this way, the video coder may use the motion parameters of the sub-PU that is closest to the center pixel of the reference block to determine the PU-level IPMVC. In other words, the video coder may derive a PU-level IPMVC from a center position of a corresponding region of the current PU and determine, based on the PU-level IPMVC, whether to include a spatial merge candidate in the candidate list. The motion parameters used from the sub-PU may be the same as the motion parameters that the video coder used to create the IPMVC.

In some examples where the video coder is determining a texture merge candidate, the motion information used from the center sub-PU for the default motion parameters may be the same as the motion information used to create the PU-level motion parameter inheritance (MPI) candidate. The video coder may determine, based on the PU-level MPI candidate, whether to include particular spatial merging candidates in the merge candidate list. For instance, if the $A_1$ spatial merging candidate and the PU-level MPI candidate have the same motion vectors and the same reference indices, the video coder does not insert the $A_1$ spatial merging candidate into the merge candidate list. Similarly, if the $B_1$ spatial merging candidate and the $A_1$ spatial merging candidate or the PU-level MPI candidate have the same motion vectors and the same reference indices, the video coder does not insert $B_1$ into the merge candidate list.

In the example of FIG. 22, the video coder may determine, for a current sub-PU of the current PU, a reference sample location in a reference picture (354). The reference picture may be in a different view than the picture that contains the current PU (i.e., the current picture). In some examples, the video coder may determine the reference location by adding a disparity vector for the current PU to the coordinates of a center pixel of the current sub-PU. In other examples, such as when the current PU is a depth PU, the reference sample location may be co-located with a sample of a prediction block of the current depth PU.

In addition, the video coder may determine a reference block for the current sub-PU (356). The reference block may be a PU of the reference picture and may cover the determined reference sample location. Next, the video coder may determine whether the reference block is coded using motion compensated prediction (358). For instance, if the reference block is coded using intra prediction, the video coder may determine that the reference block is not coded using motion compensated prediction. If the reference block is coded using motion compensated prediction, the reference block has one or more motion vectors.

Responsive to determining that the reference block is coded using motion compensated prediction ("YES" of 358), the video coder may set motion parameters of the current sub-PU based on the motion parameters of the reference block (360). For instance, the video coder may set a RefPicList0 motion vector of the current sub-PU to a RefPicList0 motion vector of the reference block, may set a RefPicList0 reference index of the current sub-PU to a RefPicList0 reference index of the reference block, may set a RefPicList1 motion vector of the current sub-PU to a RefPicList1 motion vector of the reference block, and may set a RefPicList1 reference index of the current sub-PU to a RefPicList1 reference index of the reference block.

On the other hand, responsive to determining that the reference block is not coded using motion compensated prediction ("NO" of 358), the video coder may set the motion parameters of the current sub-PU to the default motion parameters (362). Thus, in the example of FIG. 22, when the reference block for the current sub-PU is not coded using motion compensated prediction, the video coder does not set the motion parameters of the current sub-PU to the motion parameters of a closest sub-PU that has a reference block that is coded using motion compensated prediction. Rather, the video coder may set the motion parameters of the current sub-PU directly to the default motion parameters. This may simplify and accelerate the process of coding.

After setting the motion parameters of the current sub-PU, the video coder may determine whether the current PU has any additional sub-PUs (364). In response to determining that the current PU has one or more additional sub-PUs ("YES" of 364), the video coder may perform actions 354-364 with another one of the sub-PUs of the current PU as the current sub-PU. In this way, the video coder may set the motion parameters of each of the sub-PUs of the current PU. On the other hand, responsive to determining that there are no additional sub-PUs of the current PU ("NO" of 366), the video coder may include a candidate (e.g., an IPMVC) in the merge candidate list for the current PU (366). The candidate may specify the motion parameters of each of the sub-PUs of the current PU.

Figure 23:
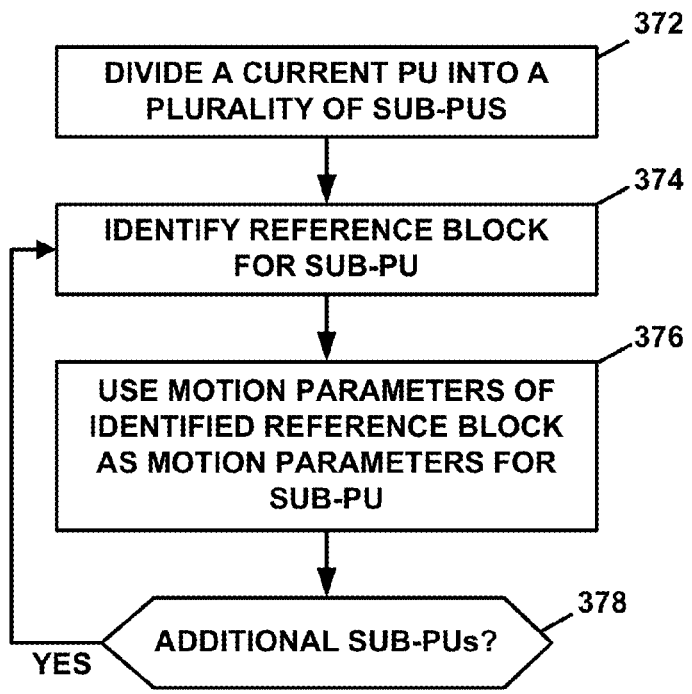
FIG. 23 is a flowchart illustrating an operation of a video coder to encode a depth block, in accordance with an example of this disclosure.

FIG. 23 is a flowchart illustrating an operation of a video coder to encode a depth block, in accordance with an example of this disclosure. A video coder, such as video encoder 20, may divide a current PU into a plurality of sub-PUs. Each of the sub-PUs may have a size smaller than a size of the PU. Furthermore, the current PU may be in a depth view of the multi-view video data (372). Video encoder 20 may identify a reference block for the respective sub-PU (374). The reference block may be co-located with the respective sub-PU in a texture view corresponding to the depth view. Video encoder 20 may use motion parameters of the identified reference block for the respective sub-PU to determine motion parameters for the respective sub-PU (376). In some examples, action (376) comprises using the motion parameters of the identified reference block for the respective sub-PU as the motion parameters for the respective sub-PU.

If there are additional sub-PUs ("YES" of 378), video encoder 20 may perform actions (372) and (374) for a next sub-PU of the plurality of sub-PUs of the current PU. In this way, video encoder 20 may, for each respective sub-PU of a plurality of sub-PUs of a current PU in a depth view of the multi-view video data, identify a reference block for the respective sub-PU. The identified reference block for the respective sub-PU is co-located with the respective sub-PU in a texture view corresponding to the depth view. When the identified reference block for the respective sub-PU is coded using temporal motion vectors, video encoder 20 may use motion parameters of the identified reference block to determine motion parameters for the respective sub-PU. For instance, video encoder 20 may use the motion parameters of the identified reference block as the motion parameters for the respective sub-PU.

In some examples, the motion parameters of the identified reference block for the respective sub-PU include a first motion vector, a second motion vector, a first reference index, and a second reference index, the first motion vector and the first reference index being for a first reference picture list, the second motion vector and the second reference index being for a second reference picture list. In some examples, video encoder 20 may further, for each respective sub-PU of the plurality of sub-PUs, when the motion parameters of the identified reference block for the respective sub-PU are not available, set the motion parameters of the respective sub-PU to a first default motion vector, a second default motion vector, a first default reference index, and a second default reference index. In this example, the first default motion vector and the first default reference index are for a first reference picture list, and the second default motion vector and the second default reference index are for a second reference picture list.

In some further examples, the motion parameters of the identified reference block for the respective sub-PU are not available when the identified reference block for the respective sub-PU is not coded using temporal motion vectors or the identified reference block for the respective sub-PU is coded using intra prediction. In some examples, video encoder 20 may further, for each respective sub-PU of the plurality of sub-PUs update the first and second default motion vectors and the first and second default reference indices to equal the motion parameters of the respective sub-PU when the identified reference block for the respective sub-PU is coded using the temporal motion vectors.

In some examples, video encoder 20 may further include a particular candidate in a merge candidate list of the current PU. The particular candidate has the motion parameters of each of the sub-PUs of the current PU. Video encoder 20 may then signal, in a bitstream, a syntax element that indicates a selected candidate in the merge candidate list. When the selected candidate is the particular candidate, video encoder 20 may invoke motion compensation for each of the sub-PUs of the current PU.

Figure 24:
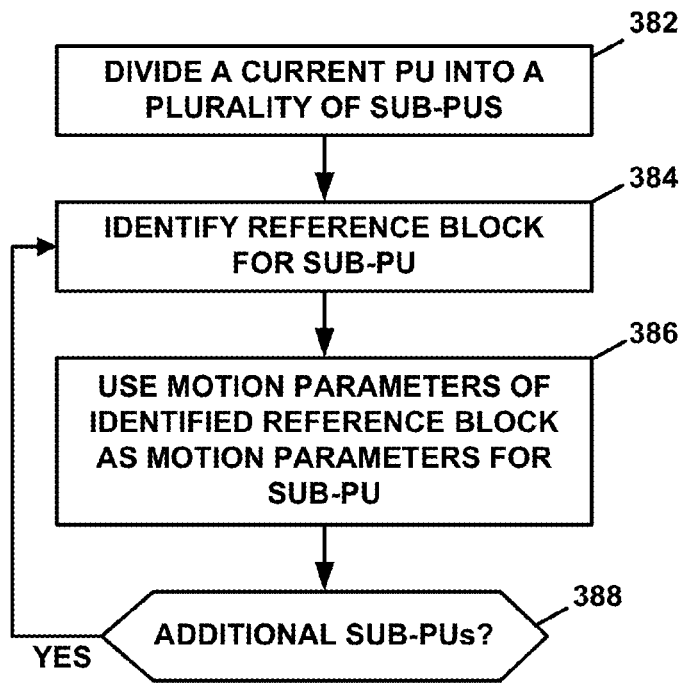
FIG. 24 is a flowchart illustrating an operation of a video coder to decode a depth block, in accordance with an example of this disclosure.

FIG. 24 is a flowchart illustrating an operation of a video coder to decode a depth block, in accordance with an example of this disclosure. A video coder, such as video decoder 30, may divide a current PU into a plurality of sub-PUs. Each of the sub-PUs may have a size smaller than a size of the PU. Furthermore, the current PU may be in a depth view of the multi-view video data (382). Video decoder 30 may identify a reference block for the respective sub-PU (384). The reference block may be co-located with the respective sub-PU in a texture view corresponding to the depth view. Video decoder 30 may use motion parameters of the identified reference block for the respective sub-PU to determine motion parameters for the respective sub-PU (386). In some examples, action (386) comprises using the motion parameters of the identified reference block for the respective sub-PU as the motion parameters for the respective sub-PU.

If there are additional sub-PUs ("YES" of 388), video decoder 30 may perform actions (382) and (384) for a next sub-PU of the plurality of sub-PUs of the current PU. In this way, video decoder 30 may, for each respective sub-PU of a plurality of sub-PUs of a current PU in a depth view of the multi-view video data, identify a reference block for the respective sub-PU. The identified reference block for the respective sub-PU is co-located with the respective sub-PU in a texture view corresponding to the depth view. When the identified reference block for the respective sub-PU is coded using temporal motion vectors, video decoder 30 may use motion parameters of the identified reference block as motion parameters for the respective sub-PU. For instance, video decoder 30 may use the motion parameters of the identified reference block as the motion parameters for the respective sub-PU.

In some examples, the motion parameters of the identified reference block for the respective sub-PU include a first motion vector, a second motion vector, a first reference index, and a second reference index, the first motion vector and the first reference index being for a first reference picture list, the second motion vector and the second reference index being for a second reference picture list. In some examples, video decoder 30 may further, for each respective sub-PU of the plurality of sub-PUs, when the motion parameters of the identified reference block for the respective sub-PU are not available, set the motion parameters of the respective sub-PU to a first default motion vector, a second default motion vector, a first default reference index, and a second default reference index. In this example, the first default motion vector and the first default reference index are for a first reference picture list, and the second default motion vector and the second default reference index are for a second reference picture list.

In some further examples, the motion parameters of the identified reference block for the respective sub-PU are not available when the identified reference block for the respective sub-PU is not coded using temporal motion vectors or the identified reference block for the respective sub-PU is coded using intra prediction. In some examples, video decoder 30 may further, for each respective sub-PU of the plurality of sub-PUs update the first and second default motion vectors and the first and second default reference indices to equal the motion parameters of the respective sub-PU when the identified reference block for the respective sub-PU is coded using the temporal motion vectors.

In some examples, video decoder 30 may further including a particular candidate in a merge candidate list of the current PU, wherein the particular candidate has the motion parameters of each of the sub-PUs of the current PU. Video decoder 30 may then obtain, from a bitstream, a syntax element that indicates a selected candidate in the merge candidate list. When the selected candidate is the particular candidate, video decoder 30 may invoke motion compensation for each of the sub-PUs of the current PU.

Figure 25:
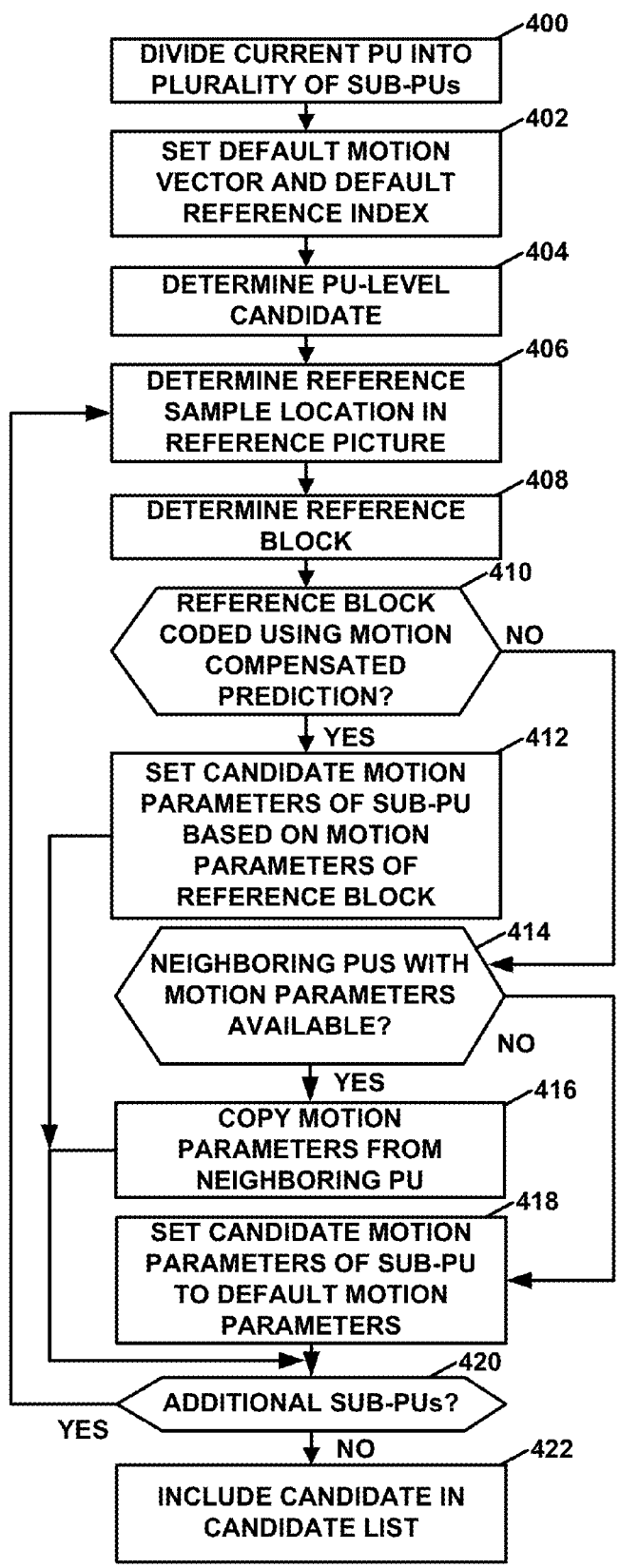
FIG. 25 is a flowchart illustrating an operation of a video coder to determine an inter-view prediction motion vector candidate, in accordance with an example of this disclosure.

FIG. 25 is a flowchart illustrating an operation of a video coder to determine an IPMVC or a texture merge candidate, in accordance with an example of this disclosure. In the example of FIG. 25, the video coder (e.g., video encoder 20 or video decoder 30) may divide a current PU into a plurality of sub-PUs (400). In different examples, the block size of each of the sub-PUs may be 4×4, 8×8, 16×16, or another size.

Furthermore, in the example of FIG. 25, the video coder may set a default motion vector and a default reference index (402). In different examples, the video coder may set the default motion vector and the default reference index in different ways. In some examples, the default motion parameters (i.e., the default motion vectors and the default reference indices) are equal to the PU-level motion vector candidate. Furthermore, in some examples, the video coder may determine the default motion information differently depending on whether the video coder is determining an IPMVC or a texture merge candidate.

In some examples where the video coder is determining an IPMVC, the video coder may derive a PU-level IPMVC from a center position of the corresponding region of the current PU, as defined in 3D-HEVC Test Model 4. Furthermore, in some such examples, the video coder may set the default motion vectors and reference indices equal to the PU-level IPMVC. For instance, the video coder may set the default motion vectors and the default reference indices to a PU-level IPMVC. In this instance, the video coder may derive the PU-level IPMVC from a center position of a corresponding region for the current PU.

In another example where the video coder is determining an IPMVC, the video coder may set the default motion parameters to the motion parameters contained by an inter-view reference block covering a pixel at coordinates (xRef, yRef) of a reference picture in a reference view. The video coder may determine the coordinates (xRef, yRef) as follows:

xRef=Clip3(0,PicWidthInSamples$_L$−1,xP+((nPSW)
  >>1)+((mvDisp[0]+2)>>2))

yRef=Clip3(0,PicHeightInSamples$_L$−1,yP+((nPSH)
  >>1)+((mvDisp[1]+2)>>2))

In the equations above, (xP, yP) indicates the coordinates of the top-left sample of the current PU, mvDisp is the disparity vector and nPSWxnPSH is the size of the current PU and PicWidthInSamplesL and PicHeightInSamplesL define the resolution of the picture in the reference view (same as the current view). In the equations above, the italicized text in double square brackets indicates text deleted from equations H-124 and H-125 in section H.8.5.2.1.10 of 3D-HEVC Test Model 4.

As discussed above, section H.8.5.2.1.10 of 3D-HEVC Test Model 4 describes a derivation process for a temporal inter-view motion vector candidate. Furthermore, as discussed above, equations H-124 and H-125 are used in section H.8.5.2.1.10 of 3D-HEVC Test Model 4 to determine a luma location of a reference block in a reference picture. In contrast to equations H-124 and H-125 in 3D-HEVC Test Model 4, the equations of this example do not subtract 1 from nPSW and nPSH. As a result, xRef and yRef indicate the coordinates of a pixel immediately below and right of the true center of the prediction block of the current PU. Because the width and height of the prediction block of the current PU in sample values may be even numbers, there may not be a sample value at the true center of the prediction block of the current PU. A coding gain may result when xRef and yRef indicate the coordinates of a pixel immediately below and right of the true center of the prediction block of the current PU relative to when xRef and yRef indicate the coordinates of a pixel immediately above and left of the true center of the prediction block of the current PU. In other examples, the video coder may use other blocks covering different pixels (xRef, yRef) to derive the default motion vectors and reference indices.

In another example of how the video coder may set the default motion parameters when the video coder is determining an IPMVC, prior to setting the motion parameters of the sub-PUs of the current PU, the video coder may choose from among all the sub-PUs of the current PU, a sub-PU that is closest to a center pixel of a luma prediction block of the current PU. The video coder may then determine, for the chosen sub-PU, a reference block in a reference view component. In other words, the video coder may determine an inter-view reference block for the chosen sub-PU. When the inter-view reference block for the chosen sub-PU is coded using motion compensated prediction, the video coder may use the inter-view reference block for the chosen sub-PU to derive the default motion vectors and reference indices. In other words, the video coder may set the default motion parameters to the motion parameters of the sub-PU of the reference block that is closest to a center pixel of a luma prediction block of the current PU.

In this way, the video coder may determine a reference block in the reference picture, the reference block having a same size as a prediction block of the current PU. In addition, the video coder may determine, from among sub-PUs of the reference block, a sub-PU that is closest to a center pixel of the reference block. The video coder may derive the default motion parameters from motion parameters of the determined sub-PU of the reference block.

The video coder may determine the sub-PU that is closest to the center pixel of the reference block in various ways. For instance, assuming that the sub-PU size is $2^U \times 2^U$, the video coder may choose the sub-PU with the following coordinates relative to the top-left sample of the luma prediction block of the current PU: (((nPSW>>(u+1))−1)<<u, (((nPSH>>(u+1))−1)<<u). Otherwise stated, the sub-PU that is closest to the center pixel of the reference block includes a pixel having the following coordinates relative to a top-left sample of the reference block: (((nPSW>>(u+1))−1)<<u, (((nPSH>>(u+1))−1)<<u). Alternatively, the video coder may choose the sub-PU with the following coordinates relative coordinates relative to the top-left sample of the luma prediction block of the current PU ((nPSW>>(u+1))<<u, (nPSH>>(u+1))<<u). Otherwise stated, the sub-PU that is closest to the center pixel of the reference block includes a pixel having the following coordinates relative to a top-left sample of the reference block: ((nPSW>>(u+1))<<u, (nPSH>>(u+1))<<u). In these equations, nPSW and nPSH are the width and height of the luma prediction block of the current PU, respectively. Thus, in one example, a video coder may determine, from among the plurality of sub-PUs of the current PU, a sub-PU that is closest to a center pixel of the luma prediction block of the current PU. In this example, the video coder may derivethe default motion parameters from an inter-view reference block for the determined sub-PU.

In other examples where the video coder is determining an IPMVC, the default motion vector is a zero motion vector. Furthermore, in some examples, the default reference index is equal to the first available temporal reference picture (i.e., a reference picture in a different time instance than the current picture) in a current reference picture list or the default reference index may be equal to 0. In other words, the default motion parameters may include a default motion vector and a default reference index. The video coder may set a default motion vector to a zero motion vector and may set the default reference index to 0 or a first available temporal reference picture in a current reference picture list.

For example, if the current slice is a P slice, the default reference index may indicate a first available temporal reference picture in the current picture's RefPicList0 (i.e., a temporal reference picture in the current picture's RefPicList0 having a lowest reference index). Furthermore, if the current slice is a B slice and inter prediction from RefPicList0 is enabled, but inter prediction from the current picture's RefPicList1 is not enabled, the default reference index may indicate a first available temporal reference picture in the current picture's RefPicList0. If the current slice is a B slice and inter prediction from the current picture's RefPicList1 is enabled, but inter prediction from the current picture's RefPicList0 is not enabled, the default reference index may indicate a first available temporal reference picture in the current picture's RefPicList1 (i.e., a temporal reference picture in the current picture's RefPicList1 having a lowest reference index). If the current slice is a B slice and inter prediction from the current picture's RefPicList0 and the current picture's RefPicList1 is enabled, a default RefPicList0 reference index may indicate a first available temporal reference picture in the current picture's RefPicList0 and a default RefPicList1 reference index may indicate a first available temporal reference picture in the current picture's RefPicList1.

Furthermore, in some examples provided above for determining the default motion parameters when the video coder is determining an IPMVC, the video coder may set the default motion parameters to the motion parameters of a sub-PU closest to a center pixel of the luma prediction block of the current PU. However, in these and other examples, the default motion parameters may remain unavailable. For instance, if the inter-view reference block corresponding to the sub-PU closest to a center pixel of the luma prediction block of the current PU is intra predicted, the default motion parameters may remain unavailable. Hence, in some examples, when the default motion parameters are unavailable and an inter-view reference block for a first sub-PU is coded using motion compensated prediction (i.e., the inter-view reference block for the first sub-PU has available motion information), the video coder may set the default motion parameters to the motion parameters of the first sub-PU. In this example, the first sub-PU may be the first sub-PU of the current PU in a raster scan order of the sub-PUs of the current PU. Thus, when determining the default motion parameters, the video coder may, in response to determining that the first sub-PU in a raster scan order of the plurality of sub-PUs has available motion parameters, set the default motion parameters to the available motion parameters of the first sub-PU in the raster scan order of the plurality of sub-PUs.

Otherwise, when the default motion information is unavailable (e.g., when the motion parameters of the inter-view reference block for the first sub-PU are unavailable), the video coder may set the default motion information to the motion parameters of the first sub-PU of a current sub-PU row if the first sub-PU of the current sub-PU row has available motion parameters. When the default motion parameters are still unavailable (e.g., when the inter-view reference block for the first sub-PU of the current sub-PU row are unavailable), the video coder may set the default motion vector to a zero motion vector and may set the default reference index equal to the first available temporal reference picture in the current reference picture list. In this way, when the video coder is determining the default motion parameters, the video coder may, in response to determining that the first sub-PU of a row of sub-PUs that includes the respective sub-PU has available motion parameters, set the default motion parameters to the available motion parameters of the first sub-PU of the row of sub-PUs that includes the respective sub-PU.

Furthermore, as described above with regard to the example of FIG. 20, the video coder may determine a texture merge candidate using a sub-PU level motion prediction technique. In such examples, the current PU may be referred to herein as the "current depth PU." The video coder may perform the operation of FIG. 25 to determine the texture merge candidate. Hence, when the video coder is determining the texture merge candidate, the video coder may divide the current depth PU in several sub-PUs and each sub-PU uses the motion information of a co-located texture block for motion compensation. Furthermore, when the video coder is determining the texture merge candidate, the video coder may assign the default motion vectors and reference indices to a sub-PU if the corresponding texture block of the sub-PU is intra coded or a picture in the same access unit as a reference picture of corresponding texture block is not included in a reference picture list of the current depth PU. Thus, in general, the video coder may determine that a co-located texture block has available motion information when the co-located texture block is not intra coded and a reference picture used by the co-located texture block is in a reference picture list of the current depth picture. Conversely, the motion parameters of a co-located texture block may be unavailable when the co-located texture block is intra coded or the co-located texture block uses a reference picture that is not in a reference picture list of the current depth picture.

As indicated above, the video coder may determine the default motion information differently depending on whether the video coder is determining an IPMVC or a texture merge candidate. For instance, when the video coder is determining a texture merge candidate, the video coder may determine the default motion vectors and default reference indices according to one of the following examples or other examples. In one example, a co-located texture block may be co-located with the current depth PU and may have the same size as the current depth PU. In this example, the video coder sets the default motion vectors and default reference indices to the motion information of a block covering a center pixel of the co-located texture block.

Thus, in some examples were the current picture is a depth view component and the reference picture is a texture view component that is in the same view and access unit as the current picture, the video coder may set the default motion parameters to motion parameters associated with a block covering a pixel of a reference block that is in the reference picture, that is co-located with the current PU, and that has the same size as the current PU. In such examples, the pixel may be a center pixel of the reference block or another pixel of the reference block.

In another example where the video coder is determining a texture merge candidate, a co-located texture block may have the same size as the current depth PU. In this example, the video coder may set the default motion vectors and default reference indices to the motion information of a block (e.g., a PU) covering any given pixel within the co-located texture block.

In another example where the video coder is determining a texture merge candidate, the video coder may firstly choose a center sub-PU of the current depth PU. Among all the sub-PUs of the current depth PU, the center sub-PU may be located closest to (or may include) a center pixel of the prediction block of the current depth PU. The video coder may then use a texture block co-located with the center sub-PU to derive the default motion vectors and reference indices. Assuming the sub-PU size is $2^U \times 2^U$, the video coder may determine that the center sub-PU is the sub-PU with the following coordinates relative to a top-left sample of the prediction block of the current depth PU (and hence, the top-left sample of a co-located texture block): $(((nPSW>>(u+1))-1)<<u, ((nPSH>>(u+1))-1)<<u)$. Alternatively, the video coder may determine that the relative coordinates of the center sub-PU are: $((nPSW>>(u+1))<<u, (nPSH>>(u+1))<<u)$. In these equations, nPSW and nPSH are the width and height of the prediction block of the current depth PU, respectively.

Thus, in one example, a video coder may determine, from among the plurality of sub-PUs of the current PU, a sub-PU that is closest to a center of a prediction block of the current PU. In this example, the video coder may derive the default motion parameters from a co-located texture block for the determined sub-PU.

In some examples where the video coder is determining a texture merge candidate and the default motion information is unavailable (e.g., when the motion parameters of the co-located texture block for the center sub-PU are unavailable), the video coder may determine whether a co-located texture block for a first sub-PU of the current depth PU has available motion information. The first sub-PU of the current depth PU may be the first sub-PU of the current depth PU in a raster scan order of the sub-PUs of the current depth PU.

If the motion parameters of the co-located texture block for the first sub-PU of the current depth PU are available, the video coder may set the default motion parameters to the motion parameters of the first sub-PU of the current depth PU.

Furthermore, in some examples where the video coder is determining a texture merge candidate, when the default motion information is unavailable (e.g., when the motion parameters of the co-located texture block for the first sub-PU are unavailable), the video coder sets the default motion information to the motion information of a first sub-PU of a current sub-PU row if the first sub-PU of the current sub-PU row has available motion information. Furthermore, when the default motion information is unavailable (e.g., when the motion information of the first sub-PU of the current sub-PU row is unavailable), the default motion vector is a zero motion vector, and the default reference index is equal to the first available temporal reference picture in a current reference picture list or 0.

In some examples where the video coder is determining a texture merge candidate, the default motion vector is a zero motion vector, and the default reference index is equal to the first available temporal reference picture in a current reference picture list or 0.

Regardless of whether the video coder is determining an IPMVC or a texture merge candidate, the video coder may set the default motion information for the whole current PU (402). Therefore, the video coder does not need to store more motion vectors in the current PU either for predicting spatial neighboring blocks, temporal neighboring blocks (when the picture containing this PU is used as a co-located picture during TMVP), or de-blocking.

Furthermore, the video coder may determine a PU-level motion vector candidate (404). For instance, the video coder may determine a PU-level IPMVC or a PU-level motion parameter inheritance (MPI) candidate (i.e., a PU-level texture merge candidate), depending on whether the video coder is determining an IPMVC or a texture merge candidate. The video coder may determine, based on the PU-level motion vector candidate, whether to include one or more spatial merge candidates in the candidate list. In some examples, the PU-level motion vector candidate specifies the same motion parameters as the default motion parameters.

In some examples where the video coder is determining an IPMVC, the video coder may derive a PU-level IPMVC from a center position of the corresponding region of the current PU, as defined in 3D-HEVC Test Model 4. As described in the example of FIG. 20, the video coder may use representative motion vectors and representative reference indices of the IPMVC (i.e., the PU-level IPMVC) to determine whether to include the $A_1$ spatial merge candidate and the $B_1$ spatial merge candidate in the merge candidate list.

In another example where the video coder is determining an IPMVC, the video coder may determine, based on a disparity vector of the current PU, a reference block in an inter-view reference picture. The video coder may then determine a sub-PU that covers a center pixel of the reference block (i.e., a sub-PU that is closest to the center pixel of the reference block). In this example, the video coder may determine that the PU-level IPMVC specifies the motion parameters of the determined sub-PU of the reference block. As indicated elsewhere in this disclosure, the video coder may determine the sub-PU that is closest to the center pixel of the reference block in various ways. For instance, assuming that the sub-PU size is $2^U \times 2^U$, the sub-PU that is closest to the center pixel of the reference block includes a pixel having the following coordinates relative to a top-left sample of the reference block: $(((nPSW>>(u+1))-1)<<u, (((nPSH>>(u+1))-1)<<u)$. Alternatively, the sub-PU that is closest to the center pixel of the reference block includes a pixel having the following coordinates relative to a top-left sample of the reference block: $((nPSW>>(u+1))<<u, (nPSH>>(u+1))<<u)$. In these equations, nPSW and nPSH are the width and height of the luma prediction block of the current PU, respectively. In this example, the video coder may use the motion parameters of the determined sub-PU as a PU-level IPMVC. The PU-level IPMVC may specify the representative motion vectors and representative reference indices of the IPMVC. In this way, the video coder may use the motion parameters of the sub-PU that is closest to the center pixel of the reference block to determine the PU-level IPMVC. In other words, the video coder may derive a PU-level IPMVC from a center position of a corresponding region of the current PU and determine, based on the PU-level IPMVC, whether to include a spatial merge candidate in the candidate list. The motion parameters used from the sub-PU may be the same as the motion parameters that the video coder used to create the IPMVC.

In some examples where the video coder is determining a texture merge candidate, the motion information used from the center sub-PU for the default motion parameters may be the same as the motion information used to create the PU-level motion parameter inheritance (MPI) candidate. The video coder may determine, based on the PU-level MPI candidate, whether to include particular spatial merging candidates in the merge candidate list. For instance, if the $A_1$ spatial merging candidate and the PU-level MPI candidate have the same motion vectors and the same reference indices, the video coder does not insert the $A_1$ spatial merging candidate into the merge candidate list. Similarly, if the $B_1$ spatial merging candidate and the $A_1$ spatial merging candidate or the PU-level MPI candidate have the same motion vectors and the same reference indices, the video coder does not insert $B_1$ into the merge candidate list.

In the example of FIG. 25, the video coder may determine, for a current sub-PU of the current PU, a reference sample location in a reference picture (406). The reference picture may be in a different view than the picture that contains the current PU (i.e., the current picture). In some examples, the video coder may determine the reference location by adding a disparity vector for the current PU to the coordinates of a center pixel of the current sub-PU. In other examples, such as when the current PU is a depth PU, the reference sample location may be co-located with a sample of a prediction block of the current depth PU.

In addition, the video coder may determine a reference block for the current sub-PU (408). The reference block may be a PU of the reference picture and may cover the determined reference sample location. Next, the video coder may determine whether the reference block is coded using motion compensated prediction (410). For instance, if the reference block is coded using in intra prediction, the video coder may determine that the reference block is not coded using motion compensated prediction. If the reference block is coded using motion compensated prediction, the reference block has one or more motion vectors.

Responsive to determining that the reference block is coded using motion compensated prediction ("YES" of 410), the video coder may set motion parameters of the current sub-PU based on the motion parameters of the reference block (412). For instance, the video coder may set a RefPicList0 motion vector of the current sub-PU to a RefPicList0 motion vector of the reference block, may set a RefPicList0 reference index of the current sub-PU to a RefPicList0 reference index of the reference block, may set a RefPicList1 motion vector of the current sub-PU to a RefPicList1 motion vector of the reference block, and may set a RefPicList1 reference index of the current sub-PU to a RefPicList1 reference index of the reference block.

On the other hand, responsive to determining that the reference block is not coded using motion compensated prediction ("NO" of 410), the video coder may determine if any sub-PUs that are neighboring the current sub-PU have been coded with motion parameters different than the default motion parameters (414). For example, the video coder may analyze the motion parameters used to code the sub-PUs directly to the left of the current sub-PU to determine if that neighboring sub-PU has been allocated motion parameters different than the default motion parameters. In other examples, the video coder may check the above neighboring sub-PU, above-left neighboring sub-PU, or above right neighboring sub-PU to determine if that neighboring sub-PU has been allocated motion parameters different than the default motion parameters. In some examples, the video coder analyzes the left neighboring sub-PU, the above neighboring sub-PU, above-left neighboring sub-PU, and above right neighboring sub-PU, in a particular order, to determine if the neighboring sub-PUs have been allocated motion parameters different than the default motion parameters. In some examples, the video coder analyzes the above neighboring sub-PU, above-left neighboring sub-PU, and above right neighboring sub-PU, in some order, to determine if the neighboring sub-PUs have been allocated motion parameters different than the default motion parameters. In some examples, the video coder analyzes the bottom neighboring sub-PU, the bottom-left neighboring sub-PU, and the bottom-right neighboring sub-PU to determine if the neighboring sub-PUs have been allocated motion parameters different than the default motion parameters. In another example, the video coder may analyze any combination of the described neighboring sub-PUs in any particular order to determine if the neighboring sub-PUs have been allocated motion parameters different than the default motion parameters.

If, after the analysis described above with respect to step 414, it is determined that one of the neighboring sub-PUs has been allocated motion parameters different than the default motion parameters ("YES" of 414), the video coder may copy the motion parameters of the neighboring sub-PU and allocate said motion parameters to the current sub-PU (416).

On the other hand, responsive to determining that the neighboring sub-PUs have not been allocated motion parameters different than the default motion parameters ("NO" of 414), the video coder may set the motion parameters of the current sub-PU to the default motion parameters (418). This may be determined if, for example, the current sub-PU is the first sub-PU and the reference block for the current sub-PU is intra-coded, or if all neighboring sub-PU are unavailable. Thus, in the example of FIG. 25, when the reference block for the current sub-PU is not coded using motion compensated prediction and the current sub-PU does not have a neighbor that has been given motion parameters different than the default motion parameters, the video coder does not set the motion parameters of the current sub-PU to the motion parameters of a closest sub-PU that has a reference block that is coded using motion compensated prediction. Rather, the video coder may set the motion parameters of the current sub-PU directly to the default motion parameters.

This may simplify and accelerate the process of coding process. In some examples, the default motion parameters may include a default motion vector and a default reference index. In some examples, the default motion vector is equal to a zero motion vector. In some examples, the default reference index is equal to targetRefLX or 0.

After setting the motion parameters of the current sub-PU, the video coder may determine whether the current PU has any additional sub-PUs (420). In response to determining that the current PU has one or more additional sub-PUs ("YES" of 420), the video coder may perform actions 406-418 with another one of the sub-PUs of the current PU as the current sub-PU. In this way, the video coder may set the motion parameters of each of the sub-PUs of the current PU. On the other hand, responsive to determining that there are no additional sub-PUs of the current PU ("NO" of 420), the video coder may include a candidate (e.g., an IPMVC) in the merge candidate list for the current PU (422). The candidate may specify the motion parameters of each of the sub-PUs of the current PU.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The coding techniques discussed herein may be embodiment in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device 12 to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device.

Various examples have been described. These and other examples are within the scope of the following claims.

What is claimed is:

1. A method of decoding multi-view video data, the method comprising:
   dividing, by a video decoder, a current prediction unit (PU) of a current coding unit (CU) of a current picture into a plurality of sub-PUs, each of the sub-PUs having a size smaller than a size of the current PU, the current PU being in a depth view of the multi-view video data;
   deriving, by the video decoder, default motion parameters, for the current PU, from a texture block co-located with a center sub-PU of the current PU;
   for each respective sub-PU of the plurality of sub-PUs:
      identifying, by the video decoder, a reference block for the respective sub-PU, wherein the identified reference block for the respective sub-PU is co-located with the respective sub-PU and the identified reference block for the respective sub-PU is in a texture view corresponding to the depth view,
      when motion parameters of the identified reference block for the respective sub-PU are available, using, by the video decoder, motion parameters of the identified reference block for the respective sub-PU to determine motion parameters for the respective sub-PU, wherein the motion parameters of the identified reference block comprise a motion vector,
      when the motion parameters of the identified reference block for the respective sub-PU are not available, setting the motion parameters of the respective sub-PU to the default motion parameters, and
      using, by the video decoder, the motion parameters for the respective sub-PU to determine a respective predictive block for the respective sub-PU;
   determining, by the video decoder, a predictive block for the current PU by assembling the predictive blocks for the sub-PUs; and
   reconstructing, by the video decoder, the current PU based at least in part on the predictive block for the current PU.

2. The method of claim 1, wherein for each respective sub-PU of the plurality of sub-PUs, the motion parameters of the identified reference block for the respective sub-PU include a first motion vector, a second motion vector, a first reference index, and a second reference index, the first motion vector and the first reference index being for a first reference picture list, the second motion vector and the second reference index being for a second reference picture list.

3. The method of claim 1, further comprising:
   including, by the video decoder, a particular candidate in a merge candidate list of the current PU, wherein the particular candidate has the motion parameters of each of the sub-PUs;
   obtaining, by the video decoder, from a bitstream, a syntax element that indicates a selected candidate in the merge candidate list; and
   based on the selected candidate being the particular candidate, invoking, by the video decoder, motion compensation for each of the sub-PUs.

4. The method of claim 1,
   wherein the default motion parameters comprise a first default motion vector, a second default motion vector, a first default reference index, and a second default reference index, the first default motion vector and the first default reference index being for a first reference picture list, the second default motion vector and the second default reference index being for a second reference picture list.

5. The method of claim 1, wherein each sub-PU of the plurality of sub-PUs has a block size equal to 4×4, 8×8, or 16×16.

6. The method of claim 1, wherein using the motion parameters of the identified reference block for the respective sub-PU to determine the motion parameters for the respective sub-PU comprises using, by the video decoder, the motion parameters of the identified reference block for the respective sub-PU as the motion parameters for the respective sub-PU.

7. The method of claim 1, further comprising:
dividing the current CU of the current picture into a plurality of PUs, the plurality of PUs including the current PU.

8. The method of claim 1, wherein the center sub-PU is the sub-PU with the following coordinates relative to a top-left sample of a prediction block of the current PU:

$$(((nPSW>>(u+1))-1)<<u, ((nPSH>>(u+1))-1<<u)$$

or with the following coordinates relative to a top-left sample of a prediction block of the current PU:

$$((nPSW>>(u+1))<<u, ((nPSH>>(u+1))<<u)$$

where nPSW and nPSH are the width and height of the prediction block of the current PU, and where the sub-PU size is $2^U \times 2^U$.

9. A method of encoding multi-view video data, the method comprising:
dividing, by a video encoder, a current prediction unit (PU) of a current coding unit (CU) of a current picture into a plurality of sub-PUs, each of the sub-PUs having a size smaller than a size of the current PU, the current PU being in a depth view of the multi-view video data;
deriving, by the video encoder, default motion parameters, for the current PU, from a texture block co-located with a center sub-PU of the current PU;
for each respective sub-PU of the plurality of sub-PUs:
identifying, by the video encoder, a reference block for the respective sub-PU, wherein the identified reference block for the respective sub-PU is co-located with the respective sub-PU and the identified reference block for the respective sub-PU is in a texture view corresponding to the depth view,
when motion parameters of the identified reference block for the respective sub-PU are available, using, by the video encoder, motion parameters of the identified reference block for the respective sub-PU to determine motion parameters for the respective sub-PU, wherein the motion parameters of the identified reference block comprise a motion vector,
when the motion parameters of the identified reference block for the respective sub-PU are not available, setting the motion parameters of the respective sub-PU to the default motion parameters, and
using, by the video encoder, the motion parameters for the respective sub-PU to determine a respective predictive block for the respective sub-PU;
determining, by the video encoder, a predictive block for the current PU by assembling the predictive blocks for the sub-PUs; and
encoding, by the video encoder, the current PU based at least in part on the predictive block for the current PU.

10. The method of claim 9, wherein for each respective sub-PU of the plurality of sub-PUs, the motion parameters of the identified reference block for the respective sub-PU include a first motion vector, a second motion vector, a first reference index, and a second reference index, the first motion vector and the first reference index being for a first reference picture list, the second motion vector and the second reference index being for a second reference picture list.

11. The method of claim 9, further comprising:
including, by the video encoder, a particular candidate in a merge candidate list of the current PU, wherein the particular candidate has the motion parameters of each of the sub-PUs;
signaling, by the video encoder, in a bitstream, a syntax element that indicates a selected candidate in the merge candidate list; and
based on the selected candidate being the particular candidate, invoking, by the video encoder, motion compensation for each of the sub-PUs.

12. The method of claim 9,
wherein the default motion parameters comprise a first default motion vector, a second default motion vector, a first default reference index, and a second default reference index, the first default motion vector and the first default reference index being for a first reference picture list, the second default motion vector and the second default reference index being for a second reference picture list.

13. The method of claim 9, wherein each sub-PU of the plurality of sub-PUs has a block size equal to 4×4, 8×8, or 16×16.

14. The method of claim 9, wherein using the motion parameters of the identified reference block for the respective sub-PU to determine the motion parameters for the respective sub-PU comprises using, by the video encoder, the motion parameters of the identified reference block for the respective sub-PU as the motion parameters for the respective sub-PU.

15. The method of claim 9, further comprising:
dividing the current CU of the current picture into a plurality of PUs, the plurality of PUs including the current PU.

16. The method of claim 9, wherein the center sub-PU is the sub-PU with the following coordinates relative to a top-left sample of a prediction block of the current PU:

$$(((nPSW>>(u+1))-1)<<u, ((nPSH>>(u+1))-1<<u)$$

or with the following coordinates relative to a top-left sample of a prediction block of the current PU:

$$((nPSW>>(u+1))<<u, ((nPSH>>(u+1))<<u)$$

where nPSW and nPSH are the width and height of the prediction block of the current PU, and where the sub-PU size is $2^U \times 2^U$.

17. A device for coding multi-view video data, the device comprising:
means for dividing a current prediction unit (PU) of a current coding unit (CU) of a current picture into a plurality of sub-PUs, each of the sub-PUs having a size smaller than a size of the current PU, the current PU being in a depth view of the multi-view video data;
means for deriving default motion parameters, for the current PU, from a texture block co-located with a center sub-PU of the current PU;
for each respective sub-PU of the plurality of sub-PUs:
means for identifying a reference block for the respective sub-PU, wherein the identified reference block for the respective sub-PU is co-located with the respective sub-PU and the identified reference block for the respective sub-PU is in a texture view corresponding to the depth view,
means for using motion parameters of the identified reference block for the respective sub-PU to determine motion parameters for the respective sub-PU when motion parameters of the identified reference block for the respective sub-PU are available, wherein the motion parameters of the identified reference block comprise a motion vector, means for setting the motion parameters of the respective sub-PU to the default motion parameters when the motion parameters of the identified reference block for the respective sub-PU are not available, and means for using the motion parameters for the respective sub-PU to determine a respective predictive block for the respective sub-PU;

means for determining a predictive block for the current PU by assembling the predictive blocks for the sub-PUs; and means for reconstructing the current PU based at least in part on the predictive block for the current PU.

18. The device of claim 17, wherein for each respective sub-PU of the plurality of sub-PUs, the motion parameters of the identified reference block for the respective sub-PU include a first motion vector, a second motion vector, a first reference index, and a second reference index, the first motion vector and the first reference index being for a first reference picture list, the second motion vector and the second reference index being for a second reference picture list.

19. The device of claim 17, further comprising:
means for including a particular candidate in a merge candidate list of the current PU, wherein the particular candidate has the motion parameters of each of the sub-PUs;
means for obtaining, from a bitstream, a syntax element that indicates a selected candidate in the merge candidate list; and
means for invoking motion compensation for each of the sub-PUs based on the selected candidate being the particular candidate.

20. The device of claim 17,
wherein the default motion parameters comprise a first default motion vector, a second default motion vector, a first default reference index, and a second default reference index, the first default motion vector and the first default reference index being for a first reference picture list, the second default motion vector and the second default reference index being for a second reference picture list.

21. The device of claim 17, further comprising:
means for dividing the current CU of the current picture into a plurality of PUs, the plurality of PUs including the current PU.

22. The device of claim 17, wherein the center sub-PU is the sub-PU with the following coordinates relative to a top-left sample of a prediction block of the current PU:

$(((nPSW>>(u+1))-1)<<u, ((nPSH>>(u+1))-1<<u)$ or with the following coordinates relative to a top-left sample of a prediction block of the current PU:

$((nPSW>>(u+1))<<u, ((nPSH>>(u+1))<<u)$ where nPSW and nPSH are the width and height of the prediction block of the current PU, and where the sub-PU size is $2^U \times 2^U$.

23. A device for coding multi-view video data, the device comprising:
a memory configured to store the multi-view video data; and
a video coder configured to:
divide a current prediction unit (PU) of a current coding unit (CU) of a current picture into a plurality of sub-PUs, each of the sub-PUs having a size smaller than a size of the current PU, the current PU being in a depth view of the multi-view video data;
derive default motion parameters, for the current PU, from a texture block co-located with a center sub-PU of the current PU;
for each respective sub-PU of the plurality of sub-PUs:
identify a reference block for the respective sub-PU, wherein the identified reference block for the respective sub-PU is co-located with the respective sub-PU and the identified reference block for the respective sub-PU is in a texture view corresponding to the depth view,
when motion parameters of the identified reference block for the respective sub-PU are available, use motion parameters of the identified reference block for the respective sub-PU to determine motion parameters for the respective sub-PU, wherein the motion parameters of the identified reference block comprise a motion vector,
when the motion parameters of the identified reference block for the respective sub-PU are not available, setting the motion parameters of the respective sub-PU to the default motion parameters, and
use the motion parameters for the respective sub-PU to determine a respective predictive block for the respective sub-PU;
determine a predictive block for the current PU by assembling the predictive blocks for the sub-PUs; and
reconstruct the current PU based at least in part on the predictive block for the current PU.

24. The device of claim 23, wherein for each respective sub-PU of the plurality of sub-PUs, the motion parameters of the identified reference block for the respective sub-PU include a first motion vector, a second motion vector, a first reference index, and a second reference index, the first motion vector and the first reference index being for a first reference picture list, the second motion vector and the second reference index being for a second reference picture list.

25. The device of claim 23, wherein the video coder is further configured to:
include a particular candidate in a merge candidate list of the current PU, wherein the particular candidate has the motion parameters of each of the sub-PUs;
obtain, from a bitstream, a syntax element that indicates a selected candidate in the merge candidate list; and
based on the selected candidate being the particular candidate, invoke motion compensation for each of the sub-PUs.

26. The device of claim 23,
wherein the default motion parameters comprise a first default motion vector, a second default motion vector, a first default reference index, and a second default reference index, the first default motion vector and the first default reference index being for a first reference picture list, the second default motion vector and the second default reference index being for a second reference picture list.

27. The device of claim 23, wherein each sub-PU of the plurality of sub-PUs has a block size equal to 4×4, 8×8, or 16×16.

28. The device of claim 23, wherein the video coder is configured such that, as part of using the motion parameters of the identified reference block for the respective sub-PU to determine the motion parameters for the respective sub-PU, the video coder uses the motion parameters of the identified reference block for the respective sub-PU as the motion parameters for the respective sub-PU.

29. The device of claim 23, wherein the video coder is further configured to:

divide the current CU of the current picture into a plurality of PUs, the plurality of PUs including the current PU.

30. The device of claim 23, wherein the center sub-PU is the sub-PU with the following coordinates relative to a top-left sample of a prediction block of the current PU:

$$(((nPSW>>(u+1))-1)<<u, ((nPSH>>(u+1))-1<<u)$$

or with the following coordinates relative to a top-left sample of a prediction block of the current PU:

$$((nPSW>>(u+1))<<u, ((nPSH>>(u+1))<<u)$$

where nPSW and nPSH are the width and height of the prediction block of the current PU, and where the sub-PU size is $2^U \times 2^U$.

* * * * *